United States Patent
Kitayama

(10) Patent No.: US 7,412,714 B2
(45) Date of Patent: Aug. 12, 2008

(54) NETWORK DELIVERY DATA TRANSMITTING METHOD, NETWORK DELIVERY DATA RECEIVING METHOD, NETWORK DELIVERY DATA TRANSMITTING SYSTEM, AND NETWORK DELIVERY DATA RECEIVING SYSTEM

(75) Inventor: Jiro Kitayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1648 days.

(21) Appl. No.: 10/228,498

(22) Filed: Aug. 27, 2002

(65) Prior Publication Data

US 2003/0058866 A1   Mar. 27, 2003

(30) Foreign Application Priority Data

Aug. 28, 2001   (JP)   ............................. 2001-257731

(51) Int. Cl.
*H04N 7/10* (2006.01)

(52) U.S. Cl. ............................. 725/34; 725/32; 725/93; 370/389

(58) Field of Classification Search ................. 370/389; 725/32, 34, 93
See application file for complete search history.

(56) References Cited

U.S. PATENT DOCUMENTS

| | | | |
|---|---|---|---|
| 5,600,368 A * | 2/1997 | Matthews, III | .............. 348/143 |
| 6,463,585 B1 * | 10/2002 | Hendricks et al. | ............. 725/35 |
| 2002/0089587 A1 * | 7/2002 | White et al. | ................ 348/105 |

* cited by examiner

*Primary Examiner*—Chris Kelley
*Assistant Examiner*—Sahar A Baig
(74) *Attorney, Agent, or Firm*—Frommer Lawrence & Haug LLP; William S. Frommer

(57) ABSTRACT

The present invention is intended to provide network delivery data transmitting methods and receiving methods which allow the selection of content data as desired by user. In a data transmitting system, a specification information packet for specifying a content source used, plural packet sequences each attached with identification information, and a correspondence information packet for relating the content sources with the identification information are multiplexed with on on-air stream, which is transmitted to each receiving system via a network. On the basis of the received specification information packet and correspondence information packet, each receiving system selects desired content data from plural pieces of content to view the selected content data at the same time or in a switched manner.

16 Claims, 39 Drawing Sheets

FIG. 22

PROGRAM PACKET 1800

| TAG 1801 | | | 1802 |
|---|---|---|---|
| TYPE INFORMATION | COMBINATION NUMBER | SERIAL NUMBER | PROGRAM PACKET DATA |
| 1801a | 1801b | 1801c | |

CM PACKET 1810

| TAG 1811 | | | 1812 |
|---|---|---|---|
| TYPE INFORMATION | COMBINATION NUMBER | SERIAL NUMBER | CM PACKET DATA |
| 1811a | 1811b | 1811c | |

COMBINATION INFORMATION PACKET Pkcb

| y(1) { | 1801b(1) { | | } 1811b(1) | } z(1) |
|---|---|---|---|---|
| DISPLAY CONTROL | PROGRAM CONTENT IDENTIFICATION INFORMATION | PROGRAM CONTENT IDENTIFICATION INFORMATION | COMBINED COMMERCIAL CONTENT IDENTIFICATION INFORMATION | DISPLAY CONTROL |
| DISPLAY CONTROL | PROGRAM CONTENT IDENTIFICATION INFORMATION | PROGRAM CONTENT IDENTIFICATION INFORMATION | COMBINED COMMERCIAL CONTENT IDENTIFICATION INFORMATION | DISPLAY CONTROL |
| y(2) { | 1801b(2) { | | } 1811b(2) | } z(2) |

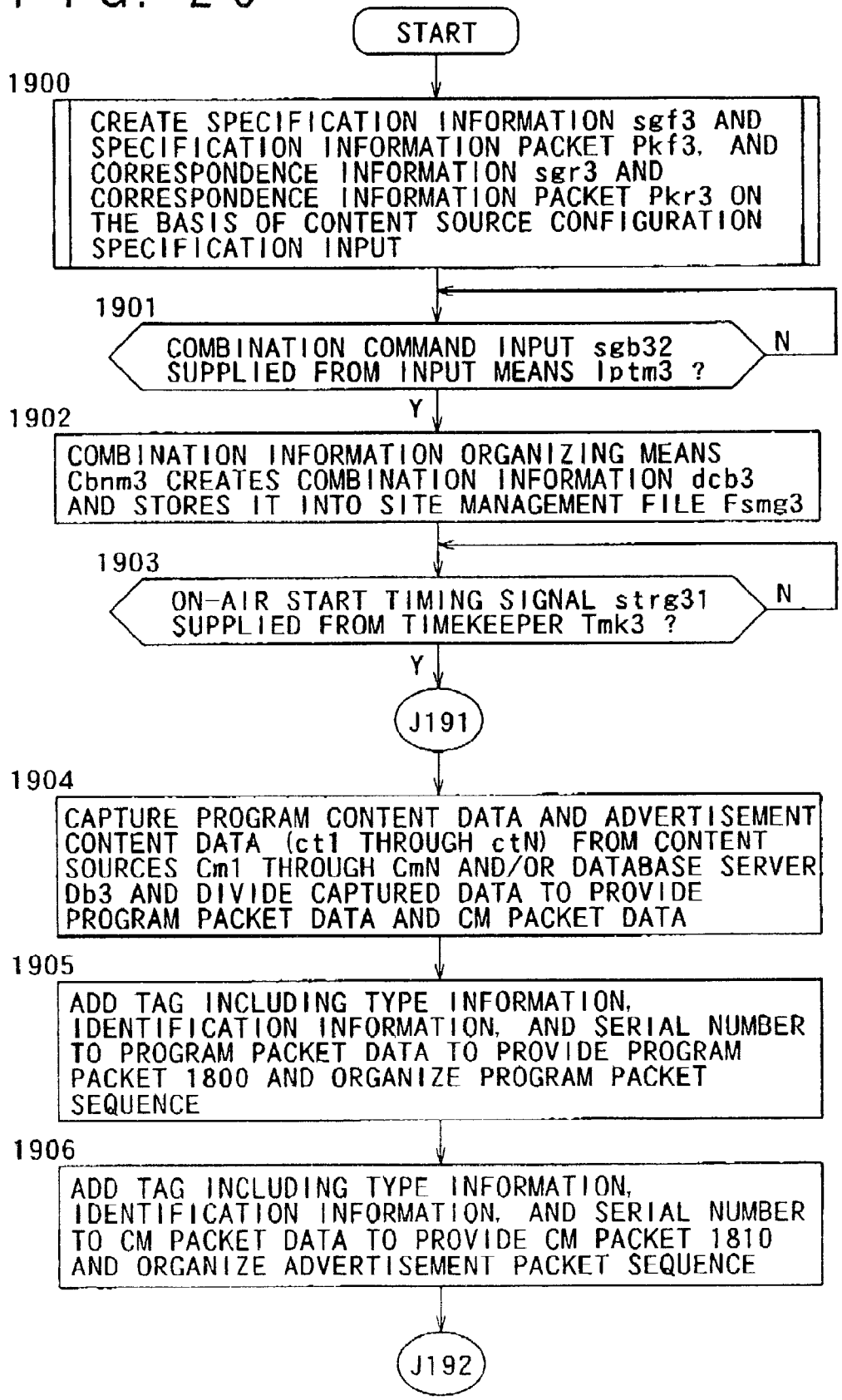

NETWORK DELIVERY DATA TRANSMITTING METHOD, NETWORK DELIVERY DATA RECEIVING METHOD, NETWORK DELIVERY DATA TRANSMITTING SYSTEM, AND NETWORK DELIVERY DATA RECEIVING SYSTEM

BACKGROUND OF THE INVENTION

The present invention relates generally to a network delivery data transmitting method, a network delivery data receiving method, a network delivery data transmitting system, and a network delivery data receiving system and, more particularly to an Internet broadcast data transmitting method, an Internet broadcast data receiving method, an Internet broadcast data transmitting system, and an Internet broadcast data receiving system.

A method and a configuration for delivery data over a network are known in which content associated with broadcast programs is delivered to a plurality of viewing sides. In this case, the content transmitting side is connected to the content receiving sides over a network. The network applicable to this configuration includes a leased line and, especially, the Internet, which is expected to gain popularity with accelerating speed.

For example, a "one-to-many" multi-cast broadcasting form is generally practiced in the Internet broadcasting in which each Web site is constituted by a gateway, an Internet backbone, a carrier, a public switched line, and so on. The "one-to-many" multi-cast broadcasting transmits programs from a transmitting side which functions as a broadcasting station to a plurality receiving sides, or the viewers. Due to the limitations in transmission capacity, the related-art technologies put one program on one Internet broadcast stream.

Therefore, as with live coverage of sports, if there are plural pieces of content taken by plural television cameras, one of these plural pieces of content is selected by the transmitting side from time to time in a switched manner as a program goes on and always only one selected piece of content is carried on one on-air stream as a program content.

If the imaging at different angles is required in the above-mentioned television camera imaging, it is a general practice that the transmitting side select television camera angles.

As for the advertisement media based on the network delivery services as described above, there are two types of advertisement transmitting methods.

The first advertisement transmitting method supports a banner advertisements which are mainly based on still pictures displayed on the screen separately from voice and moving-picture program content. Referring to FIG. 38 showing a related-art banner advertisement transmitting method, the supply side of Internet broadcasting switches between video data stA through stG taken by plural television cameras CmA through CmG by a switcher 290 to provide program content on which one piece of video data is always carried, switches between images bst1 through bst7 generated by plural banner advertisement image generators Bn1 through Bn7 by the switcher 290 to provide always one piece of banner advertisement content, and organizes one video stream 291 which carries together the above-mentioned one piece of program content as packet sequences 292 of one piece of program content and the above-mentioned one piece of banner advertisement content as packet sequences 293 of one piece of banner content, transmitting the resultant on-air stream to each viewing side Vw. The screen of each viewing side Vw opens both a program content display area and a banner advertisement display area at the same time, displaying the program content and the banner advertisement content respectively.

The second advertisement transmitting method support mainly voice and moving-picture commercials, which are displayed at the same screen position with voice and moving-picture video.

Referring to FIG. 39 showing a related-art commercial transmitting method, the supply side of Internet broadcasting switches between video data stA through stG taken by plural television cameras CmA through CmG by a switcher 300 to provide program content which carries always one piece of video data and switches between commercial videos cst1 through cst7 generated by plural commercial image generator Cn1 through Cn7 by the switcher 300 to provide always on piece of commercial content, and organizes one on-air stream 301 inserted with the above-mentioned one program content as one packet sequence 301a and the above-mentioned one commercial content as one packet sequence 301b, transmitting the resultant on-air stream to each viewing side Vw. Receiving the on-air stream 301, each viewing side Vw displays the program content video and the commercial content video at the same display position on the screen alternately in a switched manner.

Internet broadcasting secures sale by providing at least part of the above-mentioned on-air content on a pay basis as well as advertisement revenues. Thus the Internet broadcasting is economically feasible as business.

However, in the related-art network delivery services, Internet broadcasts for example, the transmitting side transmits an on-air stream which carries only one piece of program content, so that, if the receiving side wants to switch to another piece of program, it cannot be achieved, namely, there is no freedom of section on the receiving side. For example, in the above-mentioned related-art configuration, only one piece of video content selected by the transmitting side can be transmitted as program content in one session of live coverage, so that any request from the receiving side, videos at different angles for example, cannot be achieved.

In addition, because the related-art technologies require operations for changing camera angles and switching between plural cameras, the production of programs requires considerable materials and labor, thereby making it difficult to cut production cost.

Further, in the related-art technologies, each program is run with only one piece of program content as described above, so that only one line of advertisement is provided, thereby restricting advertisement quotas. This makes it difficult for many sponsors to participate in advertisement. This also presents problems for the supply side in curbing the increase in advertisement revenues. Another problem is that, since there is the restriction on the advertisement quota itself, the preparation of various types of advertisements does not lead to wider advertisement effects.

SUMMARY OF THE INVENTION

It is therefore an object of the present invention to provide a network delivery data transmitting method, a network delivery data receiving method, a network delivery data transmitting system, and a network delivery data receiving system which allow viewers to select desired contents from plural different pieces of video content, many sponsors to participate in advertisements because of increase of advertisement quota, and wider advertisement effects to be achieved.

To achieve the above object, according to a first aspect of the present invention, there is provided a network delivery data transmitting method, wherein a data transmitting system forms content data generated by a plurality of content sources including at least one of imaging apparatuses and image generating apparatuses into a plurality of packet sequences composed of a plurality of packets and transmits an on-air stream carrying at least the plurality of packet sequences to a receiving system via a network, including the steps of: attaching, by the transmitting system, at least identification information for identifying the plurality of packet sequences and serial numbers thereof to the plurality of packets forming the plurality of packet sequences formed by the applied plurality of content sources and putting on the on-air stream at least (1) specification information for describing the applied plurality of content sources, (2) correspondence information indicative of correspondence between the applied plurality of content sources and the identification information, and (3) the plurality of packet sequences composed of the plurality of packets to which the identification information and the serial numbers are attached; and transmitting the resultant on-air stream to the receiving system via the network.

As described and according to the invention, a network delivery data transmitting method puts a plurality of packet sequences based on the content data generated by a plurality of content sources onto one on-air stream and delivers this on-air stream via a network, thereby realizing multi-content network delivery, the Internet broadcasting based on multi-content of broadband type for example.

Further, the transmission of specification information allows to impart, to the receiving system, the information necessary for performing a sequence of processing operations for displaying the information associated with the plurality of content sources on the basis of this specification information concerned to let the user select and specify desired content sources.

Still further, the transmission of correspondence information allows the receiving system to get identification information corresponding to the above-mentioned selected and specified content sources.

Yet further, the transmission of each packet by attaching identification information and a serial number thereto allows to impart, to the receiving system, the information necessary for a sequence of processing operations for the receiving system to match the above-obtained identification information with the attached identification information to extract only the packets concerned and align the extracted packets by their serial numbers to smoothly restore desired content.

According to a second aspect of the present invention, there is provided a network delivery data transmitting method, wherein a data transmitting system forms content data generated by a plurality of content sources including at least one of imaging apparatuses and image generating apparatuses into a plurality of packet sequences composed of a plurality of packets and transmits an on-air stream carrying at least the plurality of packet sequences to a receiving system via a network, the plurality of packet sequences including at least one program packet sequence and at least one advertisement packet sequence, the method including the steps of: attaching, by the transmitting system, to each of the plurality of packets forming the plurality of packet sequences based on the plurality of applied content sources, at least (1) type information indicative of whether each of the plurality of packet sequences is the program packet sequence or the advertisement packet sequence, (2) identification information for identifying the plurality of packet sequences, and (3) a serial number of each of the plurality of packets; and attaching to any of the plurality of packets, (4) combination information for specifying a combination of the plurality of program packet sequences and the plurality of advertisement packet sequences; attaching to the on-air stream (1) specification information for describing the applied plurality of content sources; (2) correspondence information indicative of correspondence between the applied plurality of content sources and the identification information; and (3) the plurality of packet sequences composed of the plurality of packets to which the identification information and the serial numbers are attached; and transmitting the resultant on-air stream to the receiving system via the network.

As described and according to the invention, a network delivery data transmitting method puts a plurality of packet sequences including a plurality of program packet sequences and a plurality of advertisement packet sequences onto one on-air stream at the same time and transmit this on-air stream via a network, thereby realizing multi-content network delivery, the Internet broadcasting based on multi-content of broadband type for example.

Further, the transmission of specification information allows to transmit to the receiving system the information necessary for performing a sequence of processing operations for displaying the information associated with the plurality of content sources on the basis of this specification information concerned to let the user select and specify desired content sources.

Still further, the transmission of correspondence information allows the receiving system to get the identification information corresponding to the above-specified, desired content sources.

Yet further, attaching combination information to each packet in addition to type information, identification information, and a serial number and transmitting each packet in a packet sequence allow the transmission of information to the receiving system necessary for extracting only the packets concerned by determining the type of the packet sequence and matching the above-obtained identification information with the attached identification information and aligning the extracted packets by their serial numbers to smoothly restore the desired program packet sequence and the advertisement packet sequence combined therewith.

The transmission of the above-mentioned pieces of information to the receiving system allows the receiving system to display both the program, packet sequences and advertisement packet sequences specified by the combination information at the same time for example.

Thus, attaching the combination information associated with program packet sequences and advertisement packet sequences to packets constituting packet sequences and transmitting the resulting packets to the receiving system allow the transmission of the combination corresponding relationship to the receiving system with a simple configuration and with reliability.

According to a third aspect of the present invention, there is provided a network delivery data transmitting method, wherein a data transmitting system forms content data generated by a plurality of content sources including at least one of imaging apparatuses and image generating apparatuses into a plurality of packet sequences composed of a plurality of packets and transmits an on-air stream carrying at least the plurality of packet sequences to a receiving system via a network, the plurality of packet sequences including at least one program packet sequence and at least one advertisement packet sequence, the method including the steps of: attaching, by the transmitting system, to each of the plurality of packets forming the plurality of packet sequences based on the plurality of applied content sources, at least (1) type information indicative of whether each of the plurality of packet sequences is the program packet sequence or the advertisement packet sequence, (2) identification information for identifying the plurality of packet sequences, and (3) a serial number of each of the plurality of packets; and attaching to the on-air stream (1) specification information for describing the applied plurality of content sources, (2) correspondence information indicative of correspondence between the applied plurality of content sources and the identification information, (3) combination information for specifying a combination of the plurality of program packet sequences and the plurality of advertisement packet sequences, and (4) the plurality of packet sequences composed of the plurality of packets to which the identification information and the serial numbers are attached; and transmitting the resultant on-air stream to the receiving system via the network.

As described and according to the invention, a network delivery data transmitting method transmit program packet sequences and advertisement packet sequences based on the content data generated from plural content sources via a network, thereby allowing to provide multi-content network delivery.

The transmission of specification information, correspondence information, combination information, and each packet having type information, identification information, and a serial number on an on-air stream allows the transmission, to the receiving system, of the information associated with content sources, the identification information corresponding to content sources, and the information which enables packet sequence type determination and identification and the alignment of the packets which form the packet sequences concerned. The transmission of these pieces of information to the receiving system allows the receiving system to display the program content and the advertisement content specified by the combination information.

In the above-mentioned configuration, the combination information for program packet sequences and advertisement packet sequences is transmitted to the receiving system on an on-air stream independently of these packet sequences, so that the setting and change of combinations may be made only by setting or changing the combination information without having to change the contents of program content and advertisement content or the additional information, thereby facilitating the setting and change operations. In addition, program packet sequences and advertisement packet sequences may be combined in accordance with the situations at the time, thereby further enhancing advertisement effects.

According to a forth aspect of the present invention, there is provided a network delivery data transmitting system including: transmission data organizing means for forming a plurality of packet sequences composed of a plurality of packets on the basis of a plurality of content data supplied from a plurality of external or internal content sources including at least one of an imaging apparatus and an image generating apparatus and attaching identification information for identifying each of the plurality of packet sequences and a serial number to each of the plurality of packets to organize transmission data; specification data organizing means for organizing specification information for describing the plurality of content sources; correspondence information organizing means for organizing correspondence information for describing correspondence between the plurality of content sources and the identification information; and management means for transmitting the transmission data to a receiving system via a network; wherein the transmission data organizing means puts the specification information and the correspondence information onto the transmitting data.

As described and according to the invention a network delivery data transmitting system puts a plurality of packet sequences based on the content data generated by a plurality of content sources onto one on-air stream and delivers this on-air stream via a network, thereby realizing multi-content network delivery, the Internet broadcasting based on multi-content of broadband type for example.

Further, the transmission of specification information allows to impart, to the receiving system, the information necessary for performing a sequence of processing operations for displaying the information associated with the plurality of content sources on the basis of this specification information concerned to let the user select and specify desired content sources.

Still further, the transmission of correspondence information allows the receiving system to get identification information corresponding to the above-mentioned selected and specified content sources.

Yet further, the transmission of each packet by attaching identification information and a serial number thereto allows to impart, to the receiving system, the information necessary for a sequence of processing operations for the receiving system to match the above-obtained identification information with the attached identification information to extract only the packets concerned and align the extracted packets by their serial numbers to smoothly restore desired content.

According to a fifth aspect of the present invention, there is provided a network delivery data transmitting system including: transmission data organizing means for forming content data generated by a plurality of packet sequences of program packet sequences or advertisement packet sequences each composed of a plurality of packets on the basis of a plurality of content data supplied from a plurality of content sources including at least one of imaging apparatuses and image generating apparatuses, attaching to each of the plurality of packets (1) type information indicative of whether each of the plurality of packet sequences is the program packet sequence or the advertisement packet sequence; (2) identification information for identifying the plurality of packet sequences; and (3) a serial number of each of the plurality of packets, (4) and attaching to any of the plurality of packets, combination information for specifying a combination of the plurality of program packet sequences and the plurality of advertisement packet sequences; specification information organizing means for organizing specification information for describing the plurality or content sources; correspondence information organizing means for organizing correspondence information for describing correspondence between the plurality of content sources and the identification information; combination information organizing means for organizing the combination information; and management means for transmitting the transmission data to a receiving system via a network; wherein the transmission data organizing means puts the specification information and the correspondence information onto the transmitting data As described and according to the invention, a network delivery data transmitting system puts a plurality of packet sequences including a plurality of program packet sequences and a plurality of advertisement packet sequences onto one on-air stream at the same time and transmit this on-air stream via a network, thereby realizing multi-content network delivery, the Internet broadcasting based on multi-content of broadband type for example.

Further, the transmission of specification information allows to transmit to the receiving system the information necessary for performing a sequence of processing operations for displaying the information associated with the plurality of content sources on the basis of this specification information concerned to let the user select and specify desired content sources.

Still further, the transmission of correspondence information allows the receiving system to get the identification information corresponding to the above-specified, desired content sources.

Yet further, attaching combination information to each packet in addition to type information, identification information, and a serial number and transmitting each packet in a packet sequence allow the transmission of information to the receiving system necessary for extracting only the packets concerned by determining the type of the packet sequence and matching the above-obtained identification information with the attached identification information and aligning the extracted packets by their serial numbers to smoothly restore the desired program packet sequence and the advertisement packet sequence combined therewith.

The transmission of the above-mentioned pieces of information to the receiving system allows the receiving system to display both the program packet sequences and advertisement packet sequences specified by the combination information at the same time for example.

Thus, attaching the combination information associated with program packet sequences and advertisement packet sequences to packets constituting packet sequences and transmitting the-resulting packets to the receiving system allow the transmission of the combination corresponding relationship to the receiving system with a simple configuration and with reliability.

According to a sixth aspect of the present invention, there is provided a network delivery data transmitting system including: transmission data organizing means for forming content data generated by a plurality of packet sequences of program packet sequences or advertisement packet sequences each composed of a plurality of packets on the basis of a plurality of content data supplied from a plurality of content sources including at least one of imaging apparatuses and image generating apparatuses and attaching to each of the plurality of packets (1) type information indicative of whether each of the plurality of packet sequences is the program packet sequence or the advertisement packet sequence; (2) identification information for identifying the plurality of packet sequences; and (3) a serial number of each of the plurality of packets; specification information organizing means for organizing specification information for describing the plurality of content sources; correspondence information organizing means for organizing correspondence information for describing correspondence between the plurality of content sources and the identification information; combination information organizing means for organizing the combination information; and management means for transmitting the transmission data to a receiving system via a network; wherein the transmission data organizing means puts the specification information, the correspondence information, and the combination information onto the transmission data.

As described and according to the invention, a network delivery data transmitting system transmit program packet sequences and advertisement packet sequences based on the content data generated from plural content sources via a network, thereby allowing to provide multi-content network delivery.

The transmission of specification information, correspondence information, combination information, and each packet having type information, identification information, and a serial number on an on-air stream allows the transmission, to the receiving system, of the information associated with content sources, the identification information corresponding to content sources, and the information which enables packet sequence type determination and identification and the alignment of the packets which form the packet sequences concerned. The transmission of these pieces of information to the receiving system allows the receiving system to display the program content and the advertisement content specified by the combination information.

In the above-mentioned configuration, the combination information for program packet sequences and advertisement packet sequences is transmitted to the receiving system on an on-air stream independently of these packet sequences, so that the setting and change of combinations may be made only by setting or changing the combination information without having to change the contents of program content and advertisement content or the additional information, thereby facilitating the setting and change operations. In addition, program packet sequences and advertisement packet sequences may be combined in accordance with the situations at the time, thereby further enhancing advertisement effects.

According to a seventh aspect of the present invention, there is provided a network delivery data receiving method for receiving, when each of a plurality of content data generated by a plurality of content sources is organized into a plurality of packet sequences composed of a plurality of packets and the plurality of packet sequences are transmitted from a transmitting side of network delivery, the plurality of packet sequences via a network, the method including the steps of: receiving via the network at least (1) the plurality of packet sequences, each of the plurality of packets being attached with identification information for identifying the plurality of packet sequences and a serial number, (2) correspondence information indicative of correspondence between the plurality of content sources and the identification information, and (3) specification information for describing the plurality of content sources; displaying a selection screen for the plurality of content sources on the basis of the specification information; acquiring identification information corresponding to the specified content source indicated by the correspondence information upon reception of an externally given command for selecting any one of the plurality of content sources; extracting a plurality of corresponding packets by matching the acquired identification information with the attached identification information; and restoring the content data by aligning the plurality of extracted packets by their serial numbers.

As described and according to the invention, a network delivery data receiving method simultaneously receive plural content data generated from plural content sources via a network, so that these receiving method and system can receive multi-content Internet broadcasting.

Further, receiving and displaying specification information allows the user to specify desired content sources among the plural content sources and the receiving system to get the identification information corresponding to the specified content sources by referencing the received correspondence information Still further, reception of plural packets having identification information and serial numbers allows to extract only the packets concerned by matching the obtained identification information with the attached identification information and, by aligning the extracted packets by their serial numbers, restore the content data created from the specified content sources According to a eighth aspect of the present invention, there is provided a network delivery data receiving method for receiving, when each of a plurality of content data generated by a plurality of content sources is organized into program packet sequences or advertisement packet sequences composed of a plurality of packets and the plurality of packet sequences are transmitted from a transmitting side of network delivery, the program packet sequences and advertisement packet sequences via a network, the method including the steps of: receiving via a network (1) a plurality of packet sequences, each packet being attached with (a) type information indicative of whether each of the plurality of packet sequences is the program packet sequence or the advertisement packet sequence, (b) identification information for identifying the plurality of packet sequences, and (c) a serial number of each of the plurality of packets, and at least a part of the plurality of packets being attached with (d) combination information specifying a combination of the plurality of program packet sequences and the plurality of advertisement packet sequences, (2) correspondence information indicative of correspondence between the plurality of content sources and the identification information, and (3) specification information for describing the plurality of consent sources; displaying a selection screen for the plurality of content sources on the basis of the identification information; acquiring identification information corresponding to the specified content source indicated by the correspondence information upon reception of an externally given command for selecting any one of the plurality of content sources; determining the type of the plurality of packet sequences by the type information; extracting a plurality of corresponding packets by matching the acquired identification information with the attached identification information; restoring the content data by aligning the plurality of extracted packets by their serial numbers; and restoring, at a given or predetermined trigger time or upon confirmation of the plurality of packets attached with the combination information, both of the plurality of program packet sequences and the plurality of advertisement packet sequences of which combination is specified by the combination information at the same time or only one of them at one time in a switched manner.

As described and according to the invention, a network delivery data receiving method simultaneously receive plural content data created from plural content sources via a network as plural program packet sequences and advertisement packet sequences, thereby allowing the reception of multi-content Internet broadcasting.

Further, receiving and displaying specification information allows the user to specify desired contents among the plural content sources and the receiving system to get the identification information corresponding to the specified content sources by referencing the received correspondence information. Still further, the reception of plural packets attached with type information, identification information, and serial numbers allows to determine the type of the received packet sequences, extract only the packets concerned by matching the above-obtained identification information with the attached identification information, and align the extracted packets by their serial numbers, thereby restoring the content data generated from the specified content sources.

Yet further, the reception of packets attached with combination information allows to restore the program packet sequences and advertisement packet sequences specified in the combination information both at the same time or one of them in a switched manner at the time of reception or a given or predetermined trigger time, thereby restoring program content and/or advertisement content of which combination is predetermined, which enhances convenience and advertisement effects.

According to a ninth aspect of the present invention, there is provided a network delivery data receiving method for receiving, when each of a plurality of content data generated by a plurality of content sources is organized into a plurality of program packet sequences and a plurality of advertisement packet sequences composed of a plurality of packets and the plurality of packet sequences are transmitted from a transmitting side of network delivery, the plurality of program packet sequences and the plurality of advertisement packet sequences via a network, the method including the steps of: receiving via a network (1) a plurality of packet sequences, each packet being attached with (a) type information indicative of whether each of the plurality of packet sequences is the program packet sequence or the advertisement packet sequence; (b) identification information for identifying the plurality of packet sequences; and (c) a serial number of each of the plurality of packets, (2) correspondence information indicative of correspondence between the plurality of content sources and the identification information, and (3) specification information for describing the plurality of content sources; (4) combination information for specifying a combination of the plurality of program packet sequences and the plurality of advertisement packet sequences; displaying a selection screen for the plurality of content sources on the basis of the identification information; acquiring identification information corresponding to the specified content source indicated by the correspondence information upon reception of an externally given command for selecting any one of the plurality of content sources; determining the type of the plurality of packet sequences by the type information; extracting a plurality of corresponding packets by matching the acquired identification information with the attached identification information; restoring the content data by aligning the plurality of extracted packets by their serial numbers; and restoring, at reception of the combination information or a given or predetermined trigger time, both of the plurality of program packet sequences and the plurality of advertisement packet sequences of which combination is specified by the combination information at the same time or only one of them at one time in a switched manner.

As described and according to the invention, a network delivery data receiving method receive plural content data created from plural content sources via a network as plural program packet sequences and plural advertisement packet sequences simultaneously, thereby allowing the reception of multi-content Internet broadcasting.

Further, the reception and display of specification information allows the user to specify desired content sources among the plural content sources and the receiving system to get the identification information corresponding to the specified content sources by referencing the received correspondence information. Still further, the reception of plural packets attached with type information, identification information, and serial numbers allow the receiving system to determine the type of the,packet sequences, extract only the packets concerned by matching the above-obtained identification information with the attached identification information, and align the extracted packets by their serial numbers, thereby restoring the content data created from the specified content sources.

Yet further, the reception of combination information allows to restore the content data associated with the program packet sequences and advertisement packet sequences specified in the combination information both at the same time or one of them in a switched manner at the time of reception or a given or predetermined trigger time, thereby restoring program content and/or advertisement content of which combination is predetermined, which enhances convenience and advertisement effects.

According to a tenth aspect of the present invention, there is provided a network delivery data receiving system for receiving, when each of plurality of content data generated by a plurality of content sources are organized into a plurality of packet sequences composed of a plurality of packets and the plurality of packet sequences are transmitted from a transmitting side of network delivery, the plurality of packet sequences via a network, including: input means through which a user performs an input operation; data exchange means for receiving via the network at least (1) the plurality of packet sequences with each of the plurality of packets attached with identification information for identifying the plurality of packet sequences and a serial number, (2) correspondence information indicative of correspondence between the plurality of content sources and the identification information, and (3) specification information for describing the plurality of content sources; data processing means for at least (1) receiving a command for selecting any one of the plurality of content sources From the input means to acquire identification information corresponding to the specified content source by referencing the correspondence information, (2) extracting a plurality of corresponding packets by matching the acquired identification information with the identification information attached to the plurality of packet sequences, and (3) aligning the plurality of extracted packets by their serial numbers to restore the content data; and output means for displaying a selection screen for the plurality of content sources based on the specification information and a screen for the content data reproduced from the plurality of packet sequences.

As described and according to the invention, a network delivery data receiving system simultaneously receive plural content data generated from plural content sources via a network, so that these receiving method and system can receive multi-content Internet broadcasting.

Further, receiving and displaying specification information allows the user to specify desired content sources among the plural content sources and the receiving system to get the identification information corresponding to the specified content sources by referencing the received correspondence information. Still further, reception of plural packets having identification information and serial numbers allows to extract only the packets concerned by matching the obtained identification information with the attached identification information and, by aligning the extracted packets by their serial numbers, restore the content data created from the specified content sources.

According to a eleventh aspect of the present invention, there is provided a network delivery data receiving system for receiving, when each of a plurality of content data generated by a plurality of content sources is organized into a plurality of program packet sequences or a plurality of advertisement packet sequences each composed of a plurality of packets and the plurality of packet sequences are transmitted from a transmitting side of network delivery, at least the plurality of program packet sequences and the plurality of advertisement packet sequences via a network, including: input means through which a user performs an input operation; data exchange means for receiving via the network the plurality of packet sequences in which at least (1) each of the plurality of packets is attached with (a) type information indicative of whether each of the plurality of packet sequences is the program packet sequence or the advertisement packet sequence; (b) identification information for identifying the plurality of packet sequences; and (c) a serial number of each of the plurality of packets, and at least a part of the plurality of packets is attached with (d) combination/information specifying a combination of the plurality of program packet sequences and the plurality of advertisement packet sequences, (2) correspondence information indicative of correspondence between the plurality of content sources and the identification information, and (3) specification information for describing the plurality of content sources; data proceeding means for at least (1) receiving a command for selecting any one of the plurality of content sources from the input means to acquire identification information corresponding to the specified content source by referencing the correspondence information, (2) extracting the plurality of corresponding packets by matching the acquired identification information with the identification information attached to the plurality of packet sequences upon determination of the type of the plurality of packet sequences by the type information, (3) reproducing the content data by aligning the plurality of extracted packets by their serial numbers, and (4) restoring, at a given or predetermined trigger time or upon confirmation of the plurality of packets attached with the combination information, the content data of both of the plurality of program packet sequences and the plurality of advertisement packet sequences of which combination is specified by the combination information at the same time or only one of them at one time in a switched manner; and output means for displaying a selection screen for the plurality of content sources based on the specification information and a screen for the content data reproduced from the plurality of packet sequences.

As described and according to the invention, a network delivery data receiving system simultaneously receive plural content data created from plural content sources via a network as plural program packet sequences and advertisement packet sequences, thereby allowing the reception of multi-content Internet broadcasting.

Further, receiving and displaying specification information allows the user to specify desired contents among the plural content sources and the receiving system to get the identification information corresponding to the specified content sources by referencing the received correspondence information. Still further, the reception of plural packets attached with type information, identification information, and serial numbers allows to determine the type of the received packet sequences, extract only the packets concerned by matching the above-obtained identification information with the attached identification information, and align the extracted packets by their serial numbers, thereby restoring the content data generated from the specified content sources.

Yet further, the reception of packets attached with combination information allows to restore the program packet sequences and advertisement packet sequences specified in the combination information both at the same time or one of them in a switched manner at the time of reception or a given or predetermined trigger time, thereby restoring program content and/or advertisement content of which combination is predetermined, which enhances convenience and advertisement effects.

According to a twelfth aspect of the present invention, there is provided a network delivery data receiving system for receiving, when each of a plurality of content data generated by a plurality of content sources is organized into a plurality of program packet sequences or a plurality of advertisement packet sequences each composed of a plurality of packets and the plurality of packet sequences are transmitted from a transmitting side of network delivery, at least the plurality of program packet sequences and the plurality of advertisement packet sequences via a network, including: input means through which a user performs an input operation; data exchange means for receiving via the network the plurality of packet sequences in which at least (1) each of the plurality of packets is attached with (a) type information indicative of whether each of the plurality of packet sequences is the program packet sequence or the advertisement packet sequence; (b) identification information for identifying the plurality of packet sequences; and (c) a serial number of each of the plurality of packets, (2) correspondence information indicative of correspondence between the plurality of content sources and the identification information, and (3) specification information for describing the plurality of content sources; (4) combination information for specifying a combination between the plurality of program packet sequences and the plurality of advertisement packet sequences; data processing means for at least (1) receiving a command for selecting any one of the plurality of content sources from the input means to acquire identification information corresponding to the specified content source by referencing the correspondence information, (2) extracting the plurality of corresponding packets by matching the acquired identification information with the identification information attached to the plurality of packet sequences upon determination of the type of the plurality of packet sequences by the type information, (3) reproducing the content data by aligning the plurality of extracted packets by their serial numbers, and (4) restoring, at reception of the combination information or a given or predetermined trigger time, the content data of both of the plurality of program packet sequences and the plurality of advertisement packet sequences of which combination is specified by the combination information at the same time or only one of them at one time in a switched manner; and output means for displaying a selection screen for the plurality of content sources based on the specification information and a screen for the content data reproduced from the plurality of packet sequences.

As described and according to the invention, a network delivery data receiving method receive plural content data created from plural content sources via a network as plural program packet sequences and plural advertisement packet sequences simultaneously, thereby allowing the reception of multi-content Internet broadcasting.

Further, the reception and display of specification information allows the user to specify desired content sources among the plural content sources and the receiving system to get the identification information corresponding to the specified content sources by referencing the received correspondence information. Still further, the reception of plural packets attached with type information, identification information, and serial numbers allow the receiving system to determine the type of the packet sequences, extract only the packets concerned by matching the above-obtained identification information with the attached identification information, and align the extracted packets by their serial numbers, thereby restoring the content data created from the specified content sources.

Yet further, the reception of combination information allows to restore the content data associated with the program packet sequences and advertisement packet sequences specified in the combination information both at the same time or one of them in a switched manner at the time of reception or a given or predetermined trigger time, thereby restoring program content and/or advertisement content of which combination is predetermined, which enhances convenience and advertisement effects.

BRIEF DESCRIPTION OF THE DRAWINGS

These and other objects of the invention will be seen by reference to the description, taken in connection with the accompanying drawing, in which:

FIG. 22 illustrates a packet configuration;

FIG. 23 is a flowchart describing operations of the network delivery data transmitting system shown in FIG. 21;

DETAILED DESCRIPTION OF PREFERRED EMBODIMENTS

Figure 1:
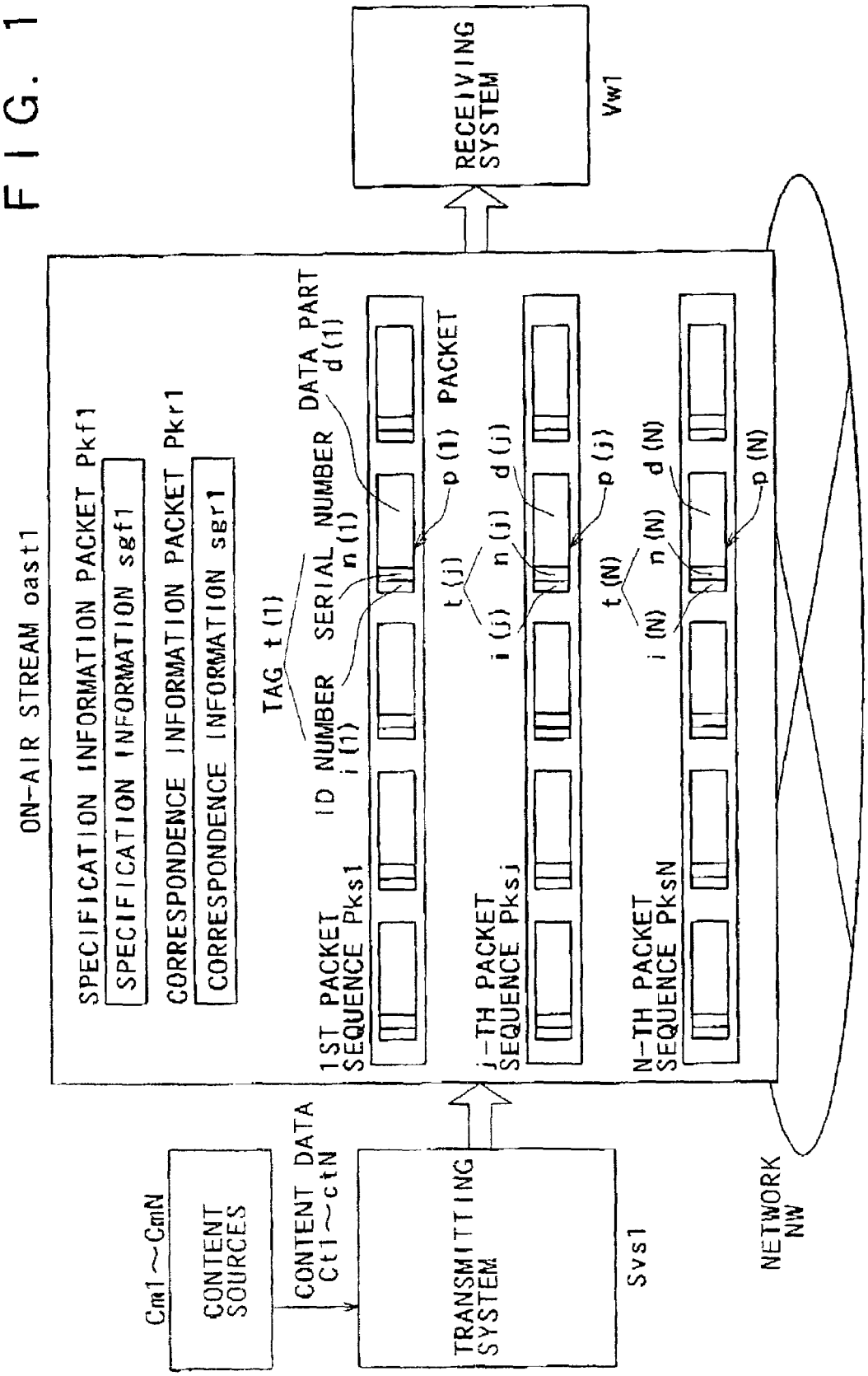
FIG. 1 is a schematic diagram illustrating a first embodiment of a network delivery data transmitting method and a network delivery data receiving method associated with the present invention.

The ensuing description of the inventive means for solving the problems will be preceded below by a simple explanation of the terms used in this specification. It should be noted, however, that the explanation or clarification of the terms below serves only to help readers better understand this invention and is not intended to determine or restrict the definitions or the meanings of the terms dealt wish or to limit in any way the spirit or scope of the appended claims of this invention.

"Network delivery": Network delivery refers to a scheme whereby a content provider is connected to a plurality of receiving parties via a network so that image and sound contents are distributed from the provider to the receiving parties over the network. The term "net" is an abbreviation of "network." A typical implementation of network delivery is Internet broadcasting, i.e., a setup for distributing image and sound contents over the Internet. Network delivery is implemented effectively as broadband distribution through xDSL, CATV or FTTH.

"Program content" and "advertisement content": Program content refers to the content of a particular broadcast program such as a sports broadcast. Advertisement content (or CM content) refers to the content made up of images and/or sounds of a commercial message broadcast either singly or in combination with broadcast programs.

"Content source" and "content data": Content source refers to anything that generates broadcast and advertisement contents, i.e., image-generating means in a broad sense including image pick-up cameras and image generating devices. Content data refer to all forms of output from such content sources.

All program or advertisement (CM) contents are generated by the content sources. Such contents are distributed as program content data or advertisement (CM) content data either in real time or through buffers of storage media (magnetic/optical) placed in servers or like equipment.

"Packets" and "packet sequence": Preparatory to their transmission, content data are divided into fragments of a suitable bit sequence. Each of the fragments serves as a data body prefixed with a tag, forming a packet. The tag part comprises type information, ID information, correspondence information, combination information, a serial number, and others. The content data are organized into a train of a plurality of packets generally called a packet sequence.

"Program packet sequence": Program packet sequence refers to a sequence of multiple program packets each made up of program content data. The packets constituting a given program packet sequence are transmitted on a time series basis.

"Advertisement packet sequence": Advertisement (CM) packet sequence refers to a sequence of multiple advertisement (CM) packets each made up of advertisement (CM) content data. The packets constituting a given advertisement packet sequence are also transmitted on a time series basis.

"Banner advertisement" and "commercial": There are two kinds of advertisement contents: banner advertisements displayed (mostly as images with no sound) constantly in an independent display area on the receiving party's screen; and commercials inserted into a program content broadcast and displayed (mostly as moving images with sounds) in a window for displaying program contents upon switchover from an ongoing program content display. Some "commercials" are kept displayed in a screen area independent of the window where a program content is being displayed in parallel. It follows that there are two kinds of CM packet sequences: CM packet sequences made up of banner advertisements, and CM packet sequences composed of commercials.

"Broadcast stream": Broadcast stream refers to a time series data train that is ultimately output by the content providing party. The stream destined for receiving parties typically includes the following:

(1) an ID information packet for identifying the content source involved;
(2) a correspondence information packet indicating the correspondence between the content source and the ID information;
(3) a plurality of program contents each made up of multiple program packet sequences;
(4) a plurality of CM contents each composed of multiple CM packet sequences; and
(5) a combination information packet for determining the combination of program contents with CM contents.

This invention will be described in further detail by way of example with reference to the accompanying drawings. It should be noted that the embodiments described below are only some of the embodiments indicative of the essential configuration and functions of the present embodiment and therefore are attached with various restrictions preferable in technological configuration. However, the scope of the present invention is not limited to these embodiments in any manner unless otherwise especially noted hereafter.

It should also be noted that, in each of the embodiments described below, network delivery services are described by use of the Internet broadcasting which is a typical example of network delivery services; however, the network delivery services to which the present invention is applied are not limited to the Internet broadcasting but are compliance with various known network delivery methods and systems which deliver digital content through networks.

Now, referring to FIG. 1, there is shown a schematic diagram illustrating a first embodiment of a network delivery data transmitting method and a network delivery data receiving method associated with the invention, thereby showing a configuration of data to be network-delivered.

Figure 2:
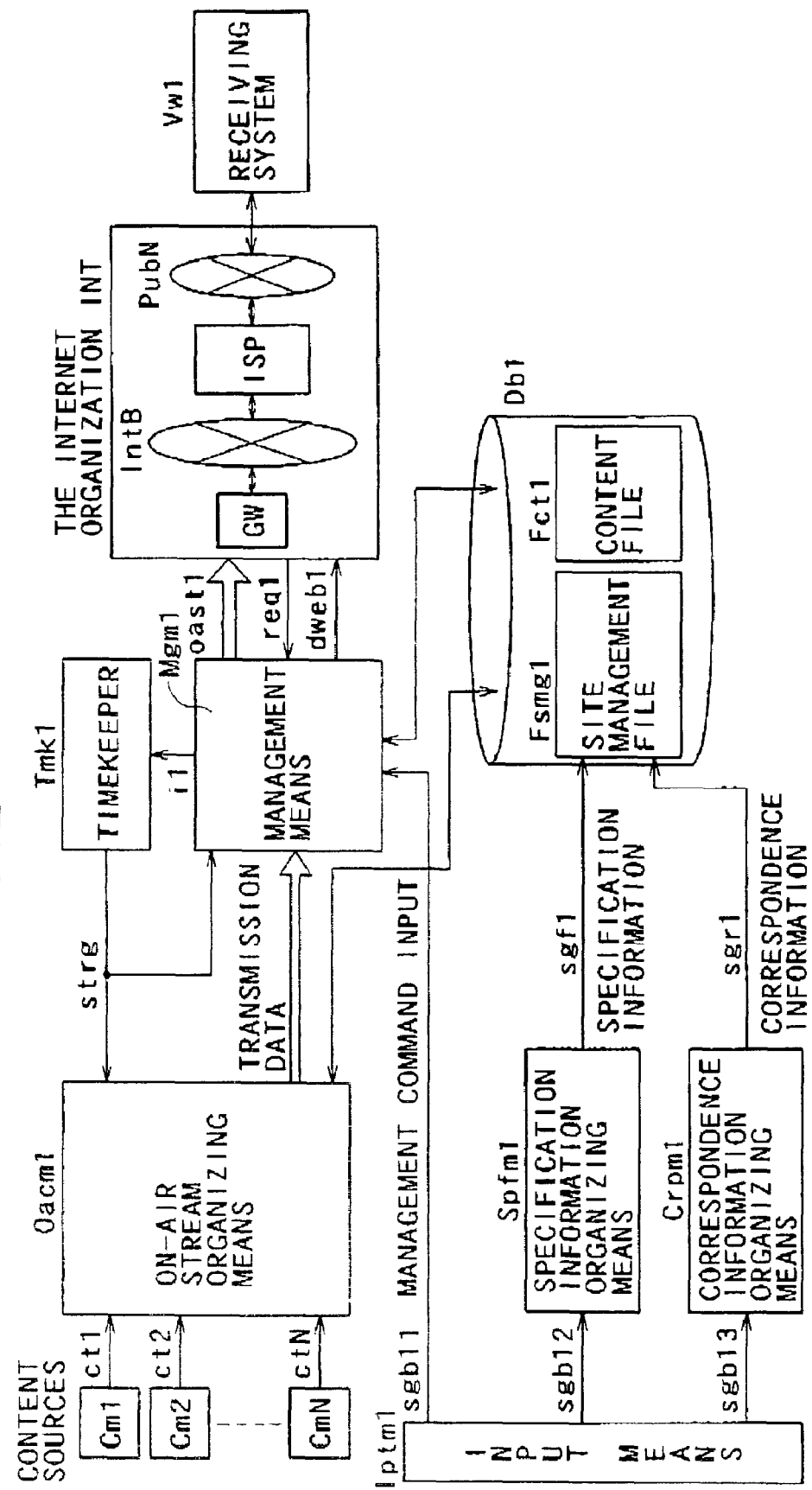
FIG. 2 is a block diagram illustrating a first embodiment of a network delivery data transmitting system to which the network delivery data transmitting method associated with the present invention is applied.

FIG. 2 is a block diagram illustrating a first embodiment of a data network delivery transmitting system associated with the invention to which the network delivery data transmitting method associated with the invention is applied.

Figure 3:
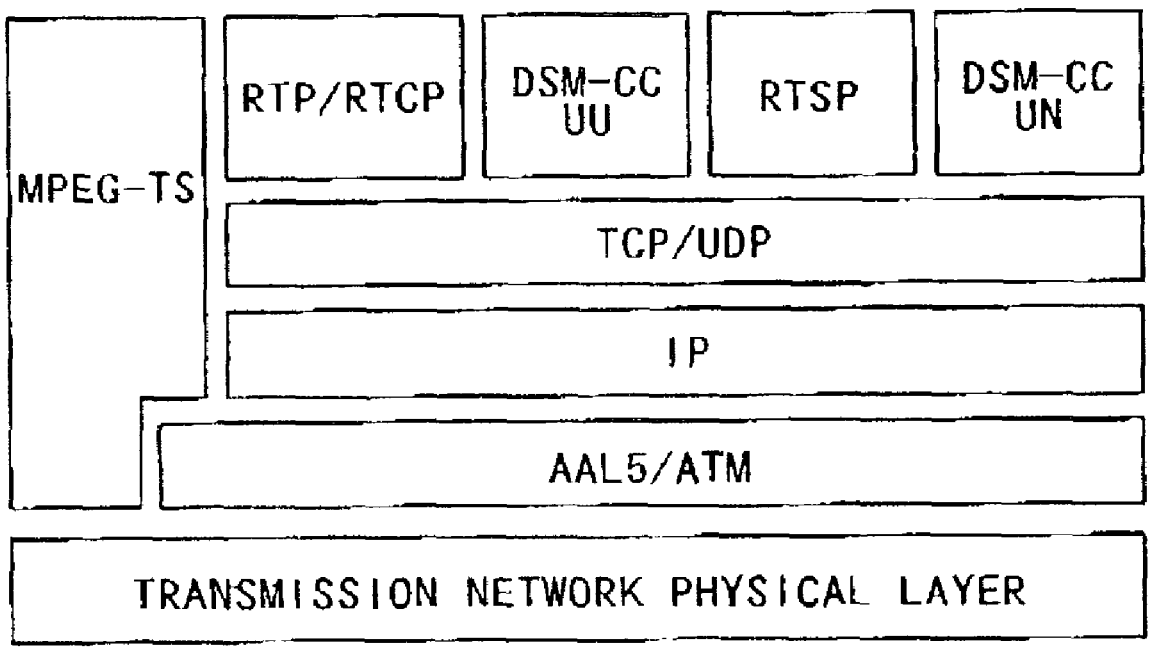
FIG. 3 illustrates communication protocols.

FIG. 3 illustrates communication protocols.

Figure 4:
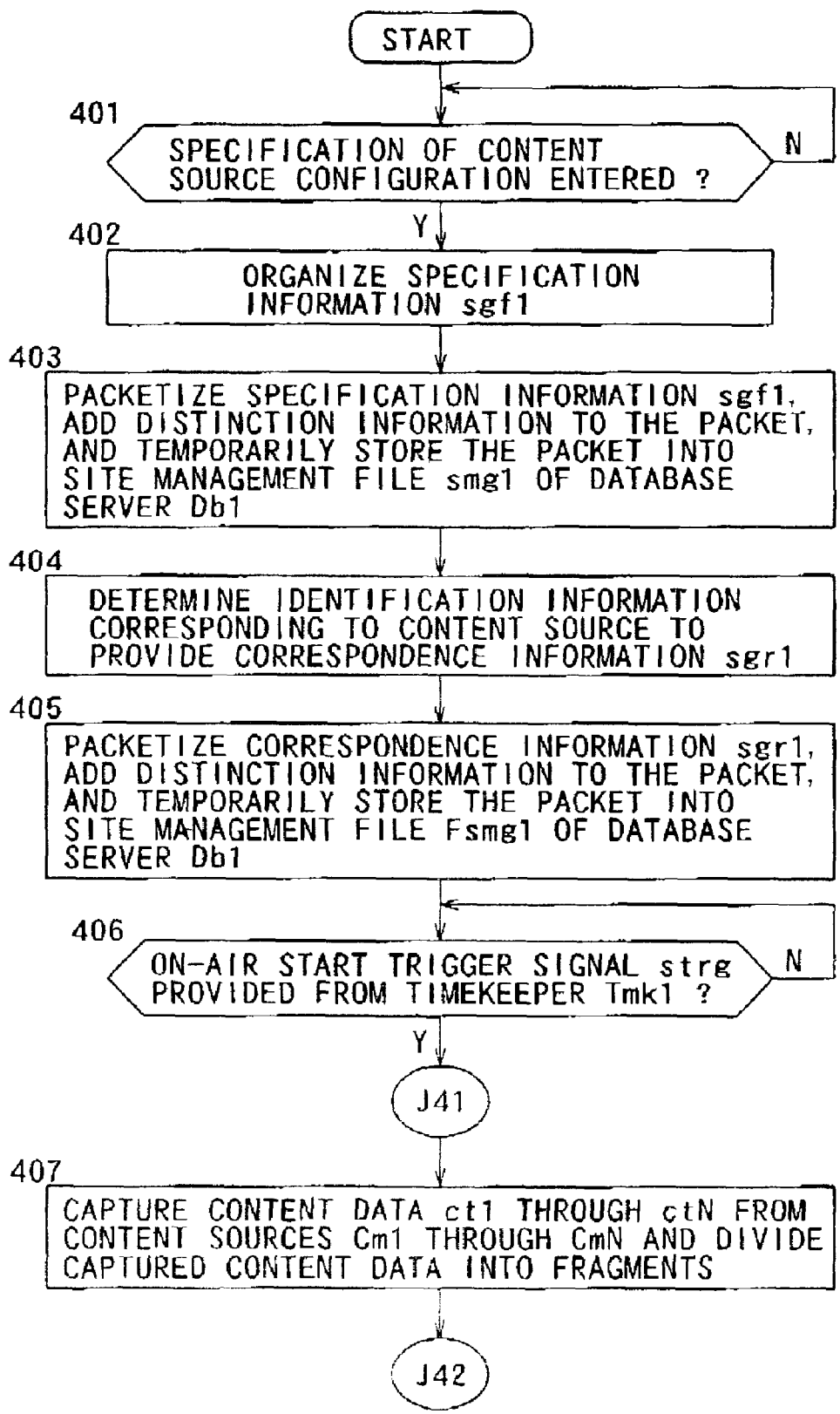
FIG. 4 is a flowchart describing operations of the network delivery data transmitting system shown in FIG. 2.
Figure 5:
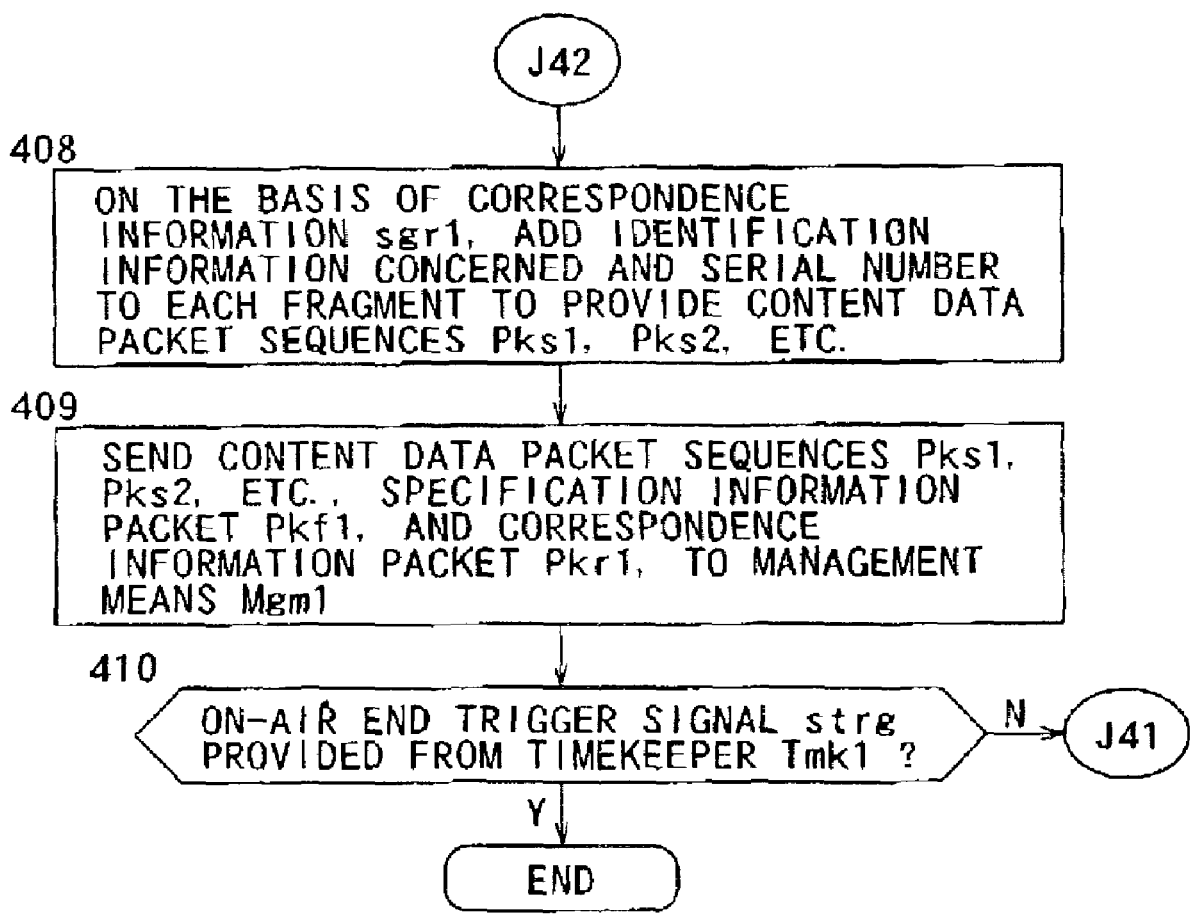
FIG. 5 is a flowchart continued from the flowchart shown in FIG. 4.
Figure 6:
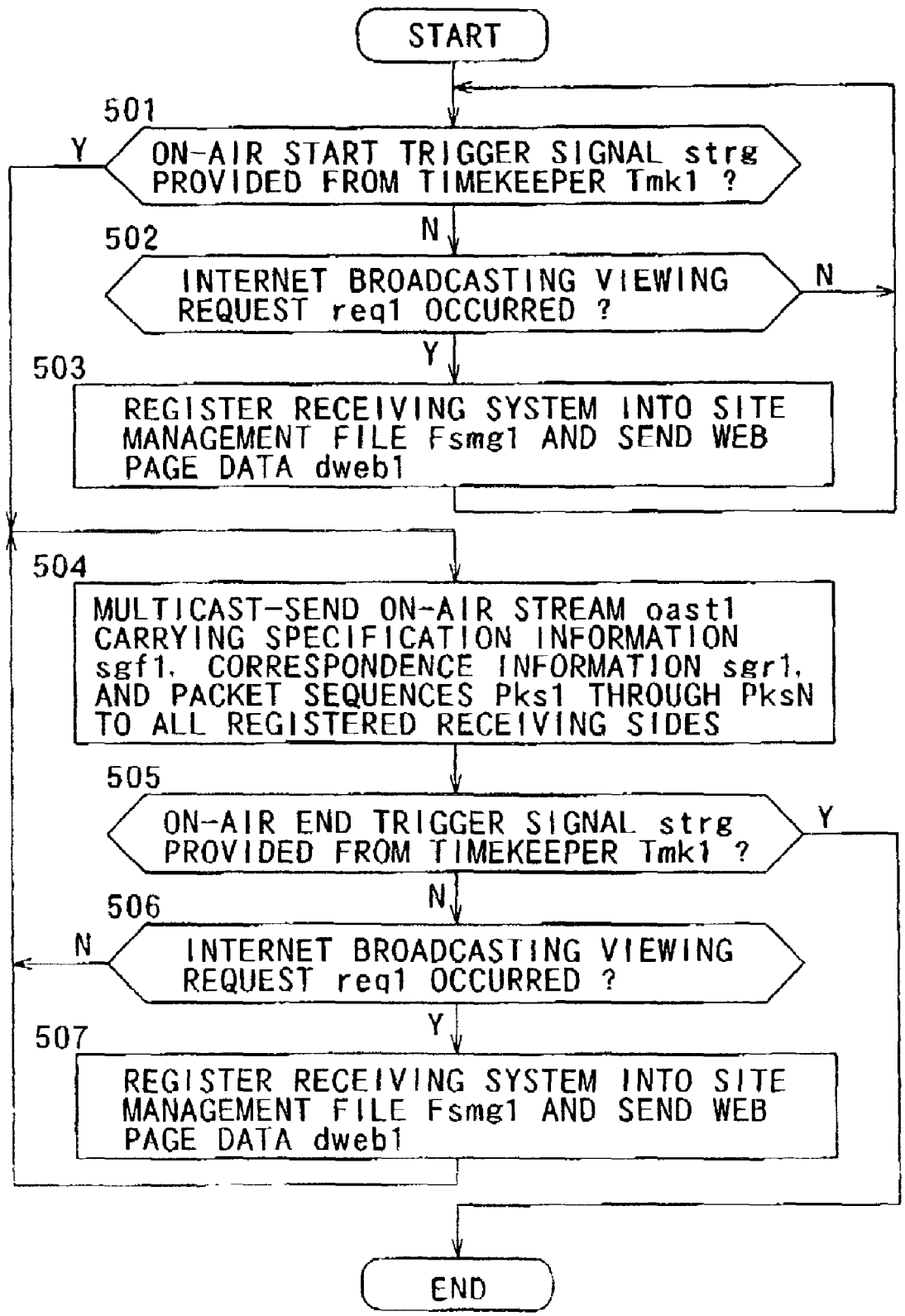
FIG. 6 is a flowchart continued from the flowchart shown in FIG. 5.

FIGS. 4 through 6 are flowcharts describing operations of the data transmitting system shown in FIG. 2.

Figure 7:
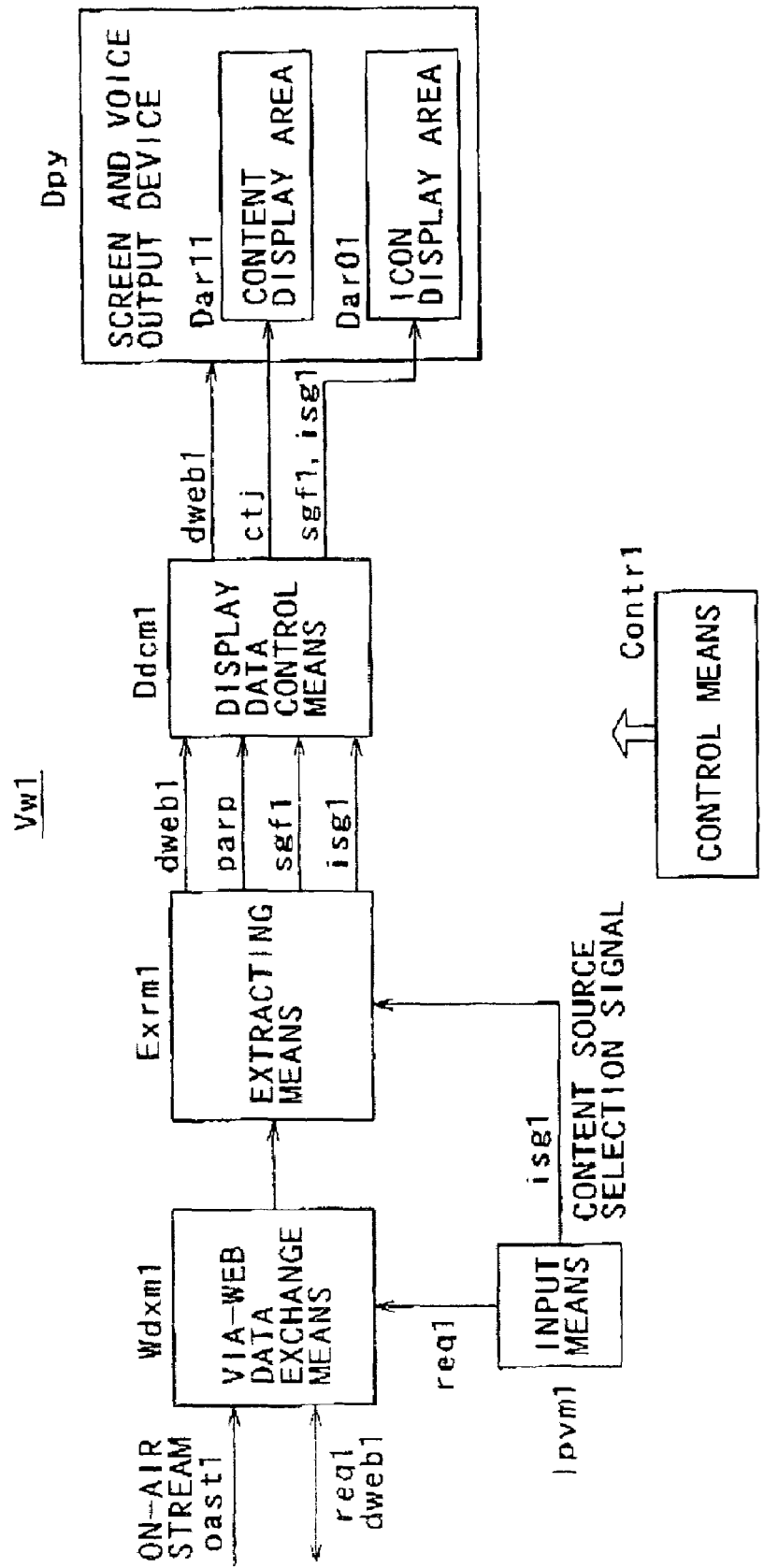
FIG. 7 is a block diagram illustrating a first embodiment of a network delivery data receiving system to which the network delivery receiving method associated with the present invention is applied.

FIG. 7 is a block diagram illustrating a first embodiment of a network delivery data receiving system associated with the invention to which the network delivery data receiving method associated with the invention is applied.

Figure 8:
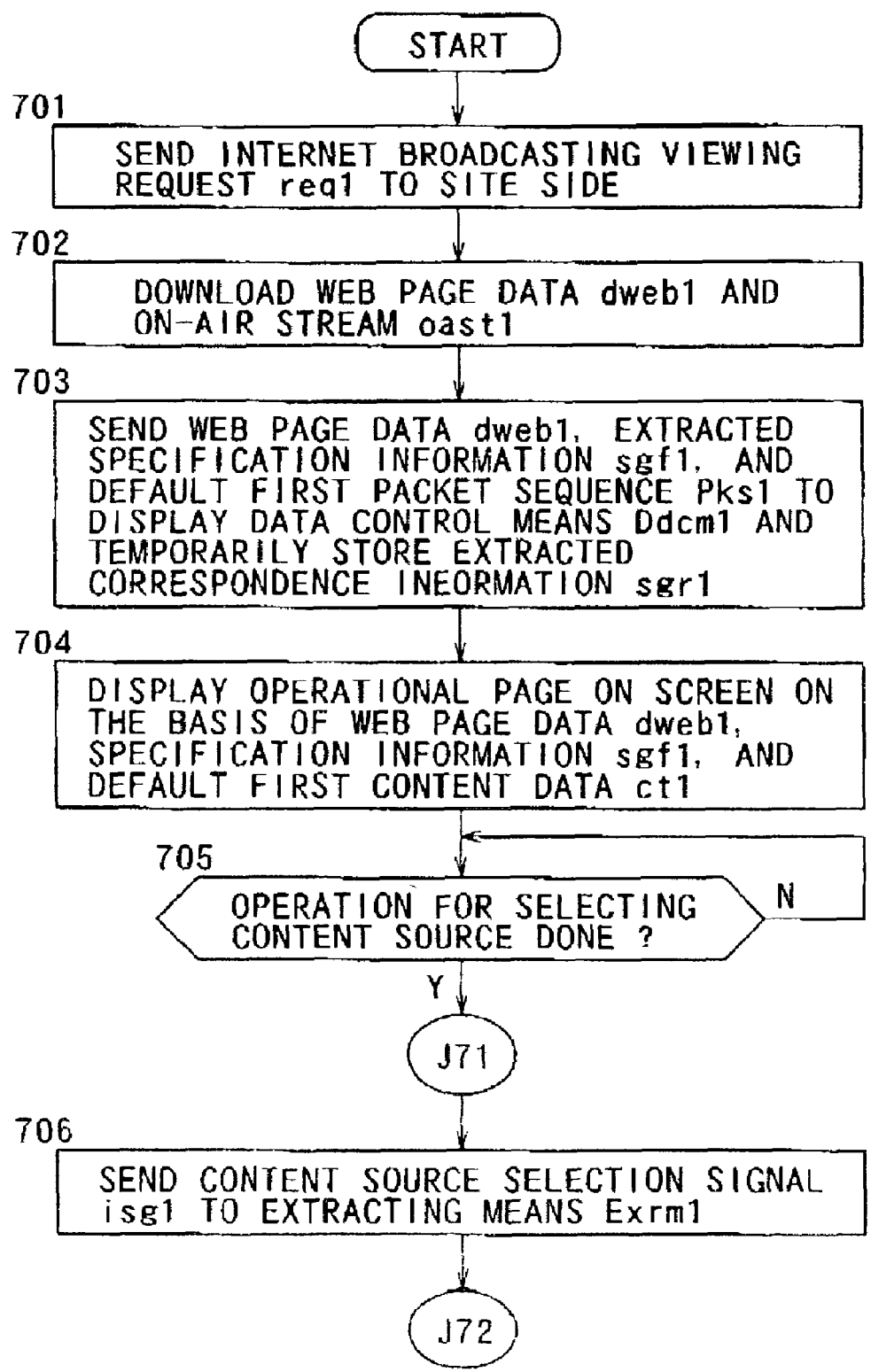
FIG. 8 is a flowchart describing operations of the network delivery data receiving system shown in FIG. 7.
Figure 9:
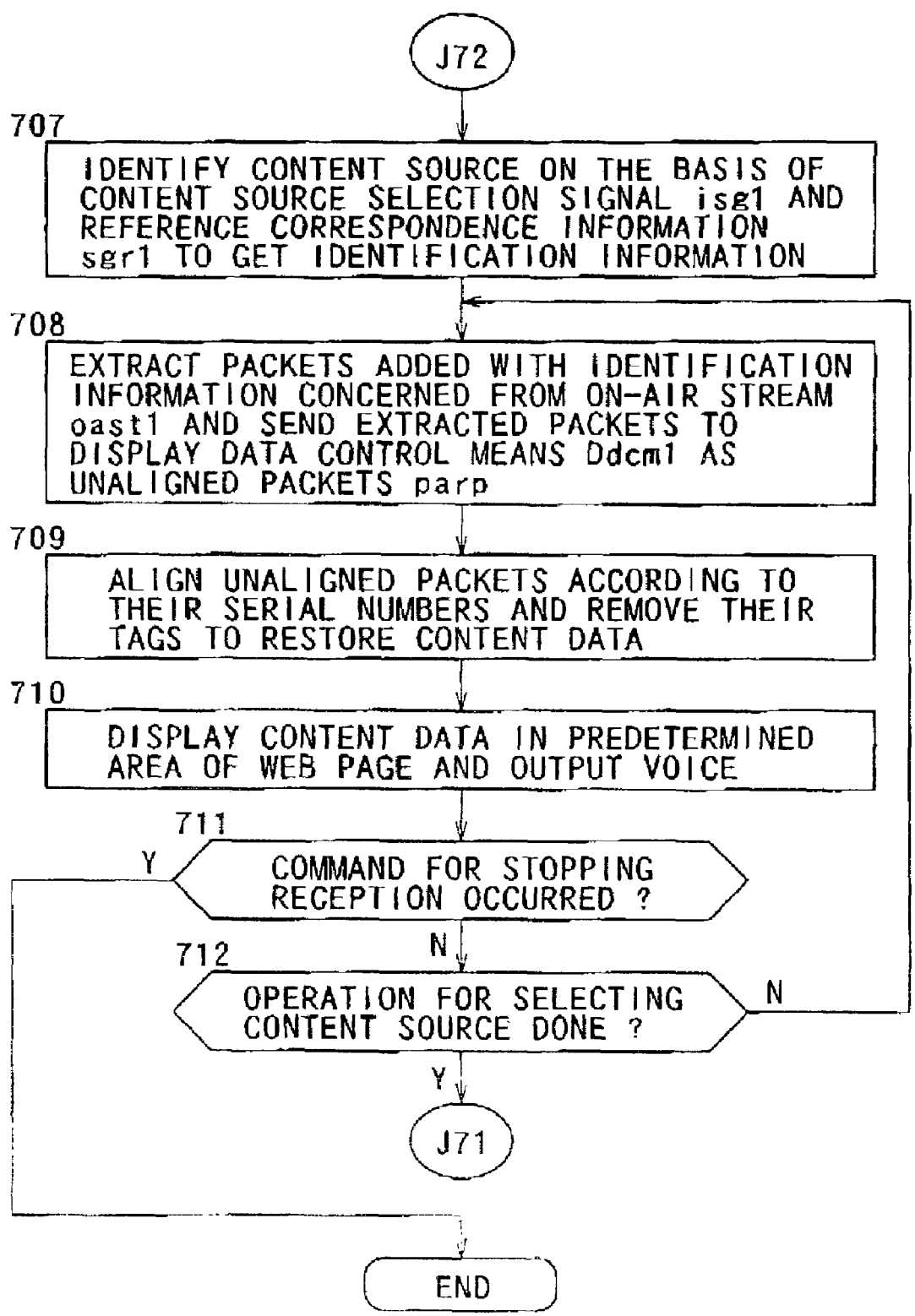
FIG. 9 is a flowchart continued from the flowchart shown in FIG. 9.

FIGS. 8 and 9 are flowcharts describing operations of the network delivery receiving system shown in FIG. 7.

Figure 10:
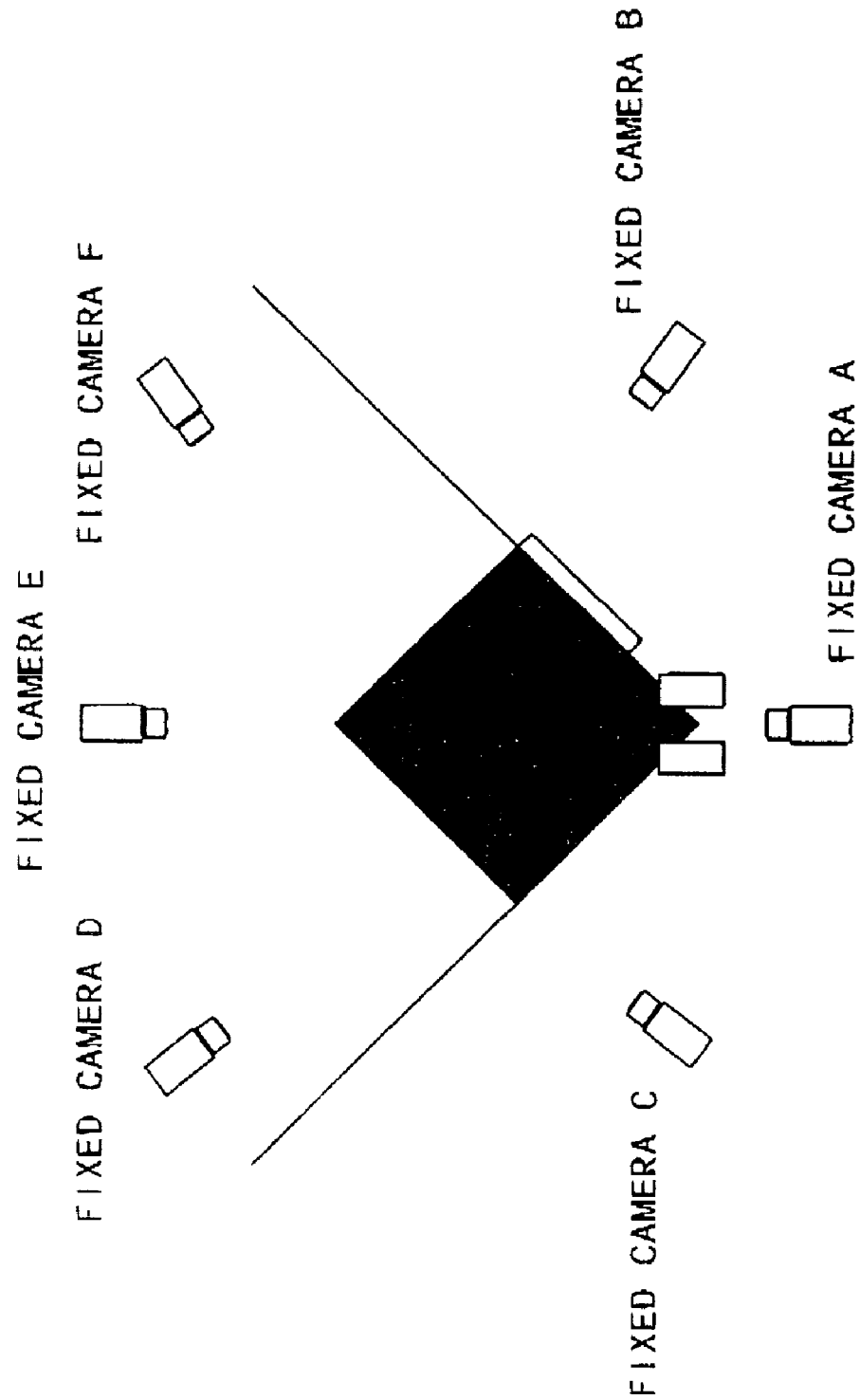
FIG. 10 illustrates a screen associated with content sources-which is displayed on the network delivery data receiving system.

FIG. 10 illustrates a screen associated with content source information to be displayed on the network distribution receiving system.

As shown in FIG. 1, in the first embodiment of the data transmitting method and receiving method based on network delivery associated with the invention, a data transmitting system (hereafter referred to simply as a "transmitting system," which holds the same with the other embodiments) Svs1 which is the data transmitting side, delivers broadcast programs having multi-content format to a receiving system Vw1 via a network NW.

Therefore, the transmitting system Svs1 configures each network delivery program by plural pieces of content data generated by plural content sources determined applicable.

Generally, in the transmitting system Svs1, the number of pieces and types of content data to be captured from content sources are many and various. In broadcasting a certain broadcast program, all of these content data are not always used. In the present embodiment, a first content source Cm1 through an N-th content source CmN are applicable and content data ct1 through ctN are used. Consequently, the transmitting system Svs1 put plural selected content data ct1 through ctN together onto one on-air stream oast1 for transmission. This allows the simultaneous transmission of plural content data ct1 through ctN.

This simultaneous transmission allows a viewer at the receiving system Vw1 which receives that program to select any one desired content from the received plural contents data ct1 through ctN.

For the viewer to select desired content data at the receiving system Vw1, it is necessary to notify the receiving system Vw1 of the information indicative of which content data from which content sources are carried by that program, namely the information about the applicable content sources Cm1 to CmN and content data ct1 to ctN.

In addition, in the receiving system Vw1, when making the viewer select content data from desired content sources, the information about the applicable content sources Cm1 through CmN must be sent to the viewer.

For example, in viewing an opera as one broadcast program, the viewer is notified of the information indicative of the positions and directions (or camera angles) of four imaging cameras (Cm1 through Cm4) for example. If the first camera Cm1 takes pictures of only the prema donna, the second camera Cm2 takes pictures of only the tenor who play opposite to the prema donna, the third camera Cm3 takes pictures of the entire stage, and the fourth camera Cm4 takes pictures of mainly the conductor and soloist in the orchestra box, for example, the viewer may reference the above-mentioned supplied information to select the video of desired content sources.

In the present embodiment, the above-mentioned information is sent from the transmitting system Svs1 to the receiving system Vw1 as "specification information sgf1." The specification information sgf1 describes the content sources used and its description for each content source. Obviously, this specification information sgf1 has the information of only the content sources used (in the above-mentioned example, Cm1 through Cm4).

On the basis of this specification information sgf1, the receiving system Vw1 can display a screen to selection. When the viewer selects, on this select screen, desired content sources with reference to the description included in the above-mentioned information, the receiving system Vw1 specifies the selected content sources.

Next, when a desired content (for example, Cm1) is selected by the viewer as described above, the receiving system Vw1 must extract content data ct1 corresponding to the content source Cm1 from the on-air stream oast1. In the present embodiment, this is supplied to the receiving system Vw1 as "correspondence information sgr1." The correspondence information sgr1 describes the content source used and its description for each content source. This allows the receiving system Vw1 to specify the identification information corresponding to the selected content source, thereby extracting the content data concerned (in this example, ct1) on the basis of the specified identification information.

The following describes a data configuration of the on-air stream oast1.

The transmitting system Svs1 divides first content data ct1 for example into packets, adds a tag t(1) including identification information i(1) and serial number n(1) to data part d(1) of each packet, and provides plural packets p(1) to organize a first packet sequence Pks1 in which these packets p(1) are arranged in time sequence. The identification information i(1) identifies that this program packet p(1) is associated with the first content source Cm1.

Likewise, the transmitting system Svs1 divides j-th content data ctj generated by each of the second and subsequent content data sources Cmj (j=2, 3, . . . , N) into packets, adds a tag t(j) including identification information i(j) and serial number n(j) to data part d(j) of each packet, and provides plural packets p(j) to organize j-th packet sequence Pksj in which these packets p(j) are arranged in time sequence. The identification information i(j) specifies that this packet p(j) is associated with the j-th contert source Cmj.

Further, the transmitting system Svs1 creates a specification information packet Pkf1 on the basis of the above-mentioned specification information sgf1 and a correspondence-information packet Pkr1 on the basis of the above-mentioned correspondence information sgr1, multiplexes these packets with packet sequences Pks1 through PksN into one on-air stream oast1, and delivers it via the network NW.

When the viewer selects a desired content source on the basis of the received specification information packet Pkf1 on the receiving system Vw1, the corresponding packet is extracted from the packet sequences Pks1 through PksN on the basis of the correspondence information packet Pkr1 and restores the content data. Consequently, the viewer can view the selected content data and switch between content data during viewing as required. Thus, the network delivery data are transmitted and received in the first embodiment.

The following describes a configuration and operations of the transmitting system Svs1.

The transmitting system Svs1 shown in FIG. 2 operates a Web site as a provider of Internet broadcasting services and performs multicast delivery by transmitting Internet broadcasting on-air content via an Internet organization INT as on-air stream oast1. Normally, in the Internet broadcasting, the provider side, or the transmitting system and the viewer side, or the receiving system are in "one-to-many" relation, so that there are two or more receiving systems. However, for the brevity of description, FIG. 2 shows only one receiving system Vw1.

In the present embodiment, the Internet organization INT comprises gateways GW, the Internet-backbones IntB, Internet service providers ISP, and a public switched line network PubN, thereby functioning as a two-way network suitable for packet network communication capable of mutlicasting based on open network. It should be noted that the configuration and operation of the Internet organization INT mentioned above are generally accepted and therefore their description will be omitted for the brevity of description.

From the receiving systems including the receiving system Vw1, signals such as Web site access requests and viewing requests reql are uploaded to the transmitting system Svs1 via the Internet organization INT. On the other hand, the Web page data dweb and on-air stream oast1 associated with operation of the Internet broadcasting services are downloaded from the transmitting system Svs1 to the receiving systems including the receiving system Vw1 via the Internet organization INT.

The transmitting system Svs1 is realized as network computer system having network connection functionality by applying a computer system based on a combination of mainframe computer, workstation, server, and personal computer, as a platform on the provider side. Each of these systems and apparatuses is configured by computer equipment units interconnected by an intranet or a LAN or configured as a multi-platform with the above-mentioned systems and apparatuses physically installed in a single computer unit. Therefore, transmitting system Svs1 has at least one processor (CPU), memory devices such as RAM and ROM, an input/output interface, and a bus, which are not shown, however, are also the components of each general-purpose computer system; therefore these components will not be described for the brevity of description.

The transmitting system Svs1 comprises an input means Iptm1, a correspondence information organizing means Crmp1, a specification information organizing means Spfm1, a timekeeper Tmk1, an on-air stream organizing means Oacm1 having functionality of receiving content data ct1 through ctN from plural content sources Cm1 through CmN, a management means Mgml, and a database server Db1.

The content sources Cm1 through CmN are each a device, system, or apparatus having functionality of generating content, which is constituted by an externally attached imaging camera and an externally attached or incorporated image generating device (for example, a CG/animation creating system), supplying generated content data ct1 through ctN to the on-air stream organizing means Oacm1. If the live coverage of a baseball game is used for example, six fixed cameras A through F are arranged around the game ground as content sources Cm1 through Cm6 as shown in FIG. 10, supplying six imaged and picked up content data ct1 through ct6 to the on-air stream organizing means Oacm1.

The input means Iptml is constituted by a user-operated device and software for performing an input operation; in computer systems, the input means Iptm1 is constituted for example by a general-purpose mouse, a general-purpose screen touchpad, and general-purpose input processing software in general. In accordance with an operation performed by the user, the input means Iptm1 supplies a management command associated with the starting of the transmitting system Svs1 for example to the management means Mgm1 as a management command input sbg11 and, at the same time, supplies, to the specification information organizing means Spfm1, the information for specifying which and how many content sources (Cm1 through CmN) are to be used and describing each content source to be used, as specification information command input sgb12.

For example, if all of fixed cameras A through F shown in FIG. 10 are used, the information specifying thereof and describing the position of each camera for example is supplied to the specification information organizing means Spfm1 as specification command input sgb12.

The specification information organizing means Spfm1 is provided as a program which is readable and executable by the above-mentioned CPU, sets the data describing each content source (Cm1 to CmN) on the basis of the specification command input sgb12, and supplies this information to the on-air stream organizing means Oacm1 as specification information sgf1.

The correspondence information organizing means Crpm1 is provided as a program which is readable and executable by the above-mentioned CPU, sets an identification number to each of the content sources to be used among the content sources (Cm1 through CmN) on the basis of the specification command input sgb13, and supplies the identification number to the on-air stream organizing means Oacm1 as correspondence information sgr1.

The timekeeper Tmk1 is a software timer and provided as a program which is readable and executable by the above mentioned CPU and manages the broadcasting start time specified by the management means Mgm1 for each on-air stream (for example, ocast1). When the broadcasting time for an on-air stream concerned has been reached, the timekeeper Tmk1 supplies a trigger signal strg to the on-air stream organizing means Oacm1 and the management means Mgm1.

The database server Db1 is constituted by a magnetic disk recording device and/or optical disk recording device, stores a content data file Fct1 for storing at least any of the content data ct1 through ctN supplied from the content sources Cm1 through CmN and a site management file Fsmg1 for recording and holding the management data associated with this Internet broadcasting service, and is accessed by the on-air stream organizing means Oacm1 for example for read/write operations.

The on-air stream organizing means Oacm1 is one embodiment of a transmission data organizing means according to the present invention and provided as a program which is readable and executable by the above-mentioned CPU to capture the content data ct1 through ctN supplied from the content sources Cm1 to CmN to be used. As required, the on-air stream organizing means Oacm1 may record and store any of the content data ct1 to ctN into a content file Fct1 of the database server Db1. Therefore, the on-air stream organizing means Oacm1 can get necessary content data ct1 to ctN from among the content data to be supplied in real time from the content sources Cm1 through CmN or the content data recorded to the database server Db1 at the on-air time.

On the basis of the above-mentioned specification information sfg1 supplied from the specification information organizing means Spfm1, the on-air stream organizing means Oacm1 organizes the specification information packet Pkf1 for describing each of the content sources Cm1 through CmN.

On the basis of the above-mentioned correspondence information sgr1 supplied from the correspondence information organizing means Crpm1, the on-air stream organizing means Oacm1 organizes the correspondence information packet Pkr1 for specifying the identification number of each of the content sources Cm1 to CmN to be used.

In addition, the on-air stream organizing means Oacm1 divides each of captured content data ct1 to ctN or read from the content file Fct1 of the database server Db1 into plural data fragments, adds a tag having at least identification information and serial number to each data fragment to provide a packet, and forms packet sequences Pks1 through PksN composed of these plural packets.

Next, upon reception of a trigger signal strg from the timekeeper Tmk1, the on-air stream organizing means Oacm1 organizes transmission data including the specification information packet Pkf1 and the correspondence information packet Pkr1 in addition to the above-mentioned plural packet sequences Pks1 through PksN and sends the resultant transmission data to the management means Mgm1.

The management means Mgm1 has a data line terminating device which is connected to the Internet organization INT for data exchange, provided as a computer program for controlling this device and others, manages and controls the entire operation of the Web site, organizes data carrying the screen and voice (GUI data) to be displayed and reproduced on the receiving system Vw1 and transmission information, and executes information exchange with the receiving system Vw1. In addition, the management means Mgm1 has a data encryption/decryption capabilities, not shown.

Upon reception of a viewing request req1 from the receiving system Vw1 via the Internet organization INT, the management means Mgm1 newly creates a customer file of the receiving system Vw1 on the site management file Fsmg1 or updates the existing customer file, and then sends the Web page data dweb1 to the receiving system Vw1 via the Internet organization INT. The exchange of the above-mentioned viewing request req1 and Web page data dweb1 is performed in compliance with the RTSP standard associated with both-way communication.

Further, upon reception of a trigger signal strg from the timekeeper Tmk1 at the broadcasting start time, the management means Mgm1 creates an on-air stream oast1 carrying the above-mentioned packet group (specification information packet Pkf1, correspondence information packet Pkr1, and plural packet sequences Pks1 through PksN) on the basis of the transmission data supplied from the on-air stream organizing means Oacm1 and transmits this on-air stream to the receiving system Vw1 via the Internet organization INT. The transmission of this on-air stream oast1 is performed in compliance with the RTP/RTCP standard associated with video and audio streaming.

The following describes communication protocols which is applied to the communication between the transmitting system Svs1 and each receiving system, the receiving system Vw1 for example via the Internet organization INT.

In the present embodiment, for a delivery protocol for Internet streaming, the realtime media transfer standard RTP/RTC for use on the Internet is used for example. For a demand control protocol for use on the Internet, a video and audio realtime service control standard RTSP is used for example.

FIG. 3 illustrates the layer structure of the above-mentioned protocols.

RTP/RTCP and RTSP exist on the transmission network physical layer and the ATM, AAL5, IP, and TCP/UDP layers and perform such capabilities as the operation clock synchronization between sending side and receiving side necessary for the realtime transmission of video and audio data, the media synchronization between video and audio, and the multiplexing of plural video and audio channels for example. The on-air stream oast1, which is a real-time stream of video and audio data, is one-way received in compliance with RTP/RTCP and the command information such as viewing request req1 and the file information associated with a cookie to be described later are both-way exchanged in compliance with RTSP. It should be noted that AAL5 (ATM Adaptation Layer 5) is one form of the ATM adaptation layer for realizing the transmission of variable-length packet data.

It should be noted that the above-mentioned configuration may be changed so that parts of the above-mentioned information carried on the on-air stream oast1, the correspondence information sgr1 and the specification information sgf1 for example, are supplied to the receiving system Vw1 in compliance with RTSP.

The following describes the operation of the transmitting system Svs1, FIGS. 4 and 5 mainly show the flowcharts describing the main operation associated with the on-air stream organizing means Oacm1. FIG. 6 is a flowchart describing the main operation associated mainly with the management means Mgm1.

In step 401, the input means Iptm1 waits until the user specifies a content source to be used and enters the specification. When the specification is entered, the input means Iptm1 sends specification command input sgb12 for specifying a content source to be used to the specification information organizing means Spfm1 and correspondence specification input sgb13 associated with the correspondence between content source and identification information to the correspondence information organizing means Crpm1.

In step 402, the specification information organizing means Spfm1 organizes the specification information sgf1 on the basis of the specification command input sbg12 and supplies the organized information to the on-air stream Organizing means Oacm1. On the basis of the received specification information sgf1, the on-air stream organizing means Oacm1 organizes the specification information packet Pkf1 attached with distinction information (distinguishing that this information is the specification information sgf1) in step 403 and temporarily stores the organized packet in a temporary file (not shown) of the database server Db1.

On the basis of the received correspondence specification input sgb13, the correspondence information organizing means Crpm1 organizes correspondence information sgr1 in step 404 and supplies the organized information to the on-air stream organizing means Oacm1. On the basis of the receiving correspondence information sgr1, the on-air stream organizing means Oacm1 organizes a correspondence information packet Pkr1 attached with distinction information (distinguishing that this information is the correspondence information sgr1) in step 405 and temporarily stores the organized packet in the temporary file of the database server Db1.

It should be noted that steps 402 and 404 may be executed in parallel. If the correspondence information packet or the specification information packet is constituted by plural packets serial numbers are added to them.

If the specification information sgf1 is set, a content source to be used is determined; therefore the above-mentioned configuration may be changed so that the correspondence specification input sgb13 by the user is skipped and the corresponding information organizing means Crpm1 automatically sets appropriate identification information (for identifying the correspondence with each content source) by with reference to the specification information, thereby forming the correspondence information sgr1.

Next, the on-air stream organizing means Oacm1 enters a decision loop (step 406) for determining whether the broadcasting start time has been reached. This decision is made on the basis of a trigger signal strg supplied from the timekeeper Tmk1 at the time of starting the on-air stream concerned (in this example, the on-air stream oast1). Receiving the trigger signal strg, the on-air stream organizing means Oacm1 captures predetermined plural content data ct1 through ctN in step 407. This capturing is performed by the real-time capturing from any of content sources Cm1 through CmN and/or the reading from the content file Fct1 of the database server Db1. The captured content data ct1 to ctN are divided into fragments.

On the basis of the correspondence information sgr1, the on-air stream organizing means Oacm1 adds the identification information and serial number to each fragment in step 408 to form packets and arranges these packets in time sequence to organize packet sequences Pks1 through PksN. Packet sequences are organized for all of plural pieces of content applied to the broadcast program concerned. In step 409, the on-air stream organizing means Oacm1 sends all packet sequences Pks1 through PksN organized as described above and the temporarily stored specification information packet Pkf1 and correspondence information packet Pkr1 to the management means Mgm1.

Then, the on-air stream organizing means Oacm1 checks if the trigger signal stgr for ending on-air time has arrived from the timekeeper Tmk1 in step 410. It this trigger signal is found not arrived, the on-air stream organizing means Oacm1 determines that on-air is continued and returns to step 407 to repeat the above-mentioned processing therefrom, if the trigger signal is found arrived, then the on-air stream organizing means Oacm1 ends the above-mentioned processing.

As shown in FTG. 6, the management means Mgm1 checks if the trigger signal stgr indicative of a broadcasting start time has arrived from the timekeeper Tmk1 in step 501 or not. If this trigger signal is found not arrived, the management means Mgm1 determines that it is before broadcasting start and goes to step 502 to enter a loop for checking if a viewing request req1 for Internet broadcasting viewing from the receiving system Vw1 has newly occurred. If a new request is found, then the management means Mgm1 accepts this request in step 503 and customer-registers the request into the site management file Fsmg1, Then, the management means Mgm1 sends the Web page data dweb1 retrieved from the site management file Fsmg1 to the registered receiving system Vw1, upon which the management means Mgm1 returns to step 501 Thus, the management means Mgm1 continues the new customer acceptance and registration and the transmission of Web page data associated with the operation until the on-air start time comes.

On the other hand, if the broadcasting start time comes in step 501, the management means Mgm1 multicast-transmits the on-air stream oast1 obtained by multiplexing the plural packet sequences Pks1 through PksN, the specification information packet Pkf1, and correspondence information packet Pkr1 to the receiving system Vw1 in step 504, thereby starting the Internet broadcasting.

In step 505, the management means Mgm1 checks if the trigger signal stgr indicative of the end of broadcasting time has arrived from the timekeeper Tmk1. If this trigger signal is not found, the management means Mgm1 determines that the on-air time continues and goes to step 506. If this trigger signal is detected, the management means Mgm1 determines that the on-air time has ended, thereby ending the above-mentioned processing.

In step 506, the management means Mgm1 checks if a new viewing request has occurred after starting the Internet broadcasting. If no new viewing request is found, the management means Mgm1 returns to step 504. If a new viewing request is found, the management means Mgm1 accepts this request in step 507, customer-registers this request into the site management file Fsmg1 and immediately sends the Web page data dweb1 retrieved from the site management file Fsmg1 to the receiving system Vw1, upon which the management means Mgm1 returns to step 504.

Thus, the transmitting system Svs1 is configured and operates.

It should be noted that, the supply of correspondence information and specification information to the receiving system side may be configured so that these items of information are supplied from a Web site for example as non-realtime data, in addition to the above-mentioned transmission by carrying these information items on a on-air stream as realtime data. Essentially, correspondence information and specification information may only be supplied in the processing of on-air stream on the receiving system side and therefore the routes for this supply are not restricted in any manner.

The following describes the configuration and operation of the receiving system Vw1 with reference to FIG. 7.

The receiving system Vw1 is mainly realized as a household Internet service compatible apparatus such as a network connectable system including a personal computer, an Internet compatible television receiver, an Internet compatible mobile telephone, an Internet compatible mobile information terminal, and so on. The receiving system Vw1 accesses Web sites operated by the transmitting system Svs1, an Internet broadcasting service provider, via the Internet organization INT to receive a multicast-delivered on-air stream oast1. Therefore, receiving system Vw1 has at least one processor (CPU), memory devices such as RAM and ROM, an input/output interface, and a bus, which, however, are also the components of each general-purpose computer system; therefore these components will not be described for the brevity of description.

The receiving system Vw1 comprises an input means Ipvm1, a via-Web data exchange means Wdxm1 (hereafter referred to simply as a data exchange means Wdxm1), an extracting means Exrm1, a display data control means Ddcm1, a screen and voice output device Dpy, and a control means Contr1.

The Web data exchange means Wdxm1 is one embodiment of the data exchange means according to the present invention. The extracting means Extm1 and the display data control means Ddcm1 are embodiments of the data processing means according to the present invention. The screen and voice output device Dpy is one embodiment of the output means according to the present invention.

Although not shown, the receiving system Vw1 may have a recording apparatus (a so-called home server) based on a mass storage magnetic disk device for example for recording and storing content data and so on.

The input means Ipvm1 is constituted by a user-operated device and software for performing an input operation; in computer systems, the input means Ipvm1 is constituted for example by a general-purpose mouse, a general-purpose screen touchpad, and general-purpose input processing software in general.

When the viewer logs in the Internet provider and accesses a Web site, the input means Ipvm1 supplies login command input log1 to the Web data exchange means Wdxm1. Next, when the viewer performs form input to view the Internet broadcasting, the input means Ipvm1 issues a viewing request req1 to the Web data exchange means Wdxm1. When the viewer specifies a desired content source from a site operation screen (or a top page), the input means Ipvm1 supplies a content source selection signal isg1 to the extracting means Extm1.

The Web data exchange means Wdxm1 has a data line terminating device connected to the Internet organization INT for data transfer and is provided as a computer program including the control thereof, performing data exchange with the Web site via the Internet provider. To be more specific, the Web data exchange means Wdxm1 issues a login request to the Internet provider and a viewing request req1 for viewing Internet broadcasting to the site side to receive site operation screen data dweb1 and an on-air stream oast1. The received data are sent to the extracting means Extm1.

The extracting means Extm1, provided as a program which is readable and executable by the above-mentioned CPU, sends the site operation screen data dweb1 supplied from the Web data exchange means Wdxm1 to the display data control means Ddcm1 and extracts specification information sgf1 from the specification information packet Pkf1 carried on the on-air stream oast1 supplied from the Web data exchange means Wdxm1 to send the extracted specification information sgf1 to the display data control means Ddcm1. In addition, the extracting means Extm1 extracts correspondence information sgr1 from a correspondence information packet Pkr1 and temporarily stores the extracted correspondence information sgr1.

Further, on the basis of a content source selection signal isg1 supplied from the input means Ipvm1, the extracting means Extm1 gets the identification information concerned by referencing correspondence information sgr1, extracts packets p(j) having matching identification information i(j) from packet sequences Pks1 through PksN carried on the on-air stream oast1, and supplies these plural packets p(j) to the display data control means Ddcm1 as plural unaligned packets parp.

The display data control means Ddcm1, provided as a program which is readable and executable by the above-mentioned CPU, performs data adjustment so that data are displayed in full screen on the screen and voice output device Dpy on the basis of the site operation screen data dweb1 supplied from the extracting means Extm1 and sends the adjusted data to the screen and voice output device Dpy. Likewise, on the basis of the specification information sgf1, the display data control means Ddcm1 performs data adjustment so that the data are displayed in an icon display area Dar01 on the site operation screen and supplies the adjusted data to the screen and voice output device Dpy.

Further, the display data control means Ddcm1 aligns the plural unaligned packets parp supplied from the extracting means Extm1 in accordance with their serial numbers n(j), removes the tags therefrom to restore the content data ctj, performs data adjustment so that the restored content data are displayed in a display area Dar11 on the screen of the screen and voice output device Dpy, and supplies the adjusted data to the screen and voice output device Dpy.

The screen and voice output device Dpy has a flat panel screen (a liquid crystal display, a plasma display, or an EL display for example) or a CRT monitor, displays site operation screen data dweh1 in full screen, specification information sgf1 in the icon display area Darol inside the screen, and content data ctj in the content display area Dar11 inside the screen.

The control means Contr1, provided as a program which is readable and executable by the above-mentioned CPU, controls the operations of the entire receiving system Vw1.

The following describes the operation of the receiving system Vw1 with reference to FIG. 8 and FIG. 9. It is assumed that the login to the service provider has already been made.

In step 701, on the basis of a command supplied from the input means Ipvm1, the Web data exchange means Wdxm1 sends an Internet broadcasting viewing request req1 to the site side. In step 702, the Web data exchange means Wdxm1 downloads web page data dweb1 and on-air stream oast1 and sends them to extracting means Exrm1.

In step 703, the extracting means Exrm1 sends web page data dweb1 to the display data control means Ddcm1, extracts specification information sgf1 from the specification information packet Pkf1 carried on the on-air stream oast1 and extracts default of specified first packet sequence Pks1, sending them to the display data control means Ddcm1. in addition, the extracting means Exrm1 extracts correspondence information sgr1 from the correspondence information packet Pkr1 and temporarily stores it.

In step 704, on the basis of the Web page data dweb1, the display data control means Ddcm1 displays the operational page on the screen and voice output device Dpy in full screen, specification information sgf in the icon display area Dar01 on the operational screen, restores first content data ct1 from the first packet sequence Pks1, and displays the restored content data in the content display area Dar 11 on the operational page.

It should be noted that the first content data ct1 are moving picture and voice; therefore, display data control means Ddcm1 has the capabilities of reproducing moving picture and voice as a helper application or plug-in software program in addition to the browser capability based on HTML format.

Thus, the icon display area Dar01 on the screen shows the information about content sources (for example, plural television cameras) in use by the broadcast program concerned and the content display area Dar11 reproduces a default content source, the video and audio by the first television camera in this example, thereby starting the receotion of Internet broadcasting.

The following details an example of the information about content sources which are displayed in the icon display area Dar01 on the basis of specification information sgf1 with reference to FIG. 10. In this example, the number of fixed television cameras and imaging directions and the setting positions of these cameras are displayed in an overhead view as the content sources for a live coverage of baseball game. The display portions of six fixed cameras A through F in the figure are formed as icons for specification or selection. By clicking these icons with a cursor (not shown) on the screen, desired content sources may be selected. Alternatively, a touchpad configuration may be used.

Specification information sgf1 is organized as data on the transmitting side, which can display the overhead view and clickable icon configuration and are sent to the receiving system Vw1.

The following describes the processing of step 705 and subsequent steps with reference to FIG. 8 again.

Currently, the first content data ct1 captured by the fixed camera A are displayed as default in video and audio in the content display area Dar11. When the viewer clicks any of the fixed camera B through F icons of the select icons displayed in icon display area Dar01, the input means Ipvm1 detects this select operation in step 705, generates a content source selection signal isg1, and sends it to the extracting means Extm1 (step 706).

In step 707, the extracting means Exrm1 specifies the content source selected on the basis of the content selection signal isg1 and gets the identification information of this content source by referencing the correspondence information sgr1. In step 708, the extracting means Exrm1 extracts packets added with this identification information from the on-air stream oast1 and sends the extracted packets to the display data control means Ddcm1 as an unaligned packets parp.

In step 709, the display data control means Ddcm1 aligns the unaligned packets parp in accordance with their serial numbers and remove their tags to restore the content data. In step 710, the display data control means Ddcm1 displays the content data in the content data display area Dar11 in video and audio. Thus, when the viewer clicks the icon, the current displaying and sounding of content data display is immediately automatically switched to the displaying and sounding of the selected content data.

Next, the control means control determines whether or not a command for stopping the reception by the viewer or a command for stopping the reception by an incorporated timer for example has been issued (step 711). If the reception is continuing, the control means Contr1 goes to step 712. It a select operation by the viewer is found, the control means Contr1 returns to step 706; otherwise, the control means Contr1 returns to step 708 to repeat the processing therefrom. On the other hand, if the command for stopping the reception is found in step 711, the processing comes to an end.

The processing in the above-mentioned steps is executed under the control of the control means Contr1.

Thus, the receiving system Vw1 is configured and operates.

According to the above-mentioned embodiments, the following advantages are obtained.

(1) Packetizing plural pieces of content data generated from plural content sources and transmission of resultant packets on the Internet organization allows a bulk transmission of plural pieces of content data to each receiving system. This allows the transmission/reception of network delivery data based on multiple packet sequences, the transmission/reception of the Internet broadcasting based on multiple packet sequences for example.

In addition, the configuration in which the transmitting system supplies specification information and correspondence information to each receiving system provides the following advantages.

(2) The receiving system displays on the screen the information associated with content sources by use of specification information, so that the viewer can select desired content sources with ease.

(3) The receiving system can get the identification information corresponding to the content source selected by the viewer by referencing correspondence information.

(4) The receiving system extracts only the packets of which identification information in their tags matches the above-mentioned corresponding identification information, so that necessary packets can be obtained.

(5) The receiving system aligns plural packets in accordance with their serial numbers in their tags, so that desired content data can be restored.

Consequently, the present invention can simultaneously provide and receive multiple content data and, at the same time, realize Internet broadcasting services which are high in freedom of selection of content data on the receiving side.

The following describes a second embodiment of the network delivery data transmitting method and data receiving method associated with the present invention and a second embodiment of the network delivery data transmitting system and data receiving system to which these methods are applied respectively.

Figure 11:
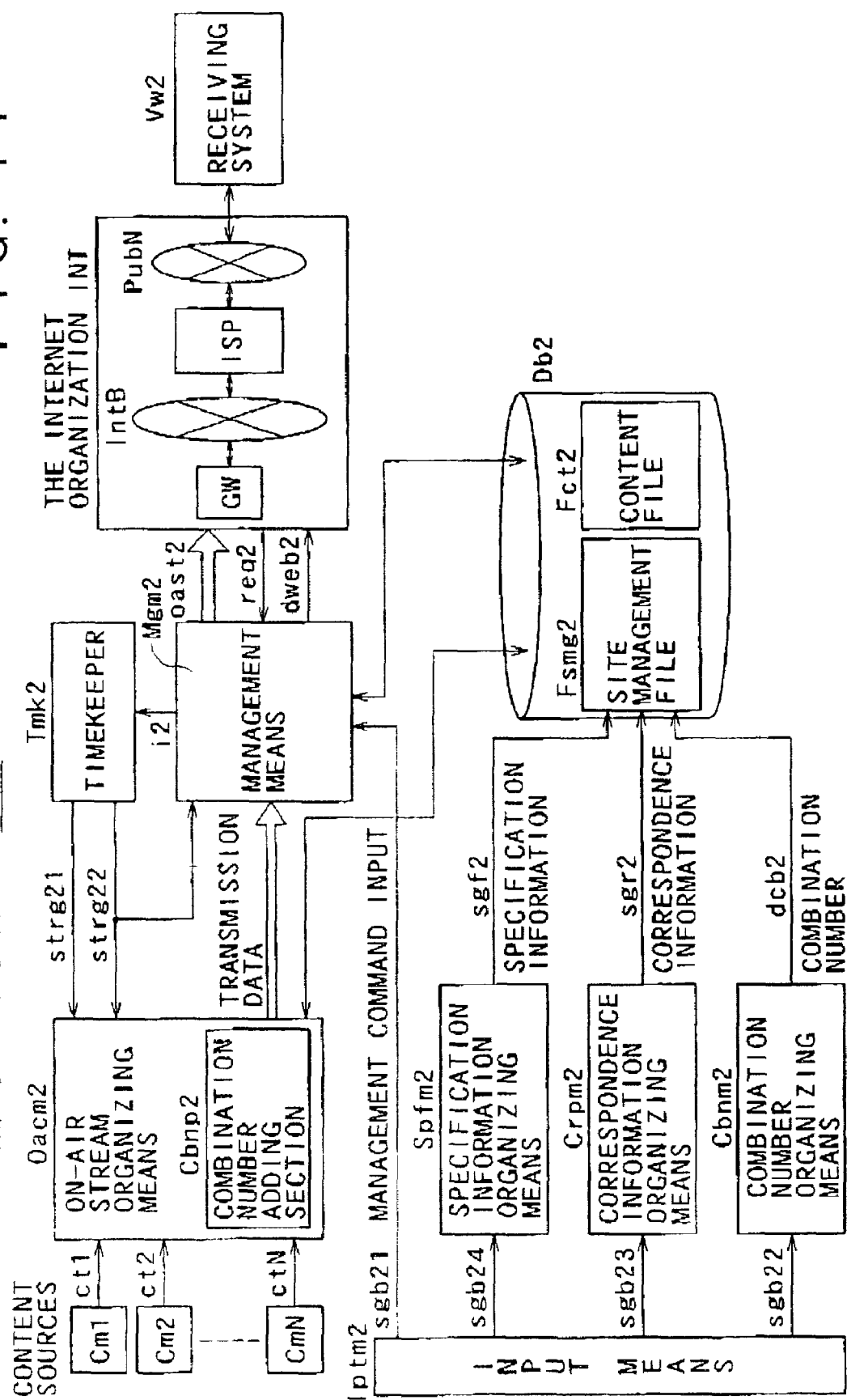
FIG. 11 is a block diagram illustrating a second embodiment of the network delivery data transmitting system to which a second embodiment of the network delivery data transmitting method is applied.

Referring to FIG. 11, there is shown a block diagram illustrating the second embodiment of the network delivery data transmitting system to which the second embodiment of the network delivery data transmitting method is applied.

Figure 12:
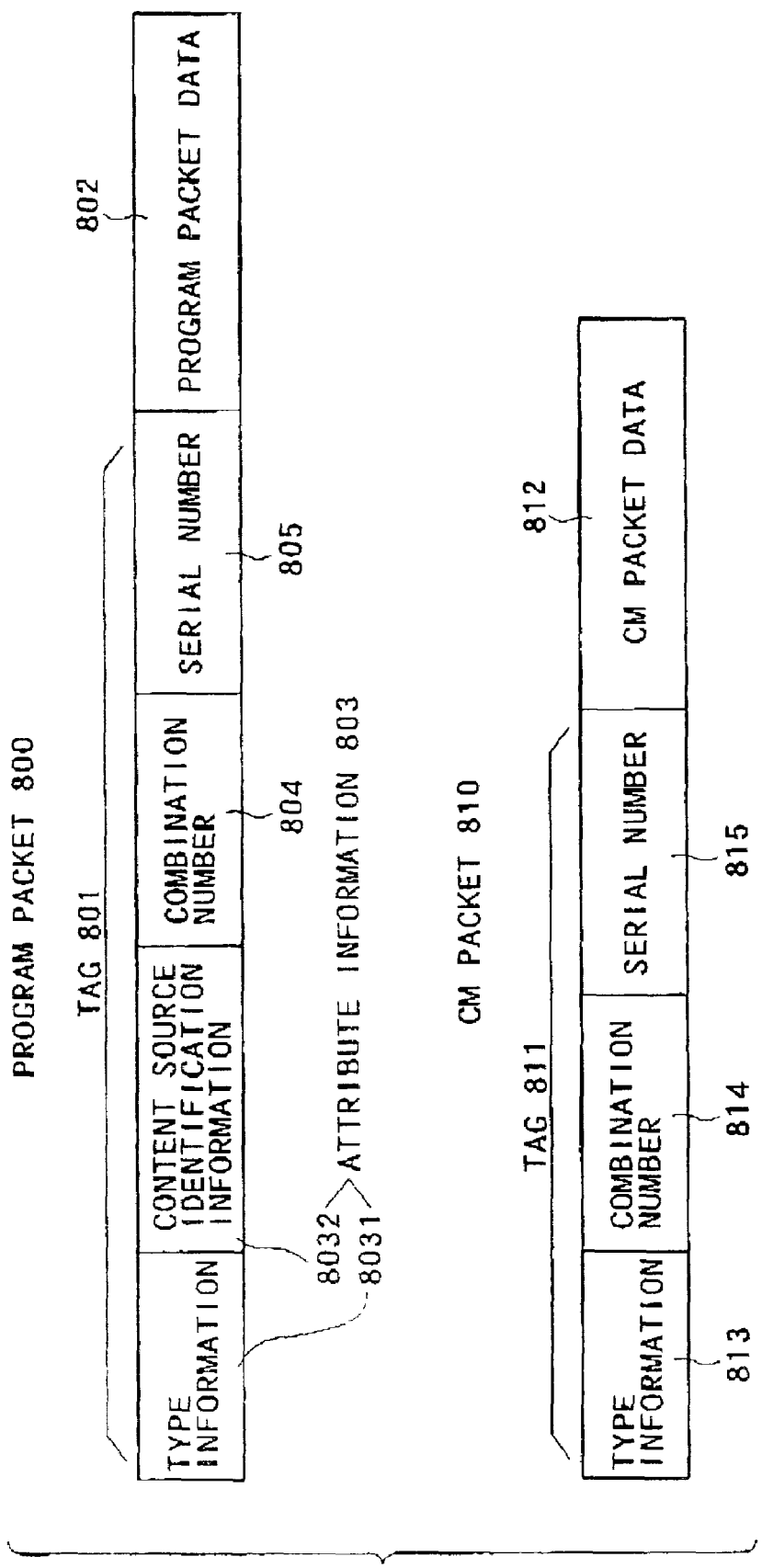
FIG. 12 illustrates packet configurations.

FIG. 12 illustrates packet configurations.

Figure 13:
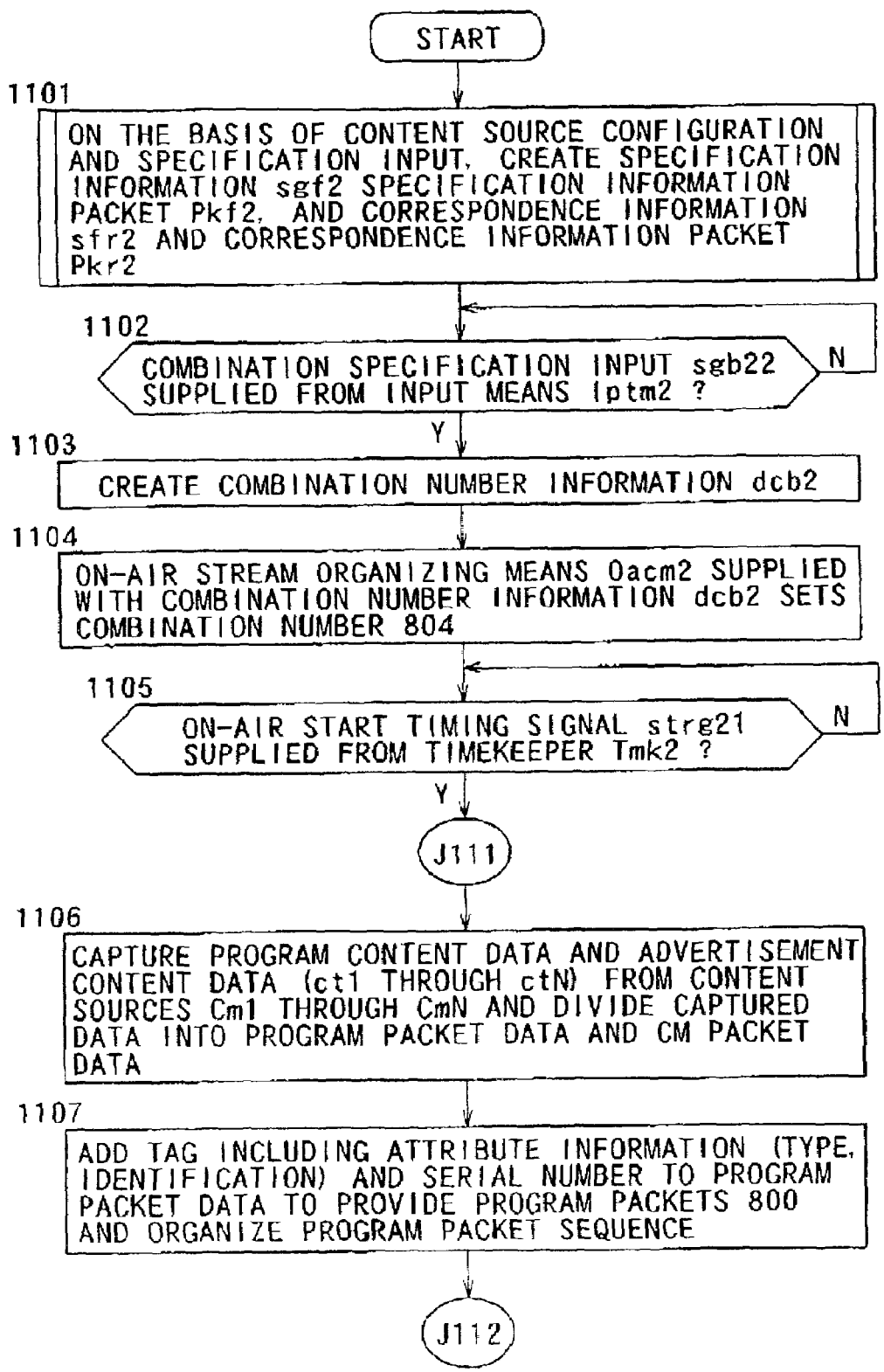
FIG. 13 is a flowchart describing operations of the network delivery data transmitting system shown in FIG. 11.
Figure 14:
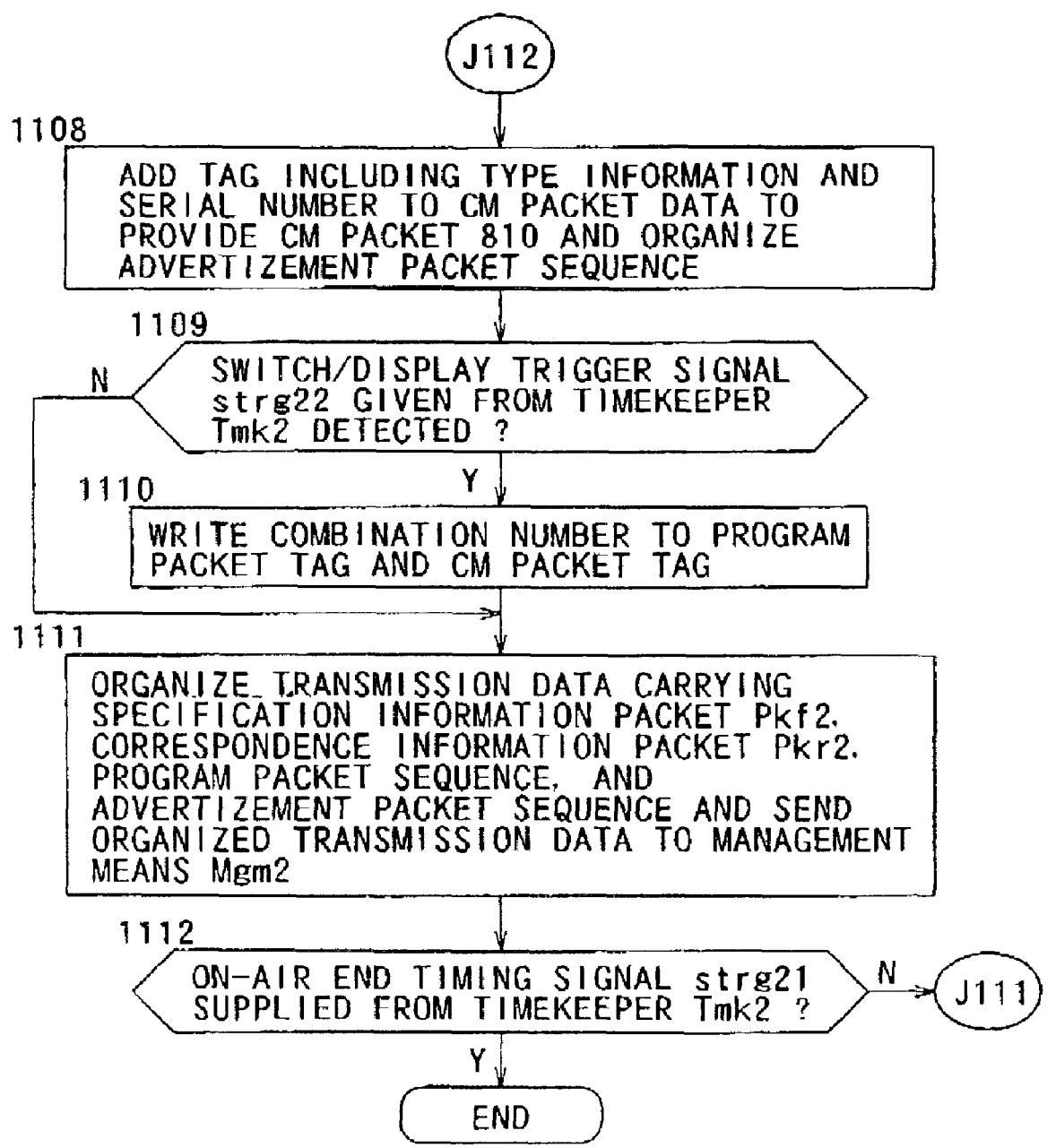
FIG. 14 is a flowchart continued from the flowchart shown in FIG. 13.
Figure 15:
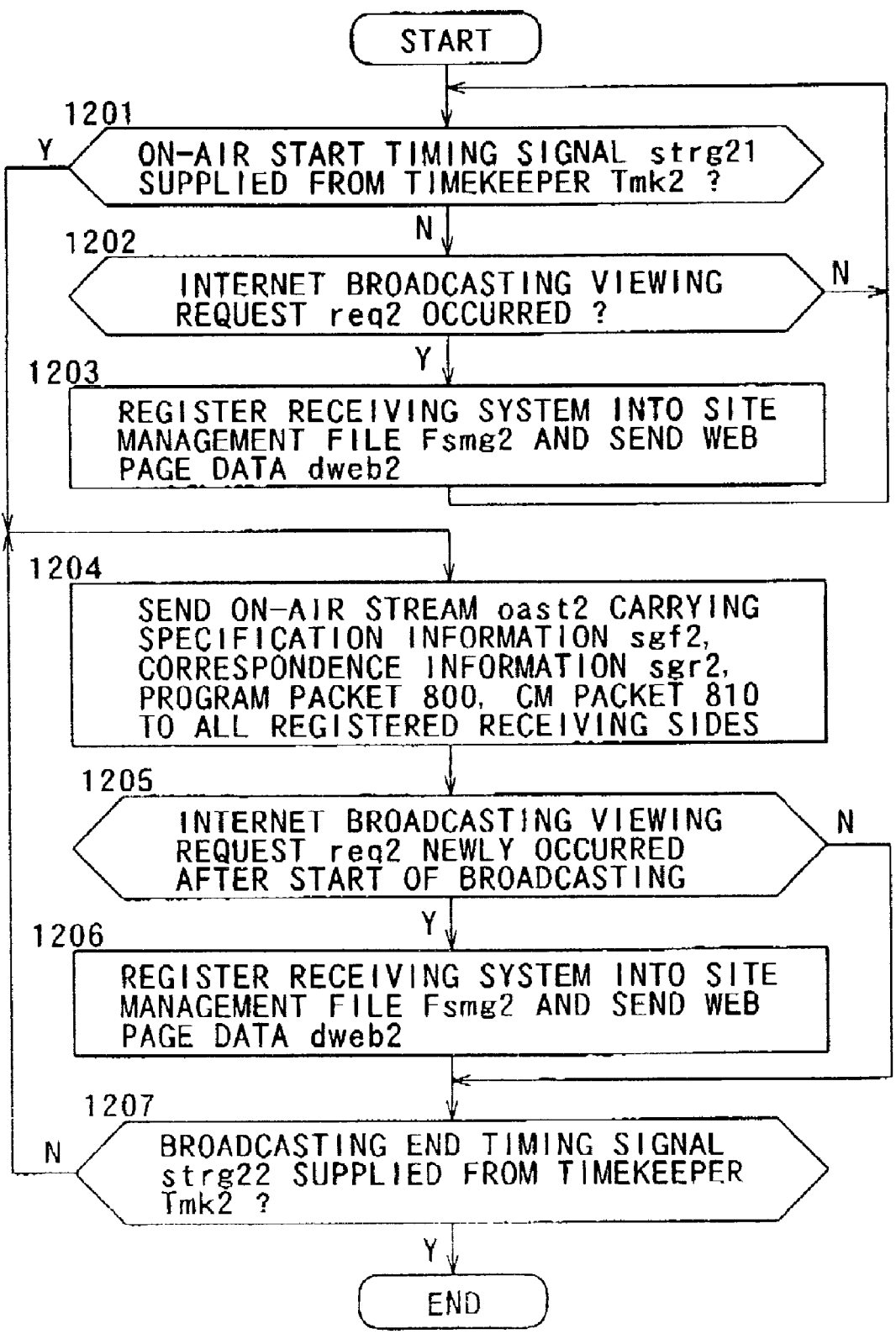
FIG. 15 is a flowchart continued from the flowchart shown in FIG. 14.

FIGS. 13 through 15 are flowcharts describing operations of the data transmitting system based on network delivery shown in FIG. 11.

Figure 16:
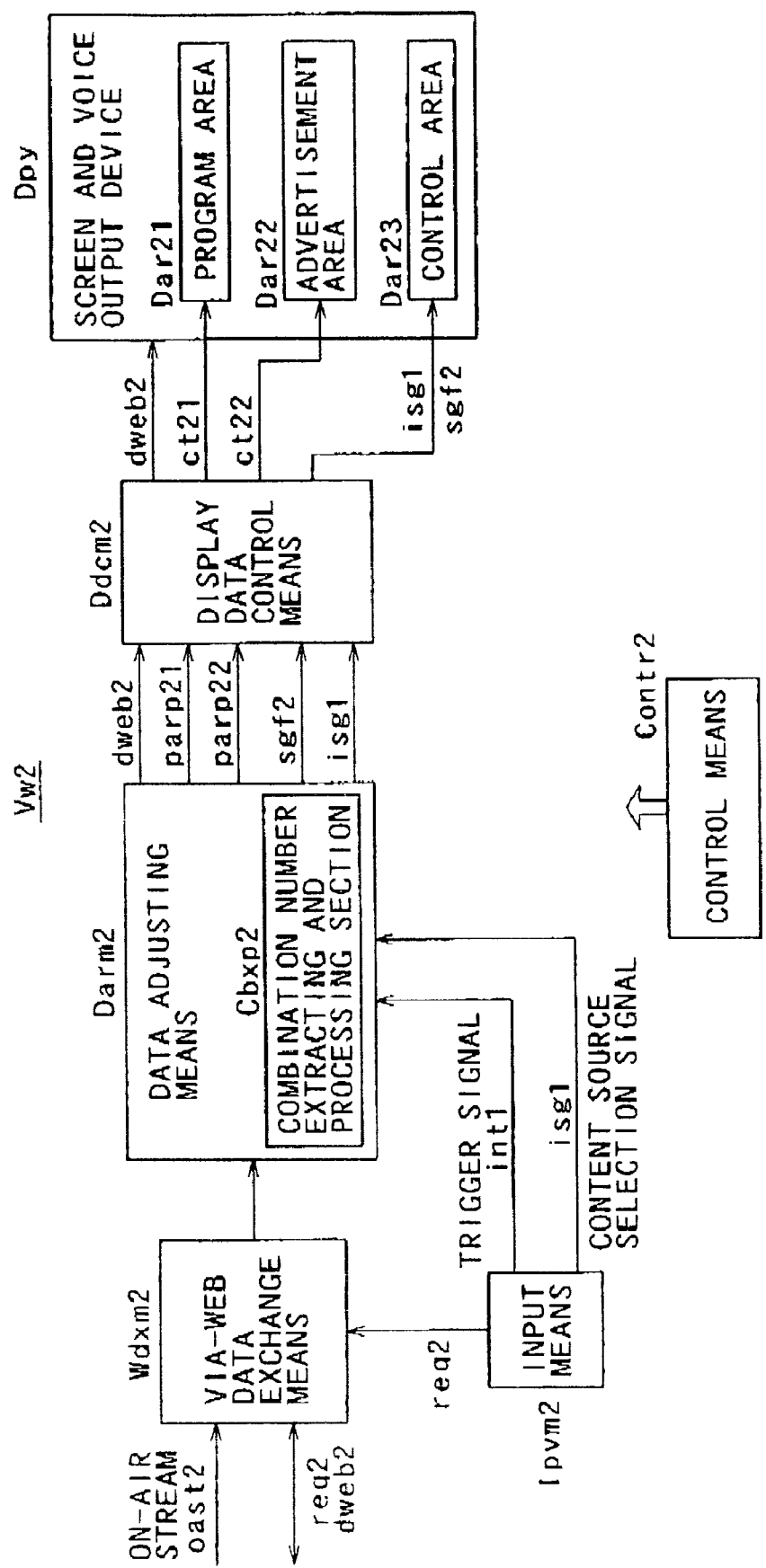
FIG. 16 is a block diagram illustrating a second embodiment of the network delivery data receiving system to which a second embodiment of the network delivery data receiving method is applied.

FIG. 16 is a block diagram illustrating the second embodiment of the network delivery receiving system to which the second embodiment of the network delivery data receiving method is applied.

Figure 17:
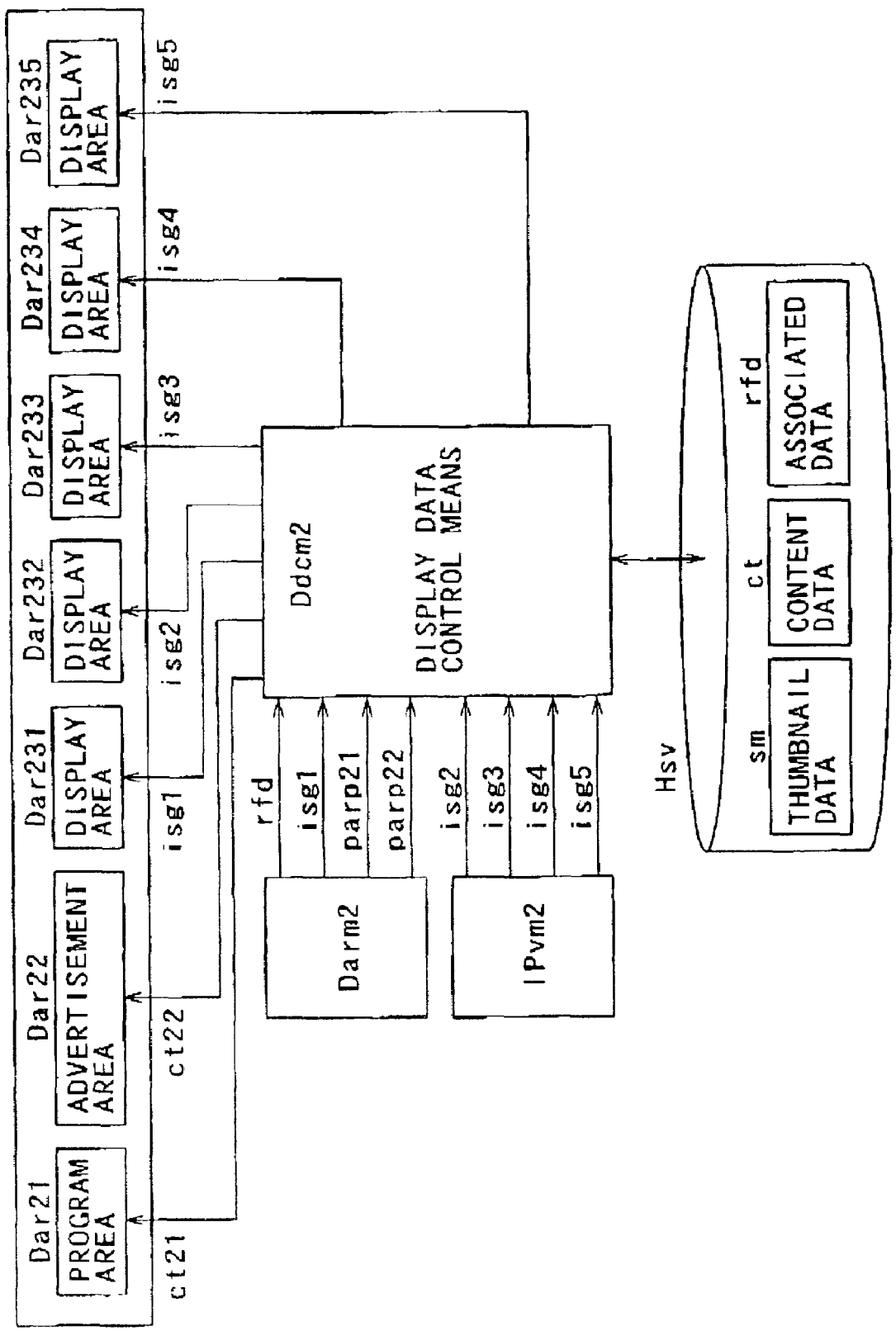
FIG. 17 is a block diagram illustrating the details of a main portion of the second embodiment of the network delivery data receiving system shown in FIG. 16.

FIG. 17 is a block diagram illustrating in detail the main portion of FIG. 16.

Figure 18:
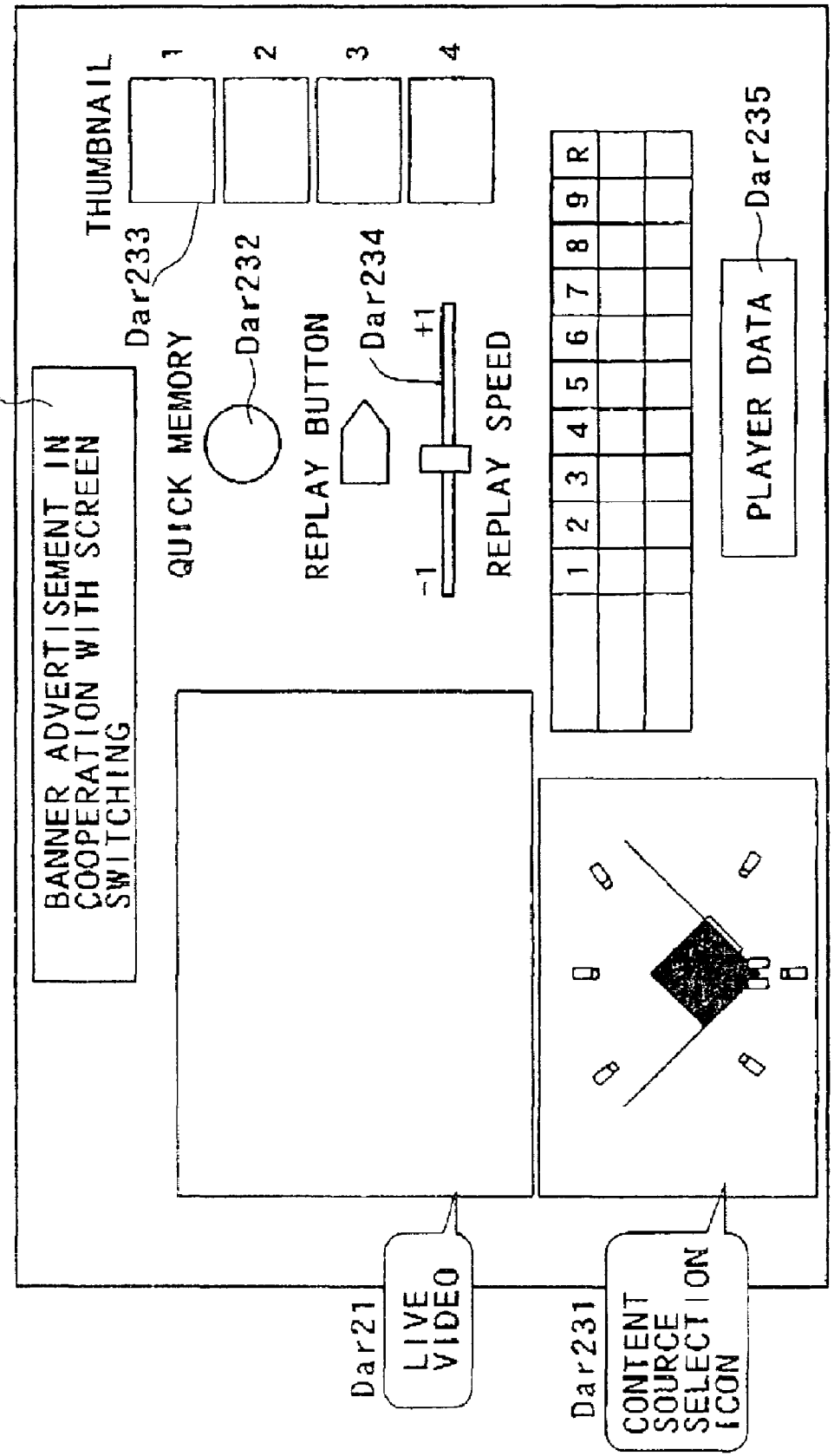
FIG. 18 illustrates an exemplary screen configuration.

FIG. 18 illustrates an exemplary screen configuration.

Figure 19:
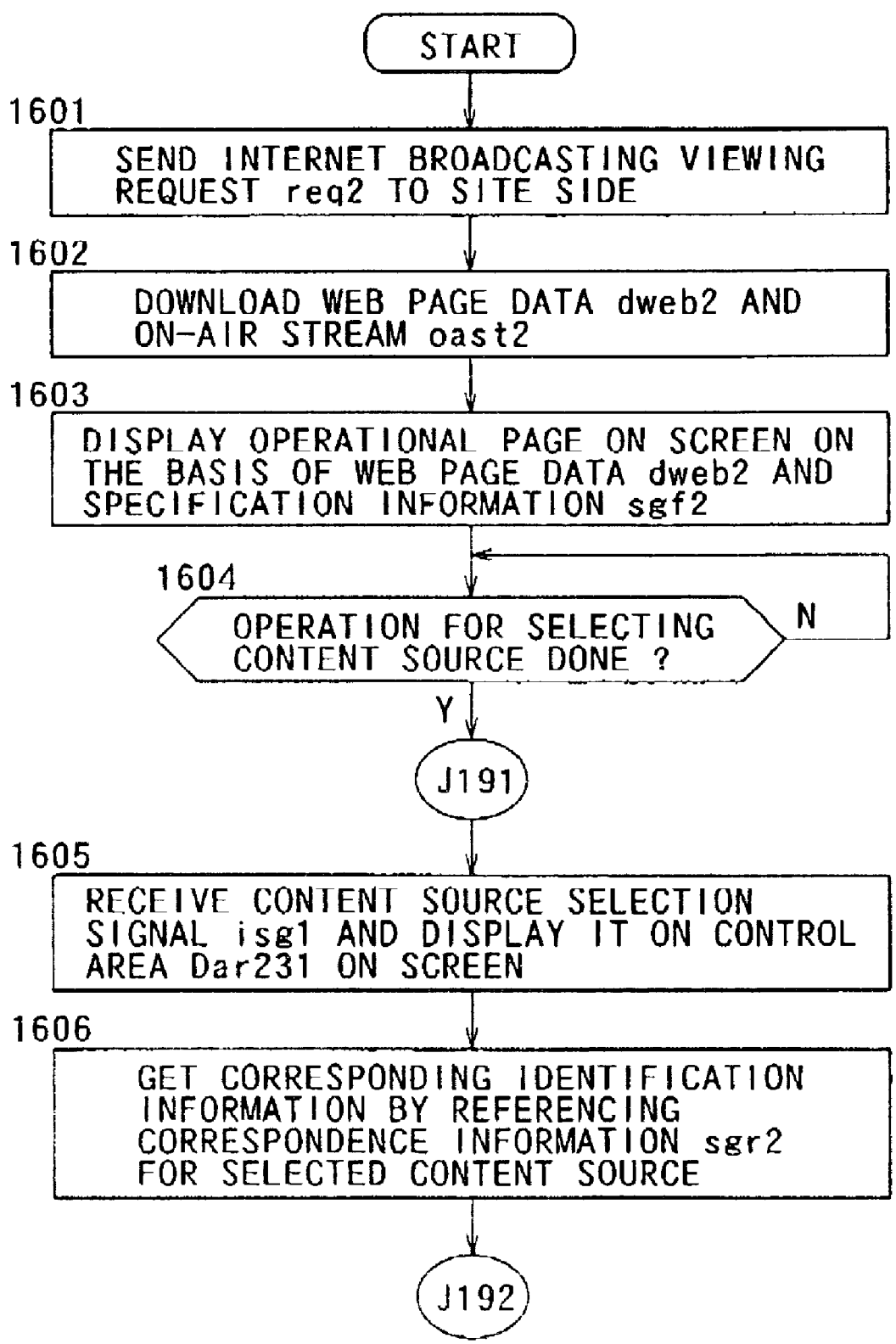
FIG. 19 is a flowchart describing operations of the network delivery data receiving system shown in FIG. 16.
Figure 20:
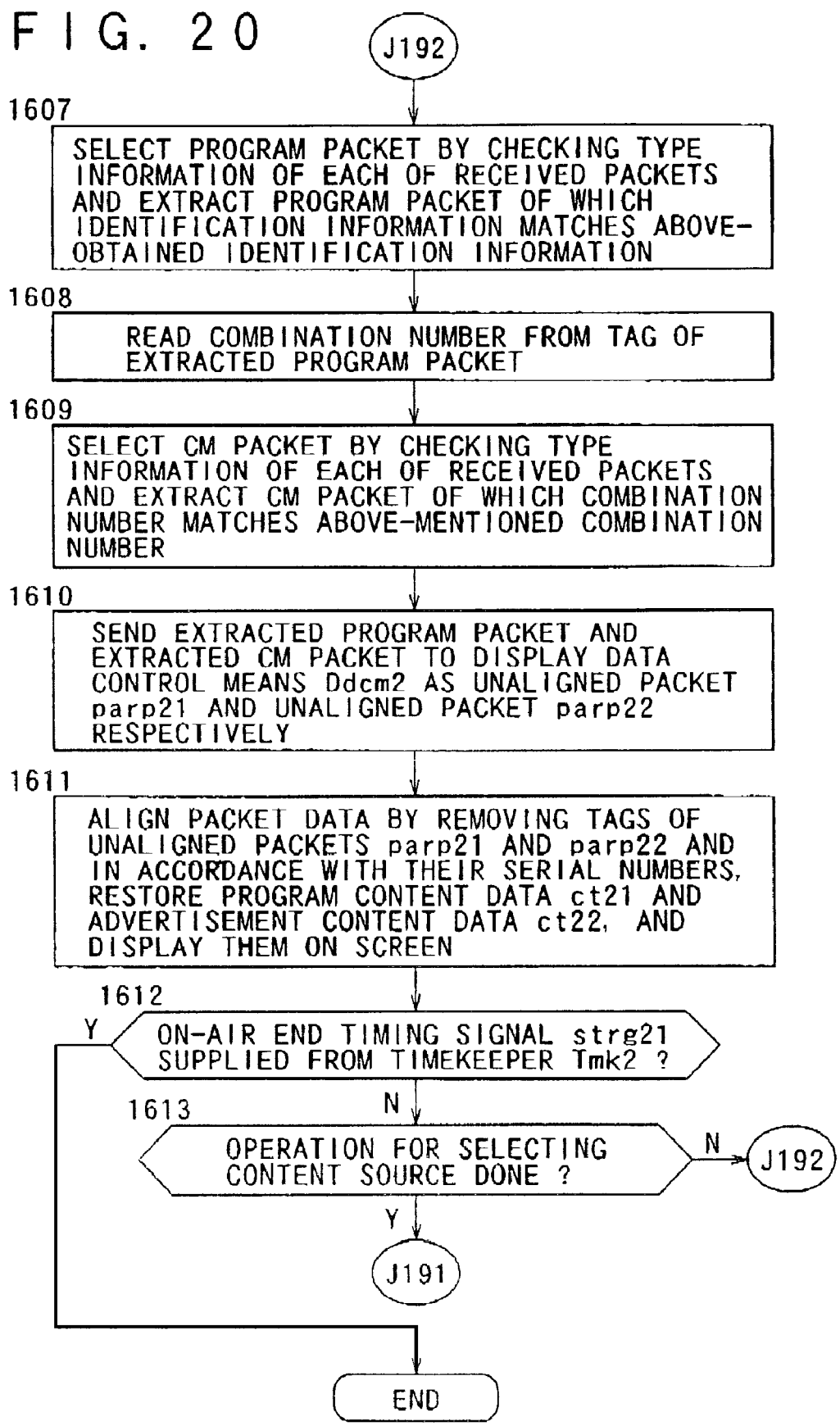
FIG. 20 is a flowchart continued from the flowchart shown in FIG. 19.

FIGS. 19 and 20 are flowcharts describing operations of the network delivery data receiving system shown in FIG. 16.

Like the above-mentioned first embodiment, the second embodiment allows the viewer to select desired content sources by supplying specification information, extract program packets in the receiving system by supplying correspondence information, and restore the program content data. In addition, if "banner advertisement" (generally constituted without voice) content data or "commercial" content data with animation and voice, which is regarded a highly effective advertisement, is combined with each piece of program content data and restored with the program content, preferable effects can be obtained. And, preferably, this combination is set as desired and dynamically changed by the transmitting system side. For example, preferably, the above-mentioned advertisement content data to be combined with program content data are dynamically changed from time to time as the on-air situation changes.

Therefore, in the second embodiment, common "combination numbers" are attached to both the tags of program packets and the tags of advertisement (or commercial) packets (CM packets) and these program packets and advertisement packets are put on an on-air stream to be supplied to each receiving system.

The second embodiment of the data transmitting system based on network delivery shown in FIG. 11 is provided by applying the second embodiment of the network delivery data transmitting method associated with the present invention, in which a transmitting system Svs2, the data transmitting side, sends broadcast programs to a receiving system Vw2 via an internet organization INT.

The transmitting system Svs2 is a site (or a Web server) which provides multi-content-type Internet broadcasting services on the Web and is realized by a computer system based on a combination of a mainframe computer, a work station, a server machine, and a personal computer for example as the platform on the provider side. This configuration is substantially the same as that of the above-mentioned first embodiment, so that its description will be omitted.

The transmitting system Svs2 selects content sources from externally attached and/or internal plural content sources to provide content sources Cm1 through CmN to be applied to a broadcast program concerned, organizes on-air content by capturing content data ct1 through ctN from these content sources, and sends the organized on-air content to the receiving system Vw2 via the Internet organization INT upon reception of a viewing request req2 from the receiving system Vw2, which is a Web client, via the Internet organization INT. Each of the plural content data ct1 through ctN represents the video material of a broadcast program (generally called a "program") or the video material of advertisement (banner advertisement or commercial). Therefore, the above-mentioned broadcast content is transmitted carrying at least plural content data and advertisement content data together.

The transmitting system Svs2 comprises an input means Iptm2, a correspondence information organizing means Crmp2, a specification information organizing means Spfm2, a combination number organizing means Cbnm2, a timekeeper Tmk2, an on-air stream organizing means Oacm2 having, as its one of functions, a combination number adding section Cbnp2 for adding combination numbers to the packets of mutually combined program packet sequences and advertisement packet sequences, a management means Mam2, and a database server Db2.

The content sources Cn1 through CmN are comprised of, for example, externally attached imaging camera and externally attached or incorporated image generating device, which are supplying generated content data ct1 through ctN, each data represents the video material of a broadcast program or the video material of advertisement, to the on-air stream organizing means Oacm2.

The input means Iptm2 is constituted by a device through which the system administrator can input commands for example and its control program.

(1) The input means Iptm2 supplies commands and input values necessary for the organizing of specification information sgf2 and correspondence information sgr2 to be described later and the handling of content data ct1 through ctN to each means, and supplies to the management means Mgm2 as management command input sgb21.

(2) The input means Iptm2 supplies a combination command input sgb22 to the combination number organizing means Cbnm2.

(3) The input means Iptm2 supplies correspondence command input sgb23 to the correspondence information organizing means Crmp2.

(4) The input means Iptm2 supplies specification command input sgb24 to the specification information organizing means Spfm2.

The correspondence information organizing means Crpr2 is provide as a program which is readable and executable by the CPU of this system, sets an identification number to each of the content sources to be used among the content sources Cm1 through CmN on the basis of the specification command input sgb23 to provide correspondence information sgr2, and organizes a correspondence information packet Pkr2, recording and storing the packet into a site management file Fsmg2 to be described later of the database server Db2. This correspondence information packet Pkr2 is accessed by the on-air stream organizing means Oacm2.

The specification information organizing means Spfm2, provided as a program which is readable and executable by the CPU of this system, sets description data of content sources Cm1 through CmN to be used on the basis of the specification command input sqb24 to provide specification information sgf2 and organizes a specification information packet Pkf2 to be recorded and stored in the site management file Fsmg2. This specification information packet Pkf2 is accessed by the on-air stream organizing means Oacm2.

It should be noted that if each of these correspondence information packet Pkr2 and specification information packet Pkf2 is constituted by two or more packets, serial numbers are attached thereto.

The combination number organizing means Cbnm2, provided as a program which is readable and executable by the CPU of this system, sets, on the basis of the combination command input sgb22, a combination number for relating the program content data with the advertisement content data (banner advertisement content data or advertisement content data) combined therewith to provide combination number information dcb2 to be recorded and stored in the site management file Fsmg2. This combination number information is accessed by the on-air stream organizing means Oacm2.

The timekeeper Tmk2 is a software timer and provided as a program which is readable and executable by the CPU of this system and manages the broadcasting start/end time specified by the management means Mgm2 for on-air streams including an on-air stream oast2. When the broadcasting start or end time for an on-air stream concerned has been reached, the timekeeper Tmk2 supplies a trigger signal strg21 to the on-air stream organizing means Oacm2 and the management means Mgm2.

In addition, the timekeeper Tmk2 receives display timing information including the switching between program content and advertisement content from the management means Mgm2 to supply a trigger signal stgr22 to the on-air stream organizing means Oacm2.

The database server Db2 is constituted by a magnetic disk recording device and/or optical disk recording device, stores a content data file Fct2 for storing at least any of the content data ct1 through ctN supplied from the content sources Cm1 through CmN and a site management file Fsmg2 for recording and storing the management data associated with this Internet broadcasting service, and is accessed by the management means Mgm2 and the on-air stream organizing means Oacm2 for example for read/write operations. If the content file Fct2 records banner advertisement content data or advertisement content data for example and if their types and quantities are many and a mass volume of moving pictures are recorded, it is preferable to use a disk array system suck as a RAID system.

The on-air stream organizing means Oacm2 is one embodiment of a transmission data organizing means according to the present invention and provided as a program which is readable and executable by the CPU of this system.

The on-air stream organizing means Oacm2 captures content data ct1 through ctN supplied from the content sources Cm1 through CmN to be used. As required, any of content data ct1 through ctN may be recorded and stored in the content file Fct2 of the database server Db2 as program content data and/or advertisement content data (banner advertisement content data or advertisement content data). Therefore, the on-air stream organizing means Oacm2 can get necessary content data ct1 through ctN from among the content data to be supplied in real time from the content sources Cm1 through CmN or the content data recorded to the database server Db2 at the on-air time.

The on-air stream organizing means Oacm2 captures a specification information packet Pkf2 from site management file Fsmg2 of the database server Db2. The specification information packet Pkf2 carries specification information sgf2 describing content sources Cm1 through CmN to be used.

The on-air stream organizing means Oacm2 also captures a correspondence information packet Pkr2 from the site management file Fsmg2. The correspondence information packet Pk2r carries correspondence information agr2 specifying the identification numbers of Cm1 through CmN to be used.

In addition, the on-air stream organizing means Oacm2 divides each of captured program and advertisement content data ct1 to ctN or read out from the content file Fct2 of the database server Db2 into plural data fragments, adds a tag having at least identification information and serial number to each data fragment to provide program packets and CM packets, and forms program packet sequences and CM packet sequences composed of these plural packets. The configurations of the each program packet and CM packet thus formed are described below with reference to FIG. 12.

As packets, plural program packets 800 and plural CM packets 810 as shown are formed.

The program packet 800 is configured by program packet data 802 (equivalent to the above-mentioned fragment) and a tag 801 attached thereto. The tag 801 has type information 8031, identification information 8032, combination number 804, and serial number 805 in this order in 4-field configuration.

The type information 8031 indicates that this packet is a program packet.

The identification information 8032 is the identification information for this program packet and indicates from which content source these content data have been packetized. Here, the type information 8031 and the identification information 8032 are classified as attribute information 803.

The combination number 804 specifies the combination with the CM packet 810 combined beforehand with this program packet 800. The same value is attached to the combined CM packet 810.

The serial number 805 is the serial number of this program packet. By aligning the program packets in the order of their serial numbers, the program content data can be restored.

The CM packet 810 is associated with banner advertisement or commercial and configured by CM packet data 812 (equivalent to the above-mentioned fragment) and a tag 811 attached thereto. The tag 811 has type information 813, combination number 814, and serial number 815 in this order in 3-field configuration.

The type information 814 indicates that this packet is a CM packet.

The combination number 814 specifies the combination with the program packet 800 combined beforehand with this CM packet 810. The same value is attached as the combined program packet 800.

The serial number 815 is the serial number of this CM packet. By aligning the CM packets in the order of their serial numbers, the CM content data can be restored.

The above-mentioned attachment of the combination numbers 804 and 814 to the program packet 800 and the advertisement packet 810 is executed by the combination number adding section Cbnp2 in the on-air stream organizing means Oacm2 on the basis of the above-mentioned combination number information dcb2 organized by the combination number organizing means Cbnm2 when a trigger signal strg22 is supplied from the timekeeper Tmk2.

Next, upon reception of the trigger signal strg21 from the timekeeper Tmk2, the on-air stream organizing means Oacm2 sends the transmission data including the specification information packet Pkf2 and the correspondence information packet Pkr2 in addition to the plural program packet sequences formed by the above-mentioned plural program packets 800 and the plural CM packet sequences formed by the above-mentioned plural CM packets to the management means Mgm2.

The management means Mgm2 has a data line terminating device which is connected to the Internet organization INT for data transfer, provided as a computer program for control in a this device and others, manages and controls the entire operation of the Web site, organizes data carrying the screen and voice (GUI data) to be displayed and reproduced on the receiving system Vw2 and transmission information, and executes information transfer with the receiving system Vw2. In addition, the management means Mgm2 has a data encryption/description capabilities, not shown.

Upon reception of a viewing request req2 from the receiving system Vw2 via the Internet organization INT, the management means Mgm2, operating in accordance with a management command input sgb21 entered by the operator for example, newly creates a customer file of the receiving system Vw2 on the site management file Fsmg2 or updates the existing customer file, and then sends the Web page data Web dweb2 to the receiving system Vw2 via the Internet organization INT. The exchange of the above-mentioned viewing request req2 and Web page data dweb2 is performed in compliance with the RTSP standard associated with both-way communication.

In addition, the management means Mgm2 sends scheduled on-air start/end time information of each broadcast program and display (including switching) timing information for program content and advertisement content to the timekeeper Tmk2 as management information i2.

On the other hand, upon reception of a timing signal strg21 from the timekeeper Tmk2 at on-air start time, the management means Mgm2 organizes an on-air stream oast2 carrying the above-mentioned packet group (the plural program packet sequences, the plural CM packet sequences, the correspondence information, and the identification information) on the basis of the transmission data supplied from the on-air stream organizing means Oacm2 and sends the organized on-air stream oast2 to the receiving system Vw2 via the Internet organization INT. The transmission of this on-air stream oast2 is performed in compliance with RTP/RTCP associated with video and audio streaming.

The following describes operations of the transmitting system Svs2. FIGS. 13 and 14 are flowcharts describing the main operations associated mainly with the on-air stream organizing means Oacm2 and the combination number organizing means Cbnm2. FIG. 15 is a flowchart describing the main operation associated mainly with the management means Mgn2.

In step 1101, the organization of the specification information sgf2 and specification information packet Pkf2 and The correspondence information sgr2 and correspondence information packet Pkr2 on the basis of the input value for specifying content sources to be used and the recording of these organized information and packets to the database server Db2 are performed by the specification information organizing means Spfm2 and the correspondence information organizing means Crpm2. The processing procedures for these operations are the same as those of steps 401 through 405 shown in FIG. 4.

In step 1102, the combination number organizing means Cbnm2 enters a loop for waiting for the transmission of a combination command input sgb22 from the input means Iptm2. The combination command input sgb22 is an input for the host of that site to specify the advertisement packet sequences to be combined with the program packet sequences to be put on this broadcast program. Receiving this command input, the combination number organizing means Cbnm2 organizes combination number information dcb2 in step 1103 and supplies the organized information to the on-air stream organizing means Oacm2 via the site management file Fsmg2 of the database server Db2.

On the basis of the received combination number information dcb2, the on-air stream organizing means Oacm2 sets combination numbers to the combined program packet sequences and advertisement packet sequences and temporarily stores these sequences.

Next, the on-air stream organizing means Oacm2 enters a loop for determining whether or not the on-air start time has been reached (step 1105). This decision is made on the basis of a timing signal strg21 which is supplied from the timekeeper Tmk2 at the on-air start time of the on-air stream concerned (for example, oast2). Receiving this timing signal strg21, the on-air stream organizing means Oacm2 captures predetermined plural program content data and predetermined plural CM content data in step 1106. These content data are captured from any of the content sources Cm1 through CmN in real time and/or read from the content file Fct2 of the database server Db2. The captured content data are divided to form program packet data 802 or advertisement packet data 812.

In step 1107, the on-air stream organizing means Oacm2 attaches the tag 801 to each program packet data 802 to form program packets 800. The configuration of the tag 601 is the same as shown in FIG. 12. The formed program packets are arranged in time sequence to organize a program packet sequence. Thus, the program packet sequences are organized for the plural program content data applied to this broadcast program.

Likewise, in step 1108, the on-air stream organizing means Oacm2 attaches the tag 811 to each CM packet data 812 to form CM packets 810. The configuration of the tag 811 is the same as shown in FIG. 12. The formed CM packets 810 are arranged in time sequence to form a CM packet sequence. Thus, the advertisement packet sequences are organized for all plural advertisement content data applied to this broadcast program.

In step 1109, the on-air stream organizing means Oacm2 checks if a trigger signal strg22 associated with switching between program content and advertisement content or other display operations has been supplied from the timekeeper Tmk2. If the trigger signal is not found, the procedure goes to step 1111. On the other hand, if the trigger signal strg22 is found, the combination number adding section Cbnp2 is started in step 1110, adding the corresponding contents of the combination number set before to the tag 801 as a combination number 804 for the program packets 800 and, at the same time, adding the same contents to the tag 811 as a combination number 814 for the CM packets 810.

Further, in step 1111, the on-air stream organizing means Oacm2 organizes transmission data on the basis of all program packet sequence and CM packet sequences organized above, the correspondence information packet Pkr2 and the specification information packet Pkf2 and sends the organized transmission data to the management means Mgm2.

Then, in step 1112, the on-air stream organizing means Oacm2 checks whether or not a timing signal srgr21 indicative of on-air time end has been supplied from the timekeeper Tmk2. If this timing signal is not found, the procedure returns to step 1106 to repeat the above-mentioned processing. If this timing signal is found, the processing comes to an end.

As shown in FIG. 15, the management means Mgm2 checks in step 1201 whether or not a timing signal stgr21 indicative of on-air start time has been supplied from the timekeeper Tmk2. If this timing signal is not found, the management means Mgm2 determines that it is before the on-air time and goes to step 1202, entering a loop for checking if an Internet broadcasting viewing request req2 from the receiving system Vw2 has newly occurred. If this request is found newly supplied, the management means Mgm2 accepts this request in step 1203, customer-registering it into the site management file Fsmg2. Then, the management means Mgm2 sends Web page data dweb2 extracted from the site management file Fsmg2 to the registered receiving system Vw2, returning to step 1202. Thus, the management means Mgm2 continues the acceptance and registration of new customers and the transmission of operation-associated Web page data until the on-air start time comes.

On the other hand, when the on-air start time comes in step 1201, the management means Mgm2 multicast-transmits, in step 1204, an on-air stream oast2 with the plural program packet sequences, plural CM packet sequences, specification information Pkf2, and correspondence information packet Pkr2 multiplexed to all registered receiving systems Vw2, thereby starting Internet broadcasting.

In step 1205, upon detection of a new viewing request after starting of Internet broadcasting, the management means Mgm2 accepts this request in step 1206, customer-registers this request into site management file Fsmg2, immediately sends the Web page data dweb2 captured from the site management file Fsmg2 to the newly registered receiving system Vw2, and goes to step 1207.

In step 1207, the management means Mgm2 checks whether or not a timing signal stgr21 indicative of on-air time end has been supplied from the timekeeper Tmk2. If this timing signal is not found, the management means Mgm2 determines that the on-air continues and returns to step 1204 continue the processing. If this timing signal is found, the management means Mgm2 determines that the on-air time has come to an end, upon which the processing comes to an end.

Thus, the transmitting system Svs2 is configured and operates.

As described above, in the case of a live program of baseball for example, the transmitting system Svs2 sets plural fixed cameras with their view angles set such that each viewer is supposed to desire in the live coverage site, multiplexes the video data captured by the plural fixed cameras by encoding the video data into a low bit rate, registers or capture advertisement (a banner) corresponding to each camera, and multiplexes the advertisement data with the multiplexed camera video data, transmitting the resultant video data over the Internet.

It should be noted that the transmission of the correspondence information sgr2 and the specification information sgf2 to the receiving system Vw2 may also be configured so that these items of information are supplied from a Web site as non-real-time data rather than transmitting them on the on-air stream oast2 as real-time data as described above. Essentially, correspondence information and specification information may only be supplied in the processing of on-air stream on the receiving system side and therefore the routes for this supply are not restricted in any manner.

The following describes the configuration of the receiving system Vw2 with reference to FIG. 16.

As with the above-described receiving system Vw1, the receiving system Vw2 is mainly realized as a household Internet service compatible apparatus such as a network connectable system including a personal computer, an Internet compatible television receiver, an Internet compatible mobile telephone, an Internet compatible mobile information terminal, and so on. The receiving system Vw2 accesses Web sites operated by the transmitting system Svs2, an Internet broadcasting service provider, via the Internet organization INT to receive a multicast-delivered on-air stream oast2 Therefore, receiving system Vw2 has a processor (CPU), memory devices such as RAM and ROM, an input/output interface, and a bus, each not shown, which, however, are also the components of each general-purpose computer system; therefore these components will not be described for the brevity of description.

The receiving system Vw2 comprises an input means Ipvm2, a via-Web data exchange means Wdxm2 (hereafter referred to simply as a data exchange means Wdxm2), a data adjusting means Darm2, a display data control means Ddcm2, a screen and voice output device Dpy, and a control means Contr2. The data adjusting means Darm2 has a combination number extracting and processing section Cbxp2 as one of its capabilities.

The Web data exchange means Wdxm2 is one embodiment of the data exchange means according to the present invention. The data adjusting means Darm2 and the display data control means Ddcm2 are embodiments of the data processing means according to the present invention. The screen and voice output device Dpy is one embodiment of the output means according to the present invention.

The input means Ipvm2 is constituted by a user-operated device and software for performing an input operation; in computer systems, the input means Ipvm2 is constituted for example by a general-purpose mouse, a general-purpose screen touchpad, and general-purpose input processing software in general.

When the viewer logs in the Internet provider and accesses a Web site, the input means Tpvm2 supplies login command input log1 to the Web data exchange means wdxm2. Next, when the viewer performs form input to view the Internet broadcasting, the input means Ipvm2 issues a viewing request req2 to the Web data exchange means Wdxm2. When the viewer specifies a desired content source from a site operation screen (or a top page), the input means Ipvm2 supplies a content source selection signal isg1 to the data adjusting means Darm2.

When a command indicative of the timing of displaying (including switching) a program and/or advertisement is entered by the viewer at a given or predetermined trigger time, the input means Ipvm2 supplies a trigger signal intl associated with the display time of the program and/or advertisement to the data adjusting means Darm2.

The following further describes the trigger signal int1 which controls the timing of displaying the restoration of program content and advertisement content.

Because the program packet sequences extracted from the on-air stream oast2 are combined with advertisement packet sequences beforehand, when the viewer selects given program content, advertisement content is automatically set in combination. Two or more methods may be used for setting the timings for displaying program content and advertisement content.

One method exclusively switches between the display of program content and the display of advertisement content. The switching timing is the detection of the combination number attached to the program packet. Therefore, the switching timing signal is attached at the transmitting system and supplied on the on-air stream oast2. In this method, the display of the advertisement content starts upon disappearance of the program content.

In a second method, the display timing is controlled by the arrival of an independent signal which is externally supplied at a given or predetermined trigger time. One example of this signal is the above-mentioned trigger signal int1. According to this method, the display of program and the display of advertisement are not always synchronous. Only one of them is displayed by switching or both are displayed at a specified time. Therefore, issuing the trigger signal int1 can control the display of program and the display of advertisement in an independent manner.

The Web data exchange means Wdxm2 has a data line terminating device connected to the Internet organization INT for data exchange and is provided as a computer program including the control thereof, performing data exchange with the Web site via the Internet provider. To be more specific the Web data exchange means Wdxm2 issues a login request to the Internet provider and a viewing request req2 for viewing Internet broadcasting to the site side to receive site operation screen data dweb2 and an on-air stream oast2. The received data are sent to the data adjusting means Darm2.

The data adjusting means Darm2, provided as a program which is readable and executable by the CPU of this system, has a combination number extracting and processing section Cbxp2.

The data adjusting means Darm2 sends site operation screen data dweb2 supplied from the data exchange means Wdxm2 to the display data control means Ddcm2 and, at the same time, receives the correspondence information packet Pkr2, the specification information packet Pkf2, program packet sequences Pks1 through PksJ, and advertisement packet sequences PksK through PksN from the data exchange means Wdxm2.

Next, the data adjusting means Darm2 extracts the specification information sgf2 from the specification information packet Pkf2 and sends the extracted information to the display data control means Ddcm2. At the same time, the data adjusting means Darm2 extracts the correspondence information sgr2 from the correspondence information packet Pkr2 and temporarily stores the extracted information.

On the basis of the content source selection signal isg1 supplied from the input means Ipvm2, the data adjusting means Darm2 references the correspondence information sgr2 to get the identification information corresponding to the selected content source, determines a program packet sequence (one of Pks1 through PksJ) on the basis of the type information 8031 (refer to FIG. 12, which holds the same with the following description) attached to each packet, checks the tag 801 attached to each program packet 800 forming this program packet sequence, matches the identification information 8032 in the tag 801 with the identification information obtained above, sequentially extracts the program packets 800 concerned, and sequentially sends the extracted program packets to the display data control means Ddcm2 as unaligned packets parp21. Therefore, the unaligned packets parp21 are concerned with the program.

When the combination number extracting and processing section Cbxp2 detects the combination number 804 in the tag 801 in the above-mentioned tag checking operation, the detected combination number is determined as combination information, on the basis of which the CM packets 810 having the combination number 814 of which contents matches the contents of the combination number 804. The data adjusting means Darm2 sequentially sends the extracted CM packets to the display data control means Ddcm2 as unaligned packets parp22. Therefore, the unaligned packets parp22 are concerned with the advertisement.

The transmission of the unaligned packets parp21 and parp22 to the display data control means Ddcm2 is controlled when the combination number 804 or 814 is detected. In accordance with the contents of the combination number 804 or 814, both the unaligned packets parp21 and parp22 are sent to the display data control means Ddcm2 when simultaneously displaying both banner advertisement and program. Only the unaligned packets parp22 are sent by stopping the sending of the unaligned packets parp21 when switching the display of program to the display of commercial.

In the above-mentioned embodiment, the advertisement-associated packets (the unaligned packet sequences parp22) are sent to the display data control means Ddcm2 upon detection of the program packet 800 attached to the combination number 804 for example, thereby automatically executing the display of advertisement. Alternatively, the timing of the displaying and deleting of the displaying of program and/or advertisement may be controlled at a given or predetermined trigger time. In the latter case, the given or predetermined trigger time may be entered through the input means Ipvm2 into the data adjusting means Darm2 as the trigger signal Int1 or another trigger signal not shown may be put on the on-air stream oast2 which is entered into the data adjusting means Darm2 via the data exchange means Wdxm2.

It is also practicable to send the trigger signal int1 and another trigger signal not shown to the display data control means Ddcm2 to control the display of program and/or advertisement.

The display data control means Ddcm2, provided as a program which is readable and executable by the CPU of the system, performs data adjustment so that data are displayed in full screen on the screen and voice output device Dpy on the basis of the site operation screen data dweb2 supplied from the data adjusting means Darm2 and sends the adjusted data to the screen and voice output device Dpy. Likewise, on the basis of the specification information sgf2 and the content source selection signal isg1, the display data control means Ddcm2 performs data adjustment so that the data are displayed in an control area Dar23 on the site operation screen and supplies the adjusted data to the screen and voice output device Dpy.

Further, the display data control means Ddcm2 aligns the plural unaligned packets parp21 supplied from the data adjusting means Darm2 in accordance with their serial numbers (not shown but equivalent to the serial number 805 shown in FIG. 12), removes the tags therefrom to restore the program content data ct21, performs data adjustment so that the restored program content data are displayed in a display area Dar21 on the screen of the screen and voice output device Dpy, and supplies the adjusted data to the screen and voice output device Dpy. Likewise, the display data control means Ddcm2 aligns the plural unaligned packets parp22 supplied from the data adjusting means Darm2 in accordance with their serial numbers (not shown but equivalent to the serial number 815 shown in FIG. 12), removes the tags therefrom to restore the advertisement content data ct22, performs data adjustment so that the restored advertisement content data are displayed in a display area Dar22 on the screen of the screen and voice output device Dpy, and supplies the adjusted data to the screen and voice output device Dpy.

Thus, in accordance with the timing of receiving the unaligned packets parp21 and/or parp22, the display data control means Ddcm2 supplies the program content data ct21 and/or advertisement content data ct22 to the screen and voice output device Dpy.

Namely, when both the unaligned packets parp21 and parp22 are supplied, the display data control means Ddcm2 simultaneously supplies both the program content data ct21 and the advertisement content data ct22 to the screen and voice output device Dpy. At this moment, both the program content and the advertisement content are reproduced on the screen. This is especially suited when the advertisement content is banner advertisement.

When only the unaligned packets parp22 are supplied, only the advertisement content data ct22 are supplied to the screen and voice output device Dpy instead of the program content data ct21. In this case, the advertisement content is reproduced not in the advertisement area Dar22 but in the program area Dar21. This is the switching from program content to advertisement content, which is especially suited when the advertisement content is an above-mentioned commercial.

Moreover, the display data control means Ddcm2 may also be configured to have as its extended functionality a capability of editing the program content data ct21 for example into thumbnail data sm, which is a thumbnail image, a capability of recording and reading this thumbnail data sm, the program content data ct21, and the advertisement content data ct22 into a home server Hsv to be described later, and a capability of special reproduction control to be described later.

The screen and voice output device Dpy has a flat panel screen (a liquid crystal display, a plasma display, or an EL display for example) or a CRT monitor, displays site operation screen data dweb2 in full screen, specification information sgf2 and so on in the control area Dar23 inside the screen, program content data in the program area Dar21, and advertisement content data in the content display area Dar22 inside the screen.

The control means Contr2, provided as a program which is readable and executable by the CPU of the system, controls the operations of the entire receiving system Vw2.

With the above-mentioned capabilities, the viewer can select the video of any desired camera angle by clicking the corresponding camera icon for example displayed on the GUI In addition, in cooperation with the camera angle section by the viewer, the advertisement content on the GUI is also switched to another advertisement content. One or more advertisement clients buy these angles and, every time switching is performed between the angles, the advertisement content (for example, banner advertisement) on the GUI is switched to another.

In addition to the above-mentioned capabilities, the receiving system Vw2 may have the content recording capability and the special reproduction control capability as shown in FIG. 17.

The content recording is realized by the installation of the home server Hsv formed by a mass storage magnetic recording disk drive HDD for example. To this home server Hsv, the content data ct (ct21 for example) are recorded from the display data control means Ddcm2 and the thumbnail data sm created by the display data control means Ddcm2 in a reproducible manner.

The special reproduction control capability is realized by mainly adding the following means to the display data control means Ddcm2. It should be noted that the following means are only examples of the embodiment.

(1) Recording scene time difference reproducing means allows to record and store desired live video and audio scenes and retrieve the stored scenes at a desired time to send them to the screen and voice output device Dpy for reproduction.

(2) Thumbnail screen recording and displaying means allows to edit a thumbnail screen of recorded scenes and record and store them and send them at a desired time to the screen and voice output device Dpy for reproduction.

(3) Variable speed reproducing means allows to edit the data for variable speed reproduction (specification of replay speed) an send the edited data to the screen and voice output device Dpy for reproduction.

(4) Associated data displaying means allows to send content-associated data (scores and player data of baseball match) to the screen and voice output device Dpy for reproduction. In this case, associated data rfd which were prepared by the transmitting system Svs2 are received to be sent to the display data control means Ddcm2 through the data adjusting means Darm2.

For the above-mentioned additional means, a capability is attached to the input means Ipvm of sending the acceptance of inputs and associated signals to the display data control means Ddcm2. It should be noted that the following items are only an example of the embodiment.

(1) Acceptance of the commands for recording and reproducing desired live video and audio scenes and the sending of a signal isg2.

(2) Acceptance of the commands for recording and reproducing thumbnail screens and the sending of a signal isg3.

(3) Acceptance of the command for reproducing with variable reproduction speed and the sending of a signal isg4.

(4) Acceptance of the command for displaying content-associated data and the sending of a signal isg5.

For the above-mentioned items, the following display area as shown in FIG. 18 are set to the screen and voice output device Dpy.

(1) The above-mentioned live screen display area (program area) Dar21.

(2) The above-mentioned advertisement display area (in the figure, the banner advertisement display area) Dar22 which is switched from the above-mentioned live screen display area.

(3) A camera switching command input icon display area Dar231.

(4) A desired scene recording command input icon (quick memory) display area Dar232.

(5) A thumbnail screen display area Dar233.

(6) A replay speed specification controller display area Dar234.

(7) An associated data display area (scores and player data of baseball game) Dar235.

It should be noted that these areas are only an example of the embodiment.

Consequently, a scene which the viewer wants to view repeatedly or in slow motion can be recorded by pressing the quick memory icon on the GUI. A scene to be reproduced repeatedly is recorded beforehand to be reproduced with desired variable speeds.

When two or more scenes are recorded, each scene is displayed in a thumbnail screen on the GUI. The viewer can select any desired scene from the thumbnail screen and reproduce the selected scene by clicking the replay icon. The reproduction speed may be varied by moving the slide of the replay speed icon on the screen.

The following describes operations of the receiving system Vw2 with reference to FIGS. 19 and 20. It is assumed that a log-in operation to the provider has been already been performed.

In step 1601, on the basis of a command from the input means Ipvm2, the data exchange means Wdxm2 sends an Internet broadcasting viewing request req2 to the Web site side. In step 1602, the data exchange means Wdxm2 downloads Web page data dweb2 and an on-air stream oast2 and sends them to the data adjusting means Darm2.

In step 1603, the data adjusting means Darm2 sends the Web page data dweb2 to the display data control means Ddcm2, extracts specification information sgf2 from the specification information packet Pkf2 and correspondence information sgr2 from the correspondence information packet Pkr2, and temporarily stores the extracted information. Further, the data adjusting means Darm2 extracts default program packet sequences, extracts the CM packet sequences from the extracted default program packet sequences, and sends them to the display data control means Ddcm2. On the basis of the Web page data dweb2, the display data control means Ddcm2 displays the operation page on the screen and voice output device Dpy in full screen, displays the specification information sgf2 in the control area Dar23 on the operation page, restores the program content data from the default program packet sequences, restores the CM content data from the CM packet sequences, and displays the restored data in the program area Dar21 and the advertisement area Dar22 on the operation page respectively.

The program content data are at least moving picture and voice; therefore, in addition to an HTML-based browser capability, the display data control means Ddcm2 has a capability of reproducing moving picture and voice as a helper application or plug-in software program.

Thus, the control area Dar23 on the screen shows the information about the content sources (for example, plural television cameras) in use by the broadcast program concerned, the program area Dar21 restores the default content source, in this case, the video and audio captured by the first television camera, and the advertisement area Dar22 restores the CM content combined with the program content, thereby starting the reception of Internet broadcasting.

Currently, the content data captured by the first television camera are displayed and sounded as default in the program area Dar21. At this moment, when the icon of another television camera, of the icons for specifying selection displayed in the control area Dar23, is clicked, the input means Ipvm2 detects this selecting operation in step 1604, generates a content source selection signal isg1, and sends this signal to the data adjusting means Darm2.

In step 1605, the data adjusting means Darm2 sends the received content source selection signal isg1 to the display data control means Ddcm2, which displays this signal in the control area Dar23. Consequently, the selection by the viewer is reflected on the screen.

In step 1606, the data adjusting means Darm2 specifies the content source selected on the basis of the content source selection signal isg1 and, by referencing the correspondence information sgr2, gets the identification information of the content source. In step 1607, by checking the type information 8031 of the supplied packet, the combination number extracting and processing section Cbxp2 selects the program packets 800, and, upon extraction of only the program packets 800 of which content source identification information 8032 shown in the attribute information 803 matches the identification information obtained above, retrieves the combination number 904 from this program packets 800 in step 1608.

In step 1609, when the data adjusting means Darm2 selects the CM packets 810 by checking the supplied type information 813, the combination number extracting and processing section Cbxp2 extracts only the CM packets 810 of which contents of the combination number 814 included in the tag 811 match the content of the above-mentioned combination number 804. In step 1610, the data adjusting means Darm2 sends one or both of the extracted program packets 800 and the CM packets 810 to the display data control means Ddcm2 as the unaligned packets parp21 and the unaligned packets parp22 respectively.

In step 1611, the display data control means Ddcm2 aligns the unaligned packets parp21 in accordance with their serial numbers, removes their tags 801, aligns the program packet data 802 to restore the program content data (for example, ct21), and/or aligns the unaligned packets parp22 in accordance with their serial numbers 815, removes their tags 811, aligns the CM packet data 812 to restore the advertisement content data (for example, ct22), and displays the program content data and/or the CM content data in the program area Dar21 and or the advertisement area Dar22 on the screen. Thus, when the viewer clicks the icon, the current displaying and sounding of program content is immediately automatically switched to the displaying and sounding of the selected desired display of program content. And, at the same time, the display of advertisement content is automatically switched to the advertisement content combined with the selected program content.

Next, the control means Contr2 checks if a command for stopping the reception by the viewer or stopping the reception by the built-in timer for example has occurred (step 1612). If the reception is continued, the procedure goes to step 1613. If another selecting operation is done by the viewer in step 1613, the procedure returns to step 1605; if no selecting operation is done, the procedure returns to step 1607 to continue the processing. On the other hand, if the command for stopping the reception is detected in step 1612, the processing comes to and end.

It should be noted that the processing in the above-mentioned steps is executed under the control of the control means Contr2.

Thus, the receiving system Vw2 is configured and operates.

As described above, in the present embodiment, the transmitting system Svs2 simultaneously transmits an on-air stream which carries plural program content data and plural advertisement content data together, the receiving system extracts a program content specified by the viewer to restore the extracted program content on the screen and, on the basis of the combination number indicated by the tag of the packets of this program content, extracts the advertisement content combined with this program content to restore the extracted advertisement content on the screen. Consequently, the display of program content and the display of advertisement content are simultaneously restored in different positions on the screen or both displays are switched between in the same display area to exclusively display them at a time.

In the case of switched display, the transmitting system Svs2 prepares the plural program packet sequences associated with plural program content data and the plural advertisement packet sequences associated with plural advertisement content data. Now, referring to FIG. 12, of the program packets 800 for forming the program packet sequences, the same contents as the contents of the combination number 804 of the CM packet 810 of the switching destination are stored as significant information into the combination number 804 in the tag 801 for only the program packet (or only several program packets before and after the switching timing) corresponding to the timing of switching to advertisement content. On the other hand, an insignificant value or skip information is written to the combination number in the tag of each remaining program packet not corresponding to the time of switching to advertisement content. This correspondence is performed on the plural program packet sequences and the plural CM packet sequences to transmit the resultant packet sequences to the receiving system Vw2.

As with the above-mentioned embodiment, the receiving system Vw2 specifies the corresponding program packet sequences on the basis of user specification and extracts the program packets 800 which form these program packet sequences. Upon detection of the program packets 800 of which combination number 804 carries significant information, the receiving system Vw2 determines that the time of display control such as switching has been reached and extracts the CM packets 810 corresponding to the information written to the combination number 804, thereby switching the current display of program content to the display of advertisement content or display of both.

The above-mentioned configuration allows the user to restore desired program content and, at the same time, restore the advertisement content already combined with the program content at a given time.

In the above-mentioned configuration, the combination number 804 of the program packets 800 and the combination number 814 of the CM packets 810 not only function to identify the combined CM packets 810 or program packets 800 but also function as the control signal for controlling the timing of displaying the program content and the advertisement content, a switching timing for example. If both the content program and the advertisement program are displayed at the same time without switching, these combination numbers function as a control signal for controlling the start, end (erasure), and duration of the display of each content. This is one of the features of this configuration.

For re-switching or restoration from the advertisement content to the program content mentioned above, the transmitting system Svs2 attaches an EOS (End Of Sequence) marker to the advertisement packet data 812 of the last CM packet 810 in the CM packet sequence for example and the data adjusting means Darm2 in the receiving system Vw2 detects the attached EOS and switches the display to the program packet 800 having the combination number 804 of the same contents as the contents of the combination number 814 of that packet. Alternatively, when switching from the display of the program packet 800 to the display of the CM packet 810, the identification number 8032 of the program packet 800 before switching is stored beforehand. Upon detection of the EOS in the switched CM packet 610, the program packet 800 having the stored identification number 8032 is extracted and the display is switched to the display of the program content.

Obviously, the above-mentioned content data restoration includes the restoration of the audio data which accompany the restored video data.

In the above-mentioned configuration, the combination number 804 or 814 is used also as a switching timing control signal or a period control signal. Alternatively, the transmitting system may issue a control packet for controlling the switching, start, end (erasure), and duration of display to the receiving system. Receiving this control packet, the receiving system controls the display of program content and the display of advertisement content.

According to the above-mentioned embodiment, the transmitting side transmits plural packet sequences which can restore content onto one on-air stream and sends this on-air stream as well as specification information and correspondence information to the receiving side as shown in FIG. 11. Therefore, the present embodiment may simultaneously supply plural selectable program packet sequences to the receiving side as well as the information for the selection. On the other hand, as shown in FIG. 16, the receiving side can get plural packet sequences by receiving only one on-air stream and, by use of the obtained information for the selection, easily select the desired programs packet sequences to restore desired content. Even during on-the-air, the selection can be changed as desired to switch the display to the content to be restored. Consequently, during a live coverage of baseball game for example, the viewer can switch between the video displays having different camera positions and angles.

Further, because the transmitting side combines advertisement packet sequences with the program packet sequences and puts these program packet sequences along with the advertisement packet sequences onto a single on-air stream for transmission to the receiving side, selecting and restoring desired program control at the receiving side can restore both the program content and the combined advertisement content at the same time or one of them at a time in a predetermined timed relation, thereby enhancing advertisement effects. And, because the combination of program content and advertisement content may be set as desired on the transmitting side, optimum advertisement content may be combined with each program content and this combination may be changed on the receiving side, thereby further enhancing advertisement effects.

Still further, because a single on-air stream can carry plural pieces of advertisement content, the number of advertisement quotas increases for more advertisers (or sponsors), thereby increasing the chances for each advertiser to buy advertisements. This means the possible increase in advertisement revenues on the transmitting side, or the provider side of the Internet broadcasting services.

The following describes a third embodiment of the network delivery data transmitting method and network delivery data receiving method associated with the present invention and a third embodiment of the network data transmitting system and network data receiving system to which these network data transmitting method and data receiving method are applied.

Figure 21:
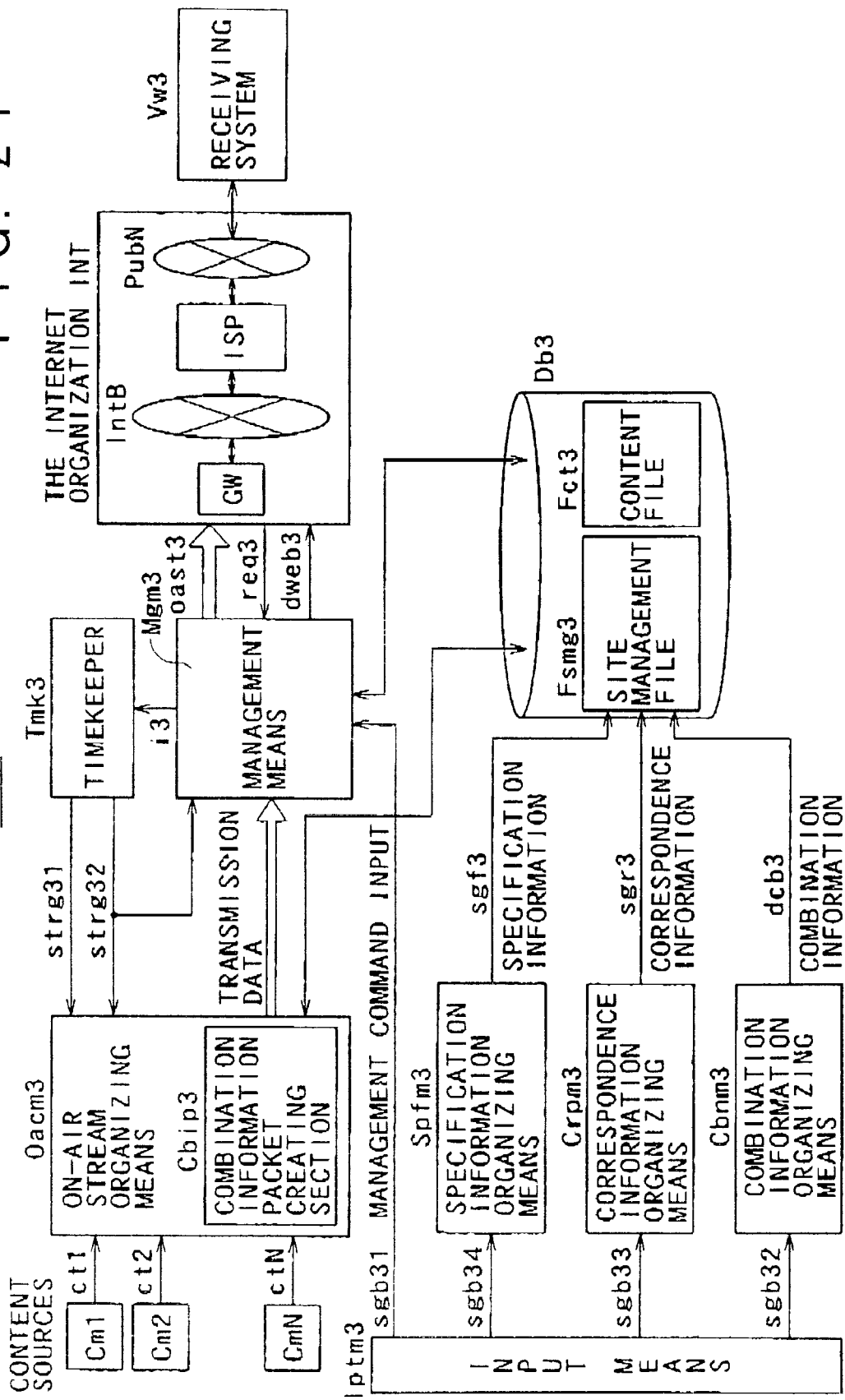
FIG. 21 is a block diagram illustrating a third embodiment of the network delivery data transmitting system to which a third embodiment of the network delivery data transmitting system is applied.

FIG. 21 is a block diagram illustrating the third embodiment of the network delivery data transmitting system to which the third embodiment of the network delivery data transmitting method is applied.

FIG. 22 illustrates packet configurations.

Figure 24:
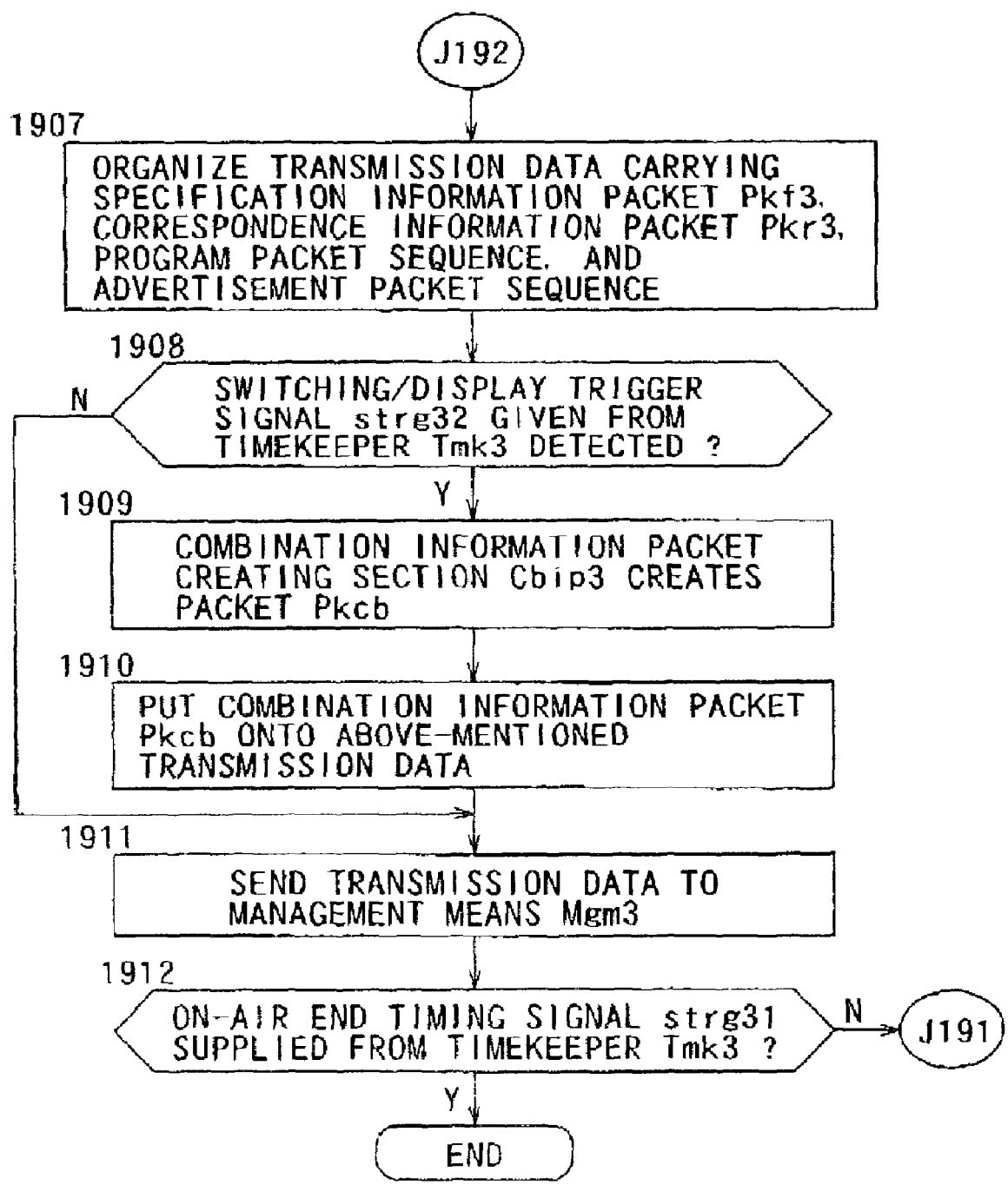
FIG. 24 is a flowchart continued from the flowchart shown in FIG. 23.
Figure 25:
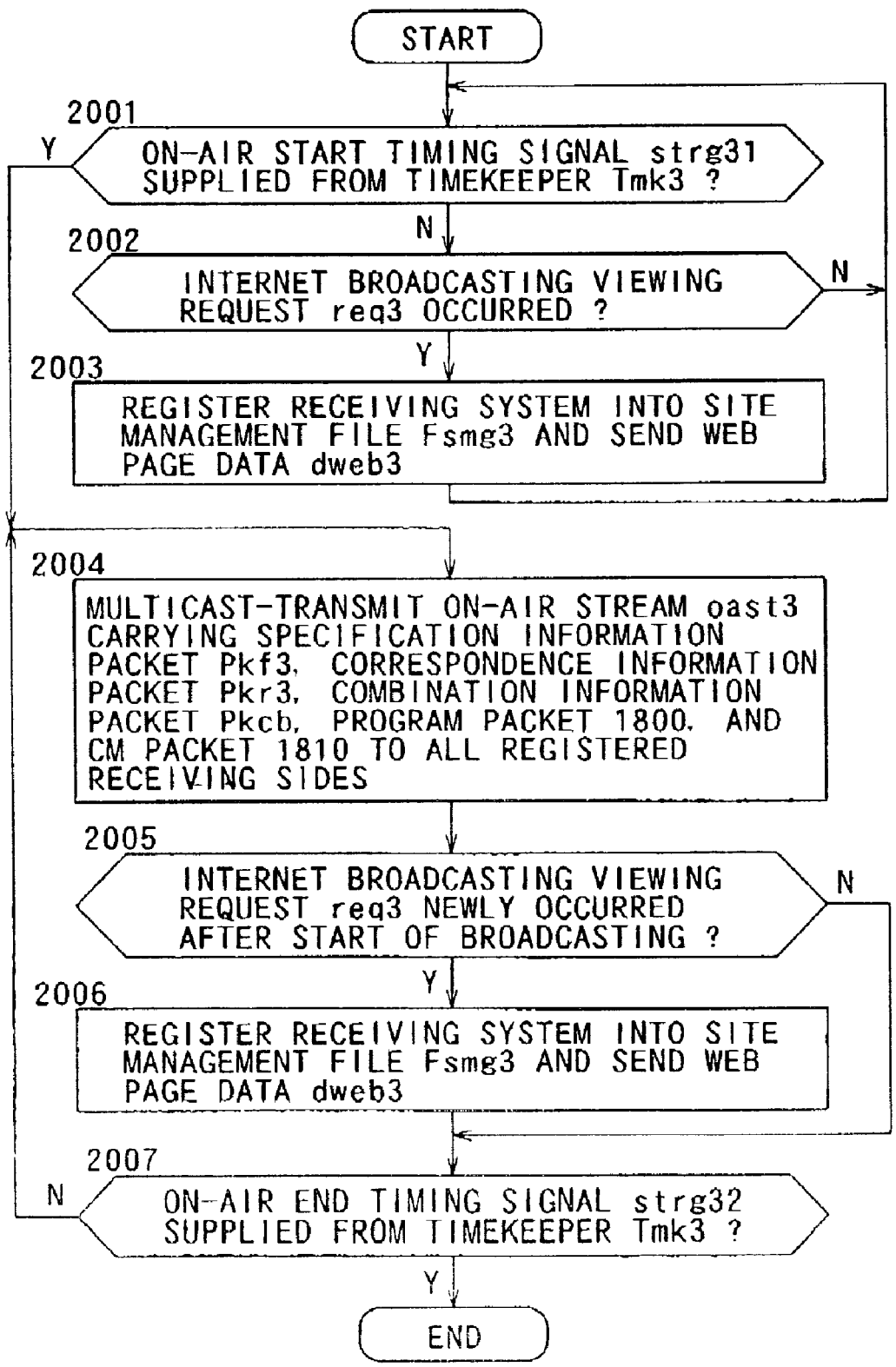
FIG. 25 is a flowchart describing operations of the network deliver data transmitting system shown in FIG. 21.

FIGS. 23 through 25 are flowcharts describing operations of the network delivery data transmitting system shown in FIG. 21.

Figure 26:
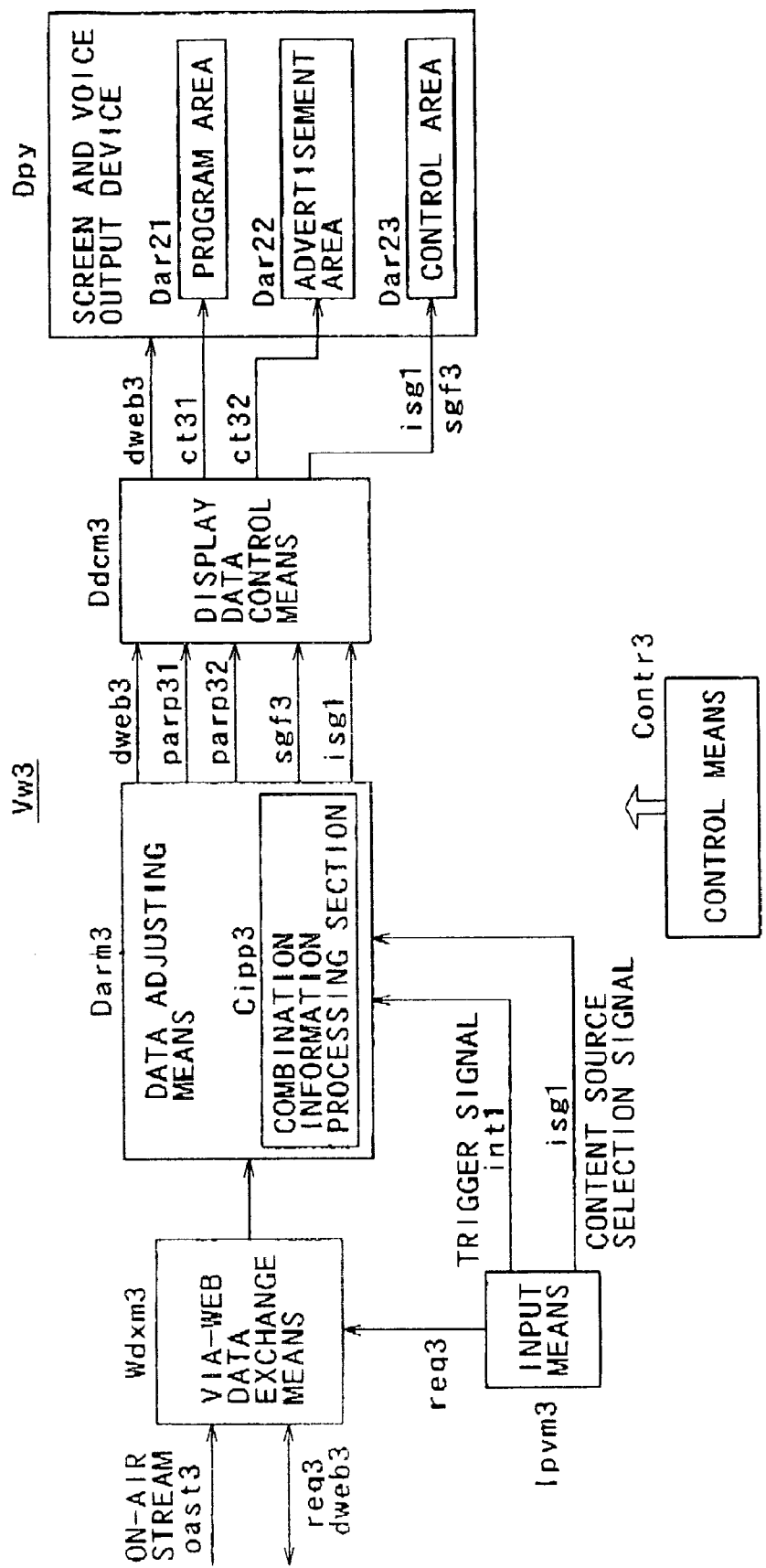
FIG. 26 is a block diagram illustrating a third embodiment of the network delivery receiving system to which a third embodiment of the network delivery data receiving system is applied.

FIG. 26 is a block diagram illustrating the third embodiment of the network data receiving system to which the third embodiment of the network data receiving method is applied.

Figure 27:
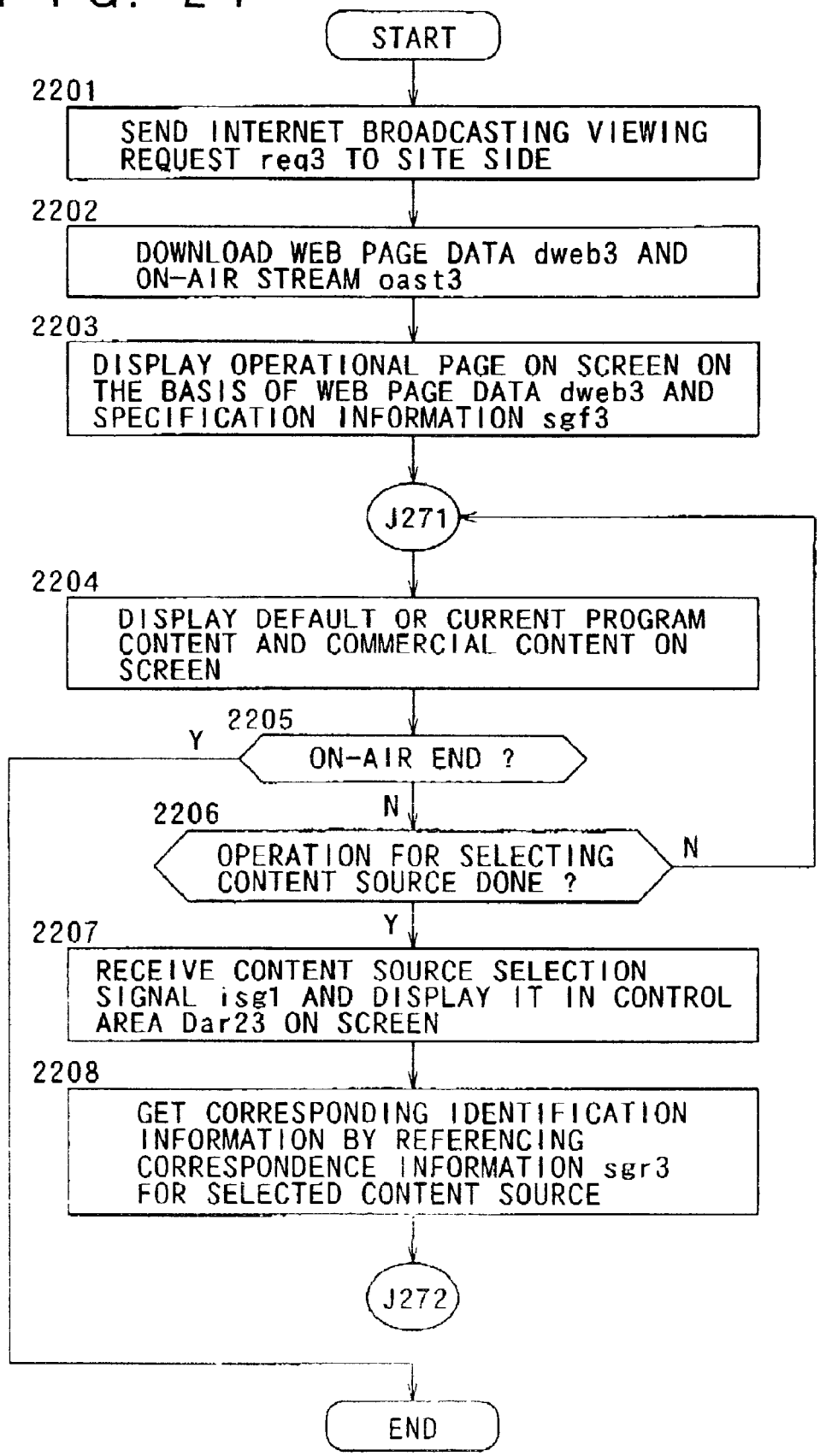
FIG. 27 is a flowchart describing operations of the network delivery data receiving system shown in FIG. 26.
Figure 28:
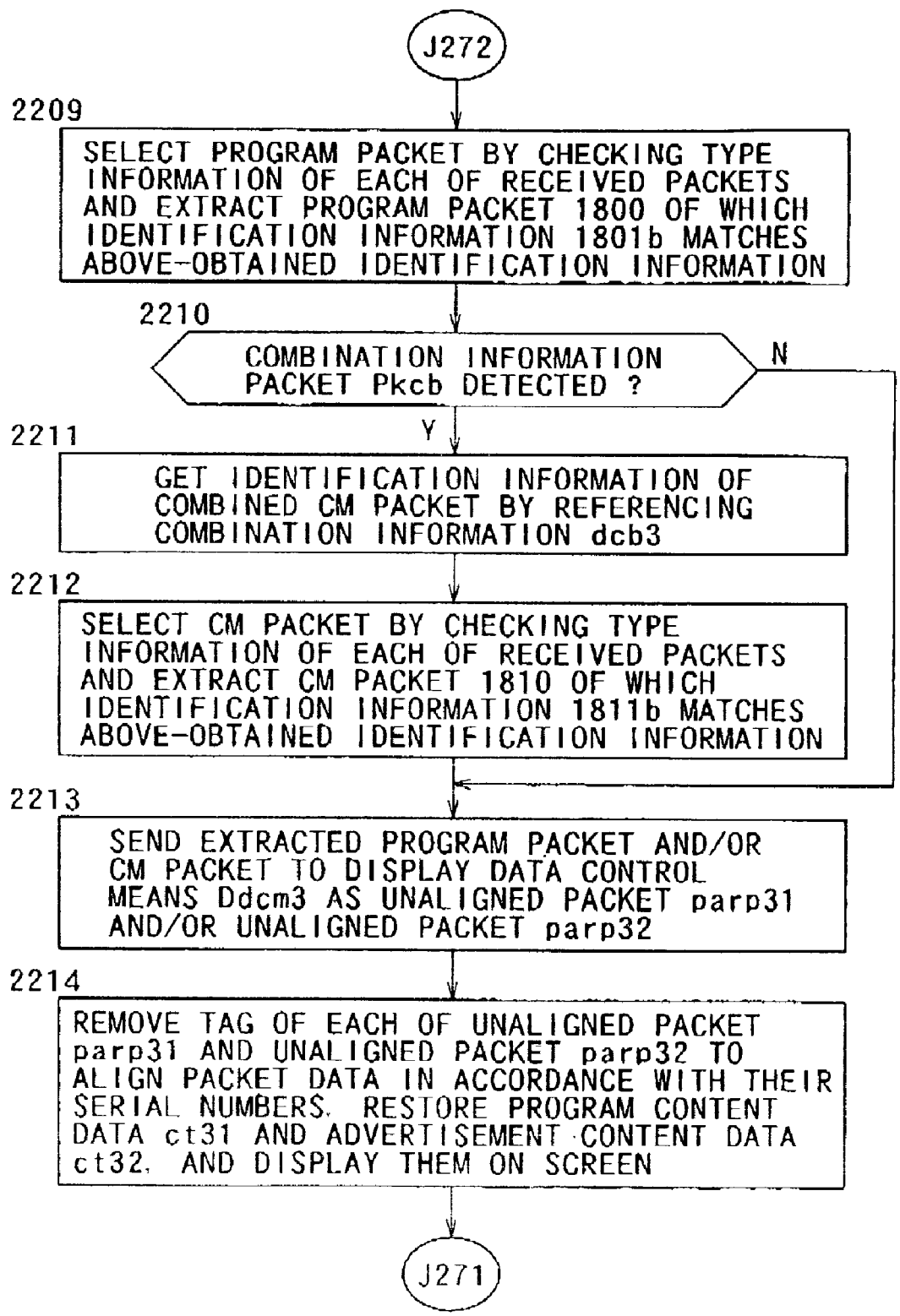
FIG. 28 is a flowchart continued from the flowchart shown in FIG. 27.

FIGS. 27 and 28 are flowcharts describing operations of the network data receiving system shown in FIG. 26.

As with the first and second embodiments, in this third embodiment, the supplying of specification information allows the viewer to select desired content sources and the supplying of correspondence information allows the receiving system to extract program packets concerned and restore the corresponding content data. In the third embodiment, as with the second embodiment, banner advertisement data or commercial content data regarded high in advertisement effects are combined with each piece of program content data for restoration. In this case, it is preferable that the combination be set on the transmitting system side on an as-desired and free basis and changed in a dynamic manner and the setting itself be easy and highly expandable. For example, it is preferable that alteration of advertisement content data combined on the basis of the circumstance under broadcasting can be performed dynamically and easily as desired.

Therefore, the third embodiment is configured such that a combination information packet carrying the information about the combination of program content and advertisement content and a method of displaying each of combined pieces of content is organized, the organized combination information packet is put on an on-air stream along with but independently of program packets sequence and advertisement packet sequences, and the resultant on-air stream is supplied to the receiving system.

The third embodiment of the network delivery data transmitting system shown in FIG. 21 is obtained by applying the third embodiment of the network delivery data transmitting system associated with the present invention, in which a transmitting system Svs3, the data transmitting side, delivers broadcast programs to a receiving system Vw3 via an Internet organization INT.

The transmitting system Svs3 is a multi-content-type Internet broadcasting service provider site, which is realized by a computer system based on a combination of a mainframe computer, a work station, a server machine, and a personal computer for example as the platform on the provider side. This configuration is substantially the same as that of the above-mentioned second embodiment, so that the description of the constitution of the second embodiment will be used.

The transmitting system Svs3 selects content sources from externally attached and/or internal plural content sources to provide content sources Cm1 through CmN to be applied to a broadcast program concerned, organizes on-air content by capturing content data ct1 through ctN from these content sources, and sends the organized on-air content to the receiving system Vw3 via the Internet organization INT upon reception of a viewing request req3 from the receiving system Vw3, which is a Web client, via the Internet organization INT. The content sources Cm1 through CmN and the content data ct1 through ctN are substantially the same as those descried with the second embodiment, so that their descriptions will be omitted.

The transmitting system Svs3 comprises an input means Iptm3, a correspondence information organizing means Crmp3, a specification information organizing means Spfm3, a combination information organizing means Cbnm3 organizing combination information dcb3 which formed from program content and advertisement content, a timekeeper Tmk3, an on-air stream organizing means Oacm3 having, as its one of functions, a combination information packet creating section Cbip3 for creating a combination information packet carrying combination information dcb3 and methods of displaying program packet sequences and advertisement packet sequences, a management means Mgm3, and a database server Db3.

The input means Iptm3 is constituted by a device through which the system administrator can input commands for example and its control program.

(1) The input means Iptm3 supplies commands and input values necessary for the organizing of specification information sgf3 and correspondence information sgr3 to be described later, the specifying the broadcasting start/end time of each broadcasting program and the handling of content data ct1 through ctN to the each means, then supplies to the management means Mgm3 as management command input sgb31.

(2) The input means Iptm3 supplies a combination command input sgb32 to the combination information organizing means Cbnm3.

(3) The input means Iptm3 supplies correspondence command input sgb33 to the correspondence information organizing means Crpm3.

(4) The input means Iptm3 supplies specification command input sgb34 to the specification information organizing means Spfm3.

In addition to the commands for combining desired program content and advertisement content, the combination command input sgb32 includes a command for specifying the method of displaying (whether program content and advertisement content are displayed in a switched manner or both at once) the combined program content and advertisement content.

The correspondence information organizing means Crpm3 is provided as a program which is readable and executable by the CPU of this system, sets an identification number to each of the content sources to be used among the content sources Cm1 through CmN on the basis of the specification command input sqb33 to provide correspondence information sgr3, and organizes a correspondence information packet Pkr3 carrying correspondence information sgr3, recording and storing the packet into a site management file Fsmg3 to be described later of the database server Db3. This correspondence information packet Pkr3 is accessed by the on-air stream organizing means Oacm3.

The specification information organizing means Spfm3, provided as a program which is readable and executable by the CPU of this system, sets description data of content sources Cm1 through CmN to be used on the basis of the specification command input sgb34 to provide specification information sgf3 and organizes a specification information packet Pkf3 carrying the specification information sgf3 to be recorded and stored in the site management file Fsmg3 of the database server Db3, This specification information packet Pkf3 is accessed by the on-air stream organizing means Oacm3.

The combination information organizing means Cbnm3, provided as a program which is readable and executable by the CPU of this system, sets, on the basis of the combination command input sgb32, a combination number for relating the program content data with the advertisement content data (banner advertisement content data or advertisement content data) combined therewith to provide combination number information dcb3 to be recorded and stored in the site management file Fsmg3. This combination information dcb3 includes the information associated with the method of displaying program content and advertisement content and is accessed by the combination information packet creating section Cbip3 of the on-air stream organizing means Oacm3.

The timekeeper Tmk3 is a software timer and provided as a program which is readable and executable by the CPU of this system and manages the broadcasting start/end time specified by the management means Mgm3 for on-air streams including an on-air stream oast3. When the broadcasting start or end time for an on-air stream concerned has been reached, the timekeeper Tmk3 supplies a timing signal strg31 to the on-air stream organizing means Oacm3 and the management means Mgm3.

In addition, the timekeeper Tmk3 receives display timing information including the switching between program content and advertisement content from the management means Mgm3 to supply a trigger signal stgr32 to the on-air stream organizing means Oacm3.

The database server Db3 is constituted by a magnetic disk recording device and/or optical disk recording device, stores a content data file Fct3 for storing at least any of the content data ct1 through ctN supplied from the content sources Cm1 through CmN and a site management file Psmg3 for recording and holding the management data associated with this Internet broadcasting service, and is accessed by the management means Mgm3 or the on-air stream organizing means Oacm3 for example for read/write operations. As with the above-mentioned second embodiment, it is preferable to use a mass-storage, high-speed disk array system such as a RAID system for the database server Db3.

The on-air stream organizing means Oacm3 is one embodiment of a transmission data organizing means according to the present invention and provided as a program which is readable and executable by the CPU of this system.

The on-air stream organizing means Oacm3 captures content data ct1 through ctN supplied from the content sources Cm1 through CmN to be used. As required, any of content data ct1 through ctN may be recorded and stored in the content file Fct3 of the database server Db3 as program content data and/or advertisement content data (banner advertisement content data or commercial content data). Therefore, the on air stream organizing means Oacm3 can get necessary content data ct1 to ctN from among the content data to be supplied in real time from the content sources Cm1 through CmN or the content data recorded to the database server Db3 at the on-air time.

On the basis of the above-mentioned specification information sgf3 supplied from the specification information organizing means Spfm3, the on-air stream organizing means Oacm3 organizes the specification information packet Pkf3 for describing the content sources Cm1 to CmN to be used. Also, on the basis of the above-mentioned correspondence information sgr3 supplied from the correspondence information organizing means Crpm, the on-air stream organizing means Oacm3 organizes the correspondence information packet Pkr3 which specifies the identification numbers of the content sources Cm1 to CmN to be used.

In addition, the on-air stream organizing means Oacm3 divides each of captured program and advertisement content data ct1 to ctN or read from the content file Fct3 of the database server Db3 into plural data fragments, adds a tag to each data fragment to provide program packets and CM packets, and forms program packet sequences and CM packet sequences composed of these plural packets. The configurations of the each program packet and CM packet thus formed are described below with reference to FIG. 22.

As packets, plural program packets 1800 and plural CM packets 1810 as shown are formed.

The program packet 1800 is configured by program packet data 1802 and a tag 1801 attached thereto. The tag 1801 has type information 1801$a$, identification information 1801$b$, and serial number 1801$c$ in this order in 3-field configuration.

The type information 1801$a$ indicates that this packet is a program packet.

The identification information 1801$b$ is the identification information for this program packet and indicates from which content source these content data have been packetized.

The serial number 1801$c$ is the serial number of this program packet. By aligning the program packets in the order of their serial numbers, the program content data can be restored.

The CM packet 1810 is associated with banner advertisement or commercial and configured by CM packet data 1812 and a tag 1811 attached thereto. The tag 1811 has type information 1811$a$, identification information 1811$b$, and serial number 1811$c$ in this order in 3-field configuration.

The type information 1811$a$ indicates that this packet is a CM packet.

The identification information 1811$b$ is the identification information of this CM packet.

The serial number 1811$c$ is the serial number of this CM packet. By aligning the CM packets in the order of their serial numbers 1811$c$, the CM content data can be restored.

The following describes the combination information packet Pkcb shown in FIG. 22

The combination information packet Pkcb is configured by a cable composed of the number of lines equal to the number of program content items. The first line for example has the first program content identification information 1801$b$(1) accompanied by display control information y(1) of this program content and the identification information 1811$b$(1) of the advertisement content to be combined with this program content accompanied by display control information z(1) of this advertisement content.

The display control information y(1) and the display control information z(1) are each a binary flag, "0" indicative of not displaying content while "1" indicative of displaying content The combination of program content and advertisement content is identified by the program content identification information 1801b(j) and the combined advertisement content identification information 1811b(j) in each line (line j). The display of the program content is controlled by the display control information y(j) and the display of the combined advertisement content is controlled by the display control information z(j).

For example, if a certain line is "0" "0011" "1" "0110", then the sixth advertisement content is combined with the third program content and, when the combination information packet Pkcb of the combination is detected and effectuated, the display of the third program content displayed so far is stopped to display the sixth advertisement content. This is the switching between display screens. On the other hand, it a certain line is "1" "0011" "1" "0110", then the display of the third program content and the display of the sixth advertisement content are executed concurrently. Thus, issuing the combination information packet Pkcb at a given or predetermined time allows the setting of content combinations as desired and the controlling of screen display and erasure as desired.

Upon reception of a timing signal sgrg31 from the timekeeper Tmk3, the on-air stream organizing means Oacm3 organizes transmission data including the specification packet Pkf3 and the correspondence information packet Pkr3 in addition to the plural program packet sequences composed of the above-mentioned plural program packet 1800 sequences and the plural CM packet sequences composed of the above-mentioned plural CM packet 1810 sequences and sends the resultant transmission data to the management means Mgm3.

In addition, upon reception of a trigger signal strg32, the on-air stream organizing means Oacm3 adds the combination information packet pkcb to the above-mentioned transmission data and sends the resultant transmission data to the management means Mgm3.

The management means Mgm3 has a data line terminating device which is connected to the Internet organization INT for data transfer, provided as a computer program for controlling this device and others, manages and controls the entire operation of the Web site, organizes data carrying the screen and voice (GUI data) to be displayed and reproduced on the receiving system Vw3 and transmission information, and executes information transfer with the receiving system Vw3. In addition, the management means Mgm3 has a data encryption/decryption capabilities, not shown.

Upon reception of a viewing request req3 from the receiving system Vw3 via the Internet organization INT, the management means Mgm3, operating in accordance with a management command input sgb31 entered by the operator for example, newly creates a customer file of the receiving System Vw3 on the site management file Fsmg3 or updates the existing customer file, and then sends the Web page data dweb3 to the receiving system Vw3 via the Internet organization INT. The transfer of the above-mentioned viewing request req3 and Web page data dweb3 is performed in compliance with the RTSP standard associated with both-way communication.

In addition, the management means Mgm3 sends scheduled on-air start/end time information of each broadcast program and display including switching) timing information for program content and advertisement content to the timekeeper Tmk3 as management information i3.

On the other hand, upon reception of a timing signal strg31 from the timekeeper Tmk3 at on-air start time, the management means Mgm3 organizes an on-air stream oast3 carrying the above-mentioned packet group (the plural program packet sequences, the plural CM packet sequences, the correspondence information packet, the specification information packet, and/or the combination information packet) on the basis of the transmission data supplied from the on-air stream organizing means Oacm3 and sends the organized on-air stream oast3 to the receiving system Vw3 via the Internet organization INT. The transmission of this on-air stream oast3 is performed in compliance with RTP/RTCP associated with video and audio streaming.

The following describes operations of the transmitting systems Svs3. FIGS. 23 and 24 are flowcharts describing the main operations associated mainly with the on-air stream organizing means Oacm3. FIG. 25 is a flowchart describing the main operation associated mainly with the management means Mgm3.

In step 1900, the organization of the specification information sgf3 and specification information packet Pkf3 and the correspondence information sgr3 and correspondence information packet Pkr3 on the basis of the input value for specifying content sources to be used and the recording of these organized information and packets to the database server Db3 are performed by the specification information organizing means Spfm3 and the correspondence information organizing means Crpm3. The processing procedures for these operations are the same as those of steps 401 through 405 shown in FIG. 4.

In Step 1901, the combination information organizing means Cbnm3 enters a loop for waiting for the transmission of a combination command input sgb32 from the input means Iptm3. The combination command input sgb32 is an input for the host of that site to specify the advertisement packet sequences to be combined with the program packet sequences to be put on this broadcast program. Receiving this command input, the combination information organizing means Cbnm3 organizes combination information dcb3 in step 1902 and stores the organized information into the site management file Fsmg3 of the database server Db3.

Next, the on-air stream organizing means Oacm3 enters a loop for determining whether or not the on-air start time has been reached (in step 1903). This decision is made on the basis of a timing signal strg31 which is supplied from the timekeeper Tmk3 at the on-air start time of the on-air stream concerned (for example, oast3). Receiving this timing signal strg31, the on-air stream organizing means Oacm3 captures predetermined plural program content data and predetermined plural CM content data in step 1904. These content data are captured from any of the content sources Cm1 through CmN in real time and/or read from the content file Fct3 of the database server Db3. The captured content data are divided to form program packet data 1802 or advertisement packet data 1812.

In step 1905, the on-air stream organizing means Oacm3 attaches the tag 1801 to each program packet data 1802 to form program packets 1800. The configuration of the tag 1801 is the same as shown in FIG. 22. The formed program packets 1800 are arranged in time sequence to organize a program packet sequence. Thus, the program packet sequences are organized for the plural program content data applied to this broadcast program.

Likewise, in step 1906, the on-air stream organizing means Oacm3 attaches a tag 1811 to each CM packet data 1812 to form CM packets 1810. The configuration of the tag 1811 is the same as shown in FIG. 22. The formed CM packets 1810 are arranged in time sequence to form a CM packet sequence. Thus, the advertisement packet sequences are organized for all plural advertisement content data applied to this broadcast program.

In step 1907, the on-air stream organizing means Oacm3 forms transmission data which carries the specification information packet Pkf3, the correspondence information packet Pkr3, each program packet sequence, and each advertisement packet sequence. In step 1908, the on-air stream organizing means Oacm3 checks if a trigger signal strg32 associated with switching between program content and advertisement content or other display operations has been supplied from the timekeeper Tmk3. If the trigger signal is not found, the procedure goes to step 1911. On the other hand, if the trigger signal strg32 is found the combination information packet creating section Cbip3 reads the combination information dcb3 from the site management file Fsmg3 to create a combination information packet Pkcb on the basis of the preset combination and display method in step 1909, and adds this combination information packet Pkcb to the above-mentioned transmission data in step 1910.

In step 1911, the on-air stream organizing means Oacm3 sends the above-mentioned organized transmission data to the management means Mgm3.

In step 1912, the on-air stream organizing means Oacm3 checks if a timing signal srgr31 indicative of on-air time end has been supplied from the timekeeper Tmk3. If this timing signal is not found the on-air stream organizing means determines that on-air continues and the procedure returns to step 1904 to repeat the above-mentioned processing. If this timing signal is found, the processing comes to an end.

As shown in FIG. 25, the management means Mgm3 checks in step 2001 if a timing signal stgr31 indicative of on-air start time has been supplied from the timekeeper Tmk3. If this timing signal is not found, the management means Mgm3 determines that it is before the on-air time and goes to step 2002, entering a loop for checking if an Internet broadcasting viewing request req3 from the receiving system Vw3 has newly occurred. If this request is found newly supplied, the management means Mgm3 accepts this request in step 2003, customer-registering it into the site management file Fsmg3. Then, the management means Mgm3 sends Web page data dweb3 extracted from the site management file Fsmg3 to the registered receiving system Vw3, returning to step 2001. Thus, the management means Mgm3 continues the acceptance and registration of new customers and the transmission of operation-associated Web page data until the on-air start time comes.

On the other hand, when the on-air start time comes in step 2001, the management means Mgm3 multicast-transmits, in step 2004, an on-air stream oast3 multiplexed with the plural program packet sequences 1800, plural CM packet sequences 1810, specification information packet Pkf3, and correspondence information packet Pkr3, and combination information packet Pkcb to all registered receiving systems Vw3, thereby starting Internet broadcasting.

In step 2005, upon detection of a new viewing request after starting of Internet broadcasting, the management means Mgm3 accepts this request in step 2006, customer-registers this request into site management file Fsmg3, immediately sends the web page data dweb3 captured from the site management file Fsmg3 to the newly registered receiving system Vw3, and goes to step 2007.

In step 2007, the management means Mgm3 checks if a timing signal stgr31 indicative of on-air time end has been supplied from the timekeeper Tmk3. If this timing signal is not found, the management means Mgm3 determines that the on-air continues and the process returns to step 2004 to continue the processing. If this timing signal is found, the management means Mgm3 determines that the on-air time has come to an end, upon which the processing comes to an end.

Thus, the transmitting system Svs3 is configured and operates.

The following describes the configuration of the receiving system Vw3 with reference to FIG. 26.

As with the above-described receiving system Vw2, the receiving system Vw3 is mainly realized as a household Internet service compatible apparatus such as a network connectable system including a personal computer, an Internet compatible television receiver, an Internet compatible mobile telephone, an Internet compatible mobile information terminal. The receiving system Vw3 accesses Web sites operated by the transmitting system Svs3, an Internet broadcasting service provider via the Internet organization INT to receive a multicast-delivered on-air stream oast3. Therefore, the receiving system Vw3 has a processor (CPU), memory devices such as RAM and ROM, an input/output interface, and a bus, each not shown, which, however, are also the components of each general-purpose computer system; therefore these components will not be described for the brevity of description.

The receiving system Vw3 comprises an input means Ipvm3, a via-Web data exchange means Wdxm3 (hereafter referred to simply as a data exchange means Wdxm3), a data adjusting means Darm3, a display data control means Ddcm3, a screen and voice output device Dpy, and a control means Contr3. The data adjusting means Darm3 has a combination information processing section Cipp3 as one of its capabilities.

The Web data exchange means Wdxm3 is one embodiment of the data exchange means according to the present invention. The data adjusting means Darm3 and display data control means Ddcm3 are embodiments of the data processing means according to the present invention. The screen and voice output device Dpy is one embodiment of the output means according to the present invention.

Although not shown, the receiving system Vw3 may have a recording device (a home server Hsv for example) shown in FIG. 17.

The input means Ipvm3 is constituted by a user-operated device and software for performing an input operation; in computer systems, the input means Ipvm3 is constituted for example by a mouse, a screen touchpad, and input processing software in general.

When the viewer logs in the Internet provider and accesses a Web site, the input means Ipvm3 supplies login command input to the Web data exchange means Wdxm3. Next, when the viewer performs form input to view the Internet broadcasting, the input means Ipvm3 issues a viewing request req3 to the Web data exchange means Wdxm3. When the viewer specifies a desired content source from a site operation screen (or a top page) the input means Ipvm3 supplies a content source selection signal isg1 to the data adjusting means Darm3.

When a command indicative of the timing of displaying (including switching) a program and/or advertisement is entered by the viewer at a given or predetermined trigger time, the input means Ipvm3 supplies a trigger signal int1 associated with the display time of the program and/or advertisement to the data adjusting means Darm3. The trigger signal int1 is the same as described with the second embodiment.

The Web data exchange means Wdxm3 has a data line terminating device connected to the Internet organization INT for data exchange and is provided as a computer program including the control thereof, performing data exchange with the Web site via the Internet provider. To be more specific, the Web data exchange means wdxm3 issues a login request to the Internet provider and a viewing request req3 for viewing Internet broadcasting to the site side to receive site operation screen data dweb3 and an on-air stream oast3. The received data are sent to the data adjusting means Darm3.

The data adjusting means Darm3, provided as a program which is readable and executable by the CPU of this system, has the combination information processing section Cipp3 as one of its capabilities.

The data adjusting means Darm3 sends site operation screen data dweb3 supplied from the data exchange means Wdxm3 to the display data control means Ddcm3 and, at the same time, receives the correspondence information packet Pkr3, the specification information packet Pkf3, program packet sequences, advertisement packet sequences, and the combination information packet Pkcb from the data exchange means Wdxm3.

Next, the data adjusting means Darm3 extracts the specification information sgf3 from the specification information packet Pkf3 and sends the extracted information to the display data control means Ddcm3. At the same time, the data adjusting means Darm3 extracts the correspondence information sgr3 from the correspondence information packet Pkr3 and temporarily stores the extracted information. On the other hand, the combination information processing section Cipp3 detects the combination information packet Pkcb (refer to FIG. 22) to extract the combination information dcb3 and temporarily stores it.

The combination information processing section Cipp3 supplies a content source selection signal isg1 supplied from the input means Ipvm3 to the display data control means Ddcm3 and, on the basis of the content source selection signal isg1, references the above-mentioned correspondence information sgr3 to get the identification information corresponding to the selected content source, checks the tag 1801 (refer to FIG. 22, which holds the same with the following description) or 1811 attached to each packet to determine that this is the packet 1800 constituting the program packet sequences on the basis of time information 1801a, matches the identification information 1801b with the identification information obtained above to sequentially extract only the corresponding program packets 1800, and sequentially sends the extracted program packets to the display data control means Ddcm3 as unaligned packets parp31 associated with program.

On the other hand, when the combination information processing section Cipp3 matches the above-obtained identification information and combination information dcb3 to get the identification information of the advertisement content (for example, identification information 1811b(1) of the advertisement content shown in FIG. 22) combined with the above-mentioned program content (for example, identification information 1801b(1) of the program content shown in FIG. 22) to sequentially extracts the CM packets 1810 having this identification information 1811b(1), the data adjusting means Darm3 sends the extracted CM packets to the display data control means Ddcm3 as the unaligned packets parp32 associated with advertisement.

The transmission of the unaligned packets parp31 and parp32 to the display data control means Ddcm3 is controlled by the timing of detecting the above-mentioned combination information packet Pkcb. The display of these unaligned packets is controlled by the display control information (for example, y(1) and z(1) shown in FIG. 22) carried in the combination information packet Pkcb.

For example, in order to display banner advertisement content and program content concurrently, because the values of the display control information (for example, y(1) and z(1) shown in FIG. 22) are both set to "1", the data adjusting means Darm3 accordingly sends both the unaligned packets parp31 and parp32 to the display data control means Ddcm3; in order to switch from the display of a program content to the display of commercial content, because the value of y(1) is set to "0" and the value of z(1) is set to "1", the data adjusting means Darm3 accordingly stops sending the unaligned packets parp31, transmitting only the unaligned packets parp32.

In the above-mentioned configuration, the display timing and the display method are controlled in accordance with the detection of the combination information packet Pkcb and the information carried thereon. Alternatively, the timing and display method of the display, and/or erasure of program content and/or advertisement content may be controlled at given or predetermined trigger time to attain the same object as above. In the latter, the given or predetermined trigger time may be entered from the input means Ipvm3 into the data adjusting means Darm3 as a trigger signal int1 or another trigger signal not shown may be put on a on-air stream oast3 to be entered in the data adjusting means Darm3 via the data exchange means Wdxm3.

Alternatively still, the trigger signal int1 and another trigger signal not shown may be sent to the display data control means Ddcm3 to control the display of program content and/or advertisement content.

The display data control means Ddcm3, provided as a program which is readable and executable by the CPU of the system, performs data adjustment so that data are displayed in full screen on the screen and voice output device Dpy on the basis of the site operation screen data dweb3 supplied from the data adjusting means Darm3 and sends the adjusted data to the screen and voice output device Dpy. Likewise, on the basis of the specification information sgf3 and the content source selection signal isg1, the display data control means Ddcm3 performs data adjustment so that the data are displayed in an icon display area Dar23 on the site operation screen and supplies the adjusted data to the screen and voice output device Dpy.

Further, the display data control means Ddcm3 aligns the plural unaligned packets parp31 supplied from the data adjusting means Darm3 in accordance with their serial numbers (not shown but equivalent to the serial number 1801c shown in FIG. 22), removes the tags therefrom to restore the program content data ct31, performs data adjustment so that the restored program content data are displayed in a display area Dar21 on the screen of the screen and voice output device Dpy, and supplies the adjusted data to the screen and voice output device Dpy. Likewise, the display data control means Ddcm3 aligns the plural unaligned packets parp32 supplied from the data adjusting means Darm3 in accordance with their serial numbers (not shown but equivalent to the serial number 1811c shown in FIG. 22), removes the tags therefrom to restore the advertisement content data ct32, performs data adjustment so that the restored advertisement content data are displayed in a display area Dar22 on the screen of the screen and voice output device Dpy, and supplies the adjusted data to the screen and voice output device Dpy.

Thus, in accordance with the timing of receiving the unaligned packets parp31 and/or parp32, the display data control means Ddcm3 supplies the program content data ct31 and/or advertisement content data ct32 to the screen and voice output device Dpy.

Namely, when both the unaligned packets parp31 and parp32 are supplied, the display data control means Ddcm3 simultaneously supplies both the program content data ct31 and the advertisement content data ct32 to the screen and voice output device Dpy. At this moment, both the program content and the advertisement content are reproduced on the screen. This is especially suited when the advertisement content is banner advertisement.

When only the unaligned packets parp32 are supplied, only the advertisement content data ct32 are supplied to the screen and voice output device Dpy instead of the program content data ct31. In this case, the advertisement content is reproduced not in the advertisement area Dar22 but in the program area Dar21. This is the switching from program content to advertisement content, which is especially suited when the advertisement content is an above-mentioned commercial.

The screen and voice output device Dpy has a flat panel screen (a liquid crystal display, a plasma display, or an EL display for example) or a CRT monitor, displays site operation screen data dweb3 in full screen, specification information sgf3 and so on in the control area Dar23 inside the screen, program content data in the program area Dar21 inside the screen, and advertisement content data in the advertisement area Dar22 inside the screen.

The control means Contr3, provided as a program which is readable and executable by the CPU of the system, controls the operations of the entire receiving system Vw3.

Further, as with the above-described receiving system Vw2, the receiving system Vw3 may have the home server Hsv constituted by a mass storage magnetic recording disk drive HDD and the above-described special reproduction control capability, of which details were described before and therefore their description will be skipped.

The following describes operations of the receiving system Vw3 with reference to FIGS. 27 and 28. It is assumed that a log-in operation to the provider has been already been performed.

In step 2201, on the basis of a command from the input means Ipvm3, the data exchange means Wdxm3 sends an Internet broadcasting viewing request req3 to the Web site side. in step 2202, the data exchange means Wdxm3 downloads Web page data dweb3 and an on-air stream oast3 and sends them to the data adjusting means Darm3.

In step 2203, the data adjusting means Darm3 extracts specification information sgf3 from the specification information packet Pkf3 carried on the on-air stream oast3 and correspondence information sgr3 from the correspondence information packet Pkr3, and temporarily stores the extracted information. Next, sending the Web page data dweb3 and the specification information sgf3 to the display data control means Ddcm3, the display data control means Ddcm3 displays the Internet broadcasting operation page onto the screen and voice output device Dpy in full screen on the basis of the Web page data dweb and displays the specification information sgf3 in the control area Dar23 on the operation page screen.

Further, in step 2204, the data adjusting means Darm3 extracts default program packet sequences, extracts the CM packet sequences combined with the extracted default program packet sequences, and sends them to the display data control means Ddcm3 The display data control means Ddcm3 restores the program content data from the default program packet sequences, restores the CM content data from the CM packet sequences, and displays the restored data in the program area Dar21 and the advertisement area Dar22 on the operation page respectively.

Thus, the control area Dar23 on the screen shows the information about the content sources in use by the broadcast program concerned, the program area Dar21 restores the video and voice from the default content source, and the advertisement area Dar22 restores the CM content combined with the program content, thereby starting the reception of Internet broadcasting.

Currently, the default content source are displayed and sounded in the program area Dar21. At this moment, in step 2205, the control means Contr3 checks if a command for stopping the reception has been issued by the viewer or a command for stopping the reception has been issued by a built-in timer for example (namely, if the on-air is ended) if the reception is continued, the procedure goes to step 2206, in which the control means Contr3 enters a loop for waiting for the viewer to click the icon of another content source among the icons for selection displayed in the control area Dar23. If the viewer clicks that icon, it is detected by the input means Ipvm3, which generates a content source selection signal isg1 to send it to the data adjusting means Darm3.

In step 2207, the data adjusting means Darm3 sends the received content source selection signal isg1 to the display data control means Ddcm3, which displays this signal in the control area Dar23. Consequently, the selection by the viewer is reflected on the screen so that the viewer can check it.

In step 2208, the data adjusting means Darm3 specifies the content source selected on the basis of the content source selection signal isg1 and, by referencing the correspondence information sgr3, gets the identification information of the content source. In step 2209, by checking the type information 1801a or 1811a of the supplied packet, the data adjusting means Darm3 selects the program packets 1800 and extracts therefrom only the program packet 1800 of which identification information 1801b matches the above-obtained identification information.

In step 2210, the combination information processing section Cipp3 checks if the combination information packet Pkcb has been detected. If the combination information packet Pkcb is found not detected, the procedure goes to step 2213. If the combination information packet Pkcb is found detected, then the combination information processing section Cipp3 references the combination information dcb3 in step 2211 to obtain the identification information of the combined CM packets.

In step 2212, the data adjusting means Darm3 selects the CM packets 1810 by checking the type information 1811a of the received packets and extracts only the CM packets 1810 of which contents of the identification information 1811b match the contents of the above-obtained identification information. In step 2213, the data adjusting means Darm3 sends both or one of the above-extracted program packets 1800 and the above-extracted CM packets 1810 to the display data control means Ddcm3 as the unaligned packets parp31 and/or the unaligned packets parp32 respectively on the basis of the display control information indicated by the combination information dcb3.

In step 2214, the display data control means Ddcm3 aligns the unaligned packets parp31 in accordance with their serial numbers (equivalent to 1801c shown in FIG. 22), removes their tags, and aligns the program packet data (equivalent to 1802) to restore the program content data ct31, and/or aligns the unaligned packets parp32 in accordance with their serial numbers (equivalent to 1811c) removes their tags, and aligns the CM packet data (equivalent to 1812) to restore the advertisement content data ct32, thereby displaying the restored content data in the program area Dar21 and/or the advertisement area Dar22 on the operation screen. Thus, upon clicking the icon by the viewer, the current displaying and sounding of program content are automatically switched to the displaying and sounding of the desired program content. At the same time, the display of advertisement content is also automatically switched to the display of the advertisement content combined with the desired program content.

Then, back in step 2204, the current display is continued. If a command for stopping the reception is found in step 2205, the processing comes to an end. It should be noted that the processing in each of the above-mentioned steps is performed under the control of the control means Contr3.

Thus, the receiving system Vw3 is configured and operates.

According to the above-mentioned embodiment, the transmitting side-puts plural reproducible program packet sequences on a single on-air stream and sends it to the receiving side and, at the same time, the transmitting side sends identification information and correspondence information to the receiving side as shown in FIG. 21, so that the transmitting side can send plural freely selectable packet sequences at a time to the receiving side and, at the same time, send the information for the selection to the receiving side. On the other hand, as shown in FIG. 26, the receiving side can get the plural program packet sequences by receiving only one on-air stream and, by use of the obtained "information for selection", easily select any desired program packet sequences to restore desired content. Even during on-air time, the selection may be changed as desired, switching to the display of content to be restored. Consequently, during a live coverage of baseball game for example, the viewer can switch between the video displays having different camera positions and angles as desired.

Further, the transmitting side generates a combination information packet associated with the combinations of the above-mentioned program packet sequences and advertisement packet sequences, puts these plural advertisement packet sequences and the combination information packets onto one on-air stream, and sends them to the receiving side, so that, upon selecting certain program content and restoring it on the receiving side as described above, the advertisement content combined with the selected program content may be restored at the same time or the display may be switched to the display of the combined advertisement content at the predetermined timing, thereby enhancing advertisement effects. Further, because the transmitting side can create and update the combination information packet to set and update the combination with ease and as desired, the transmitting side can prepare and transmit the combination information packet having the contents with advertisement content regarded optimum for each program content combined as desired and, even during on-air time, change the combination as desired, thereby realizing dynamic advertisement effects.

Still further, because a single on-air stream can carry plural pieces of advertisement content, the number of advertisement quotas increases for more advertisers (or sponsors) so that many advertisers (or sponsors) can participate in the advertisement, thereby increasing the chances for each advertiser to buy advertisements. This means the possible increase in advertisement revenues on the transmitting side, or the provider side of the Internet broadcasting services.

The following describes a fourth embodiment of the network delivery data transmitting method and receiving method associated with the present embodiment and a fourth embodiment of the network delivery data transmitting system and receiving system associated with the present invention to which these network delivery data transmitting method and receiving method are applied.

Figure 29:
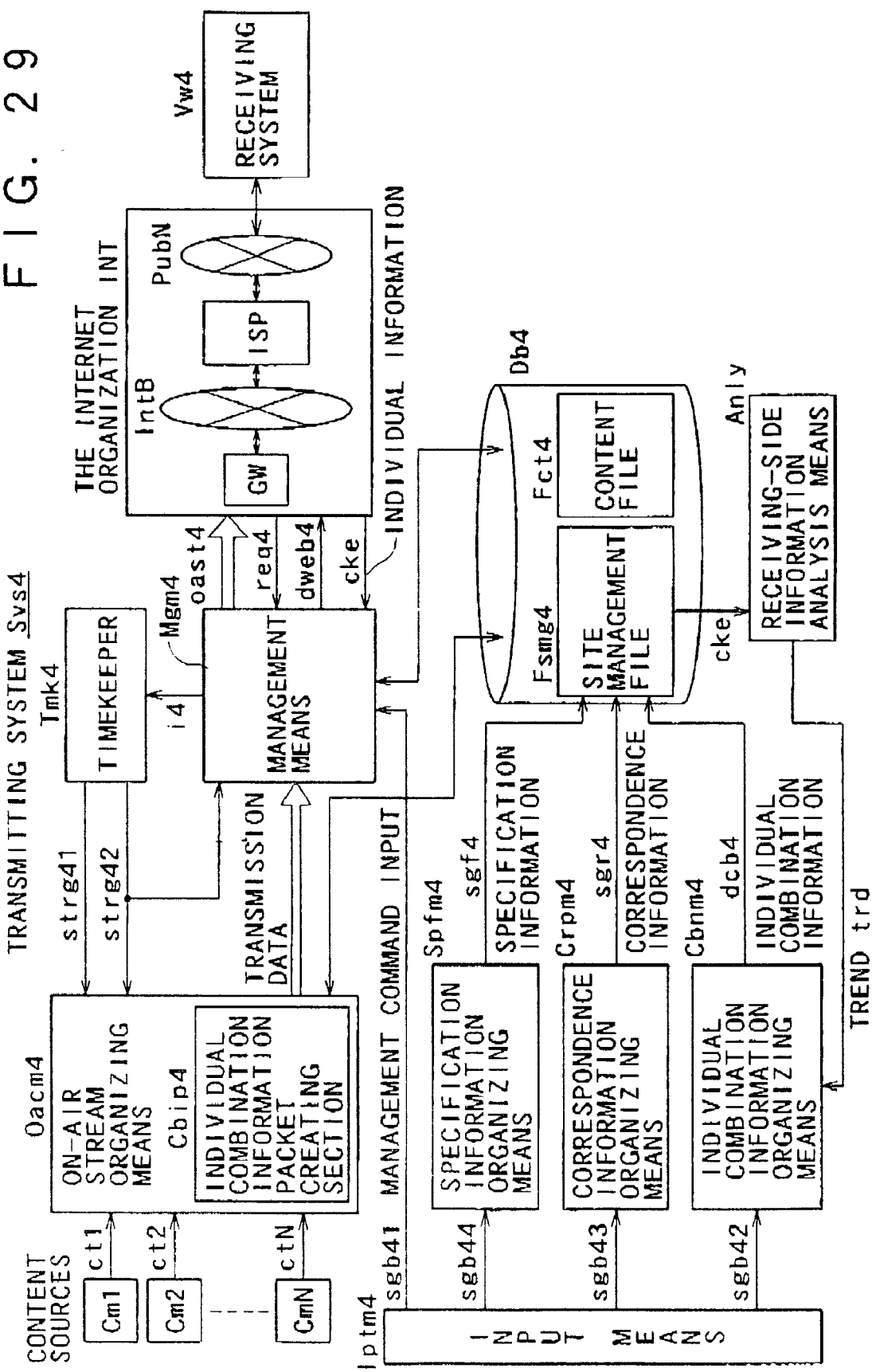
FIG. 29 is a block diagram illustrating a fourth embodiment of the network delivery data transmitting system to which a fourth embodiment of the network delivery data transmitting system is applied.

FIG. 29 is a block diagram illustrating the fourth embodiment of the network delivery data transmitting system to which the fourth embodiment of the network delivery data transmitting method is applied.

FIGS. 30 through 34 are flowcharts describing operations of the network delivery data transmitting system shown in FIG. 29.

Figure 35:
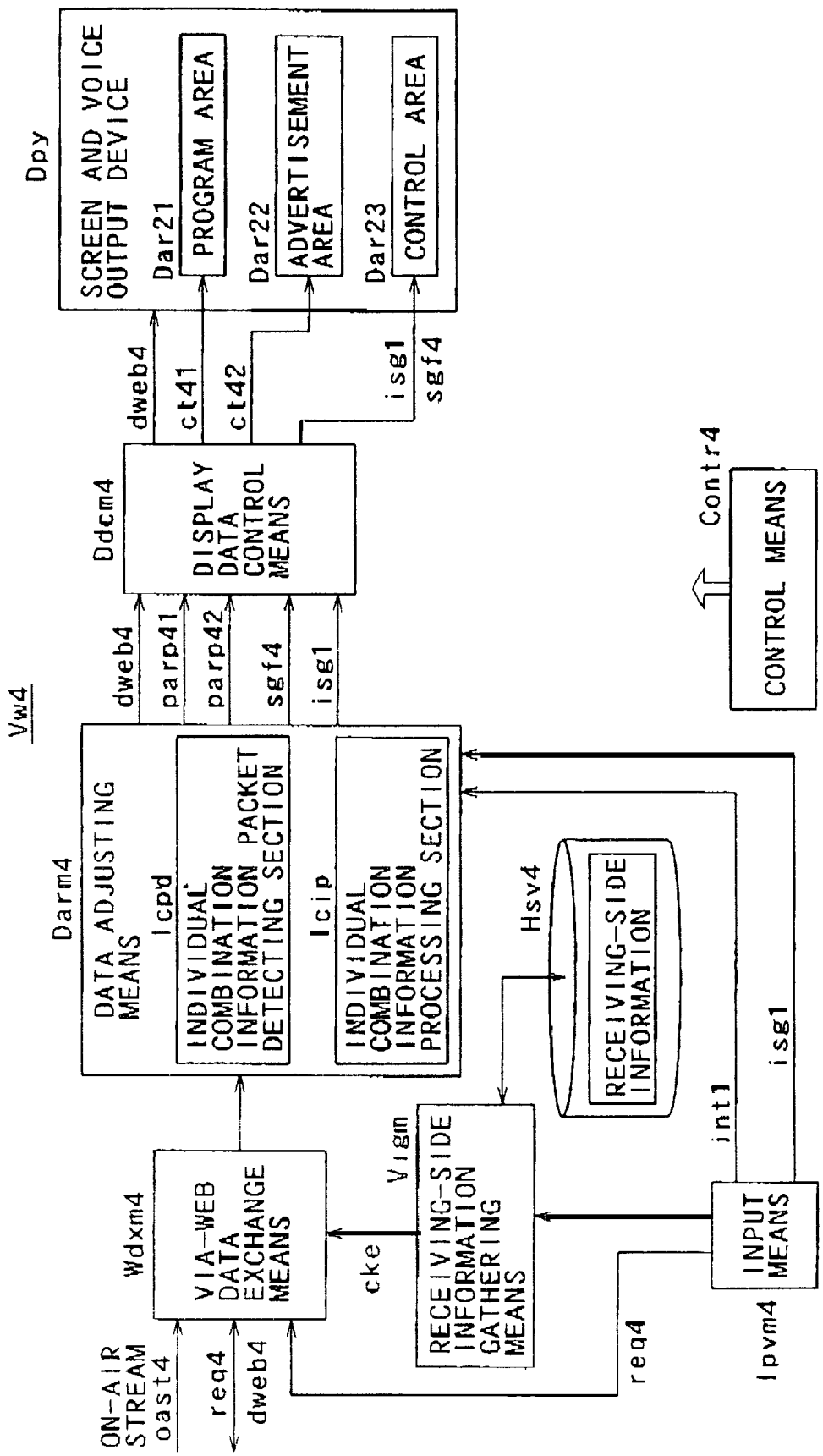
FIG. 35 is a block diagram illustrating a fourth embodiment of the network delivery data receiving system to which a fourth embodiment of the network delivery data receiving method is applied.

FIG. 35 is a block diagram illustrating the fourth embodiment of the network delivery data receiving system to which the fourth embodiment of the network delivery data receiving method is applied.

Figure 36:
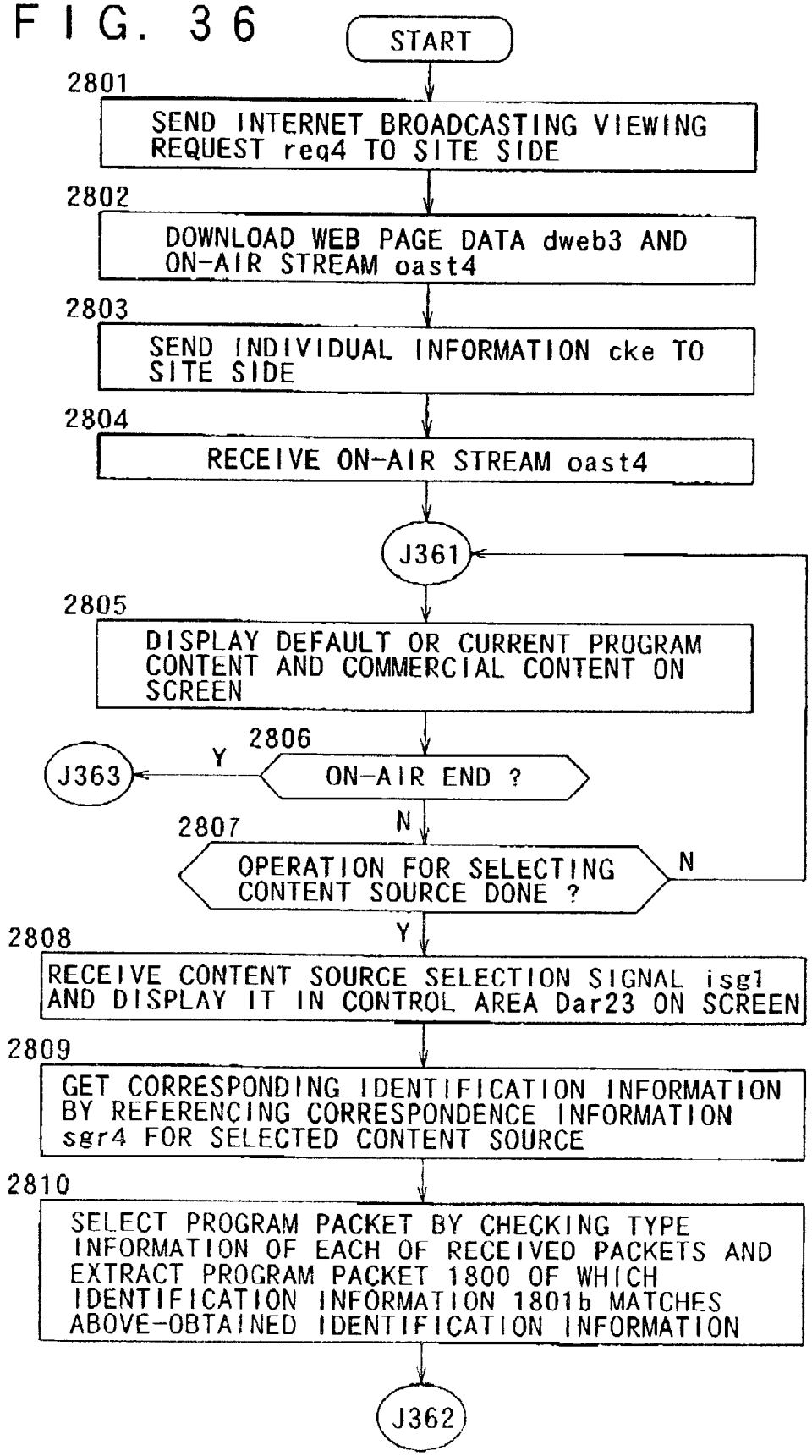
FIG. 36 is a flowchart describing operations of the network delivery data receiving system shown in FIG. 35.
Figure 37:
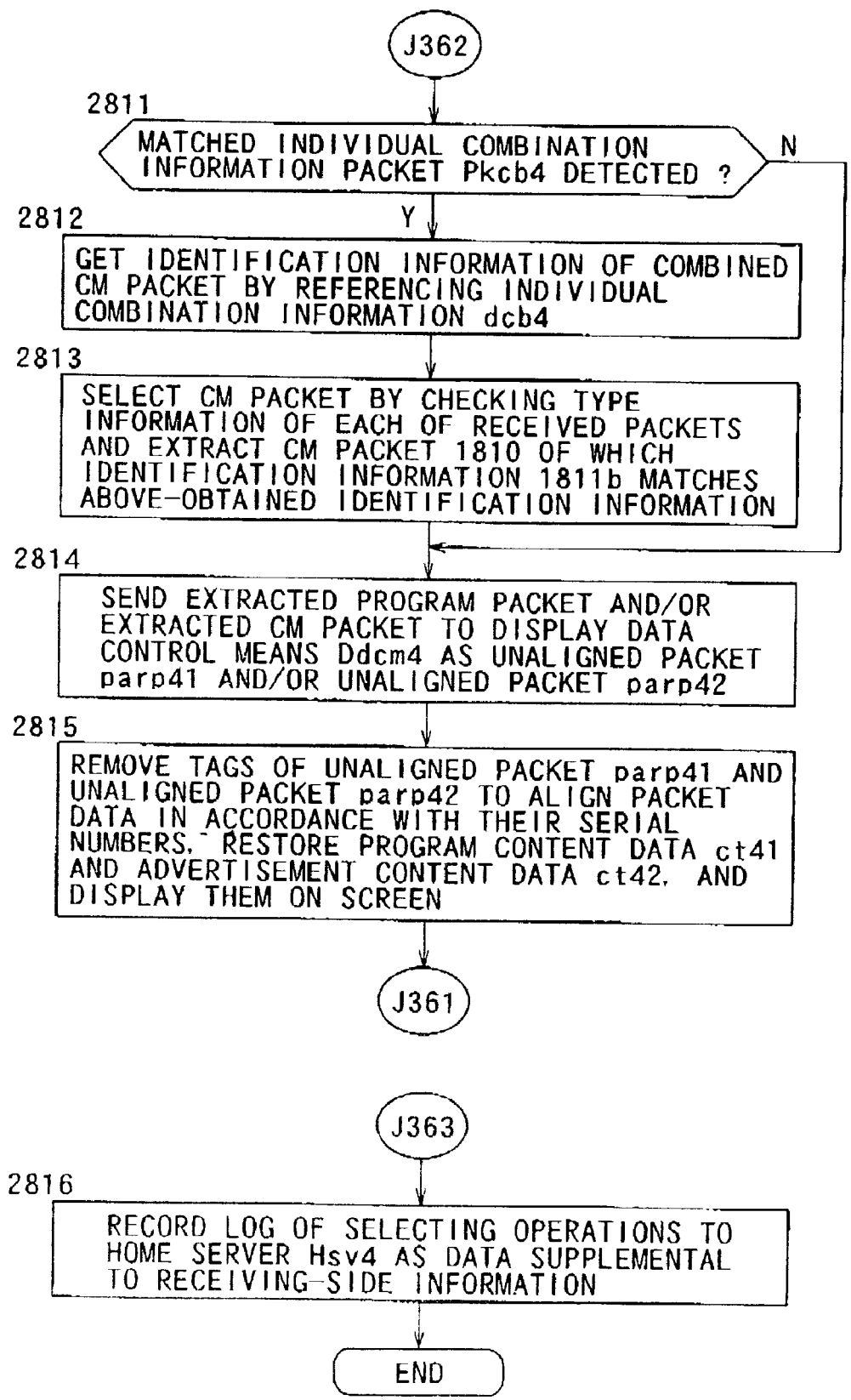
FIG. 37 is a flowchart continued from the flowchart shown in FIG. 36.
Figure 38:
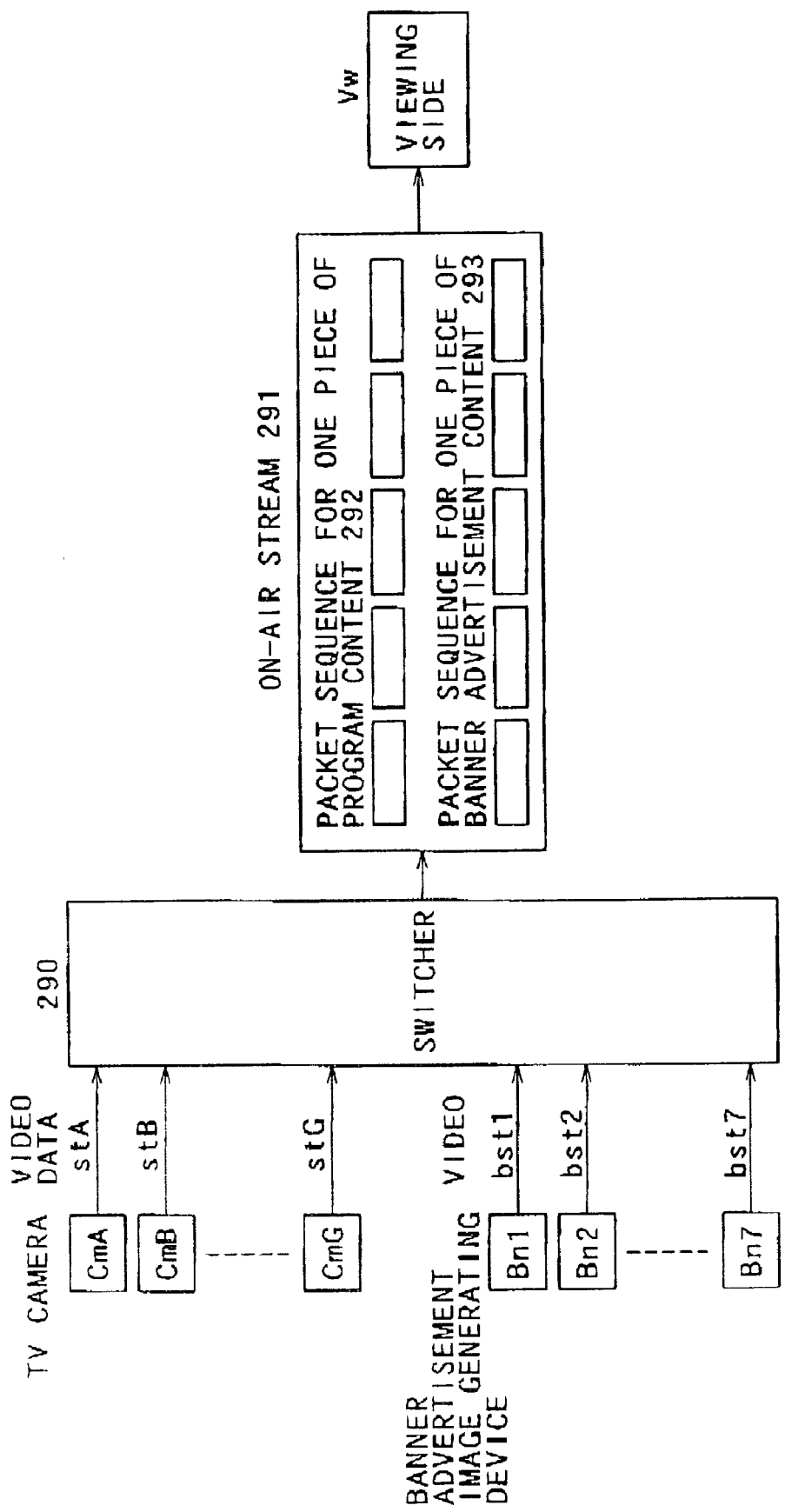
FIG. 38 illustrates a related-art banner advertisement transmission method.
Figure 39:
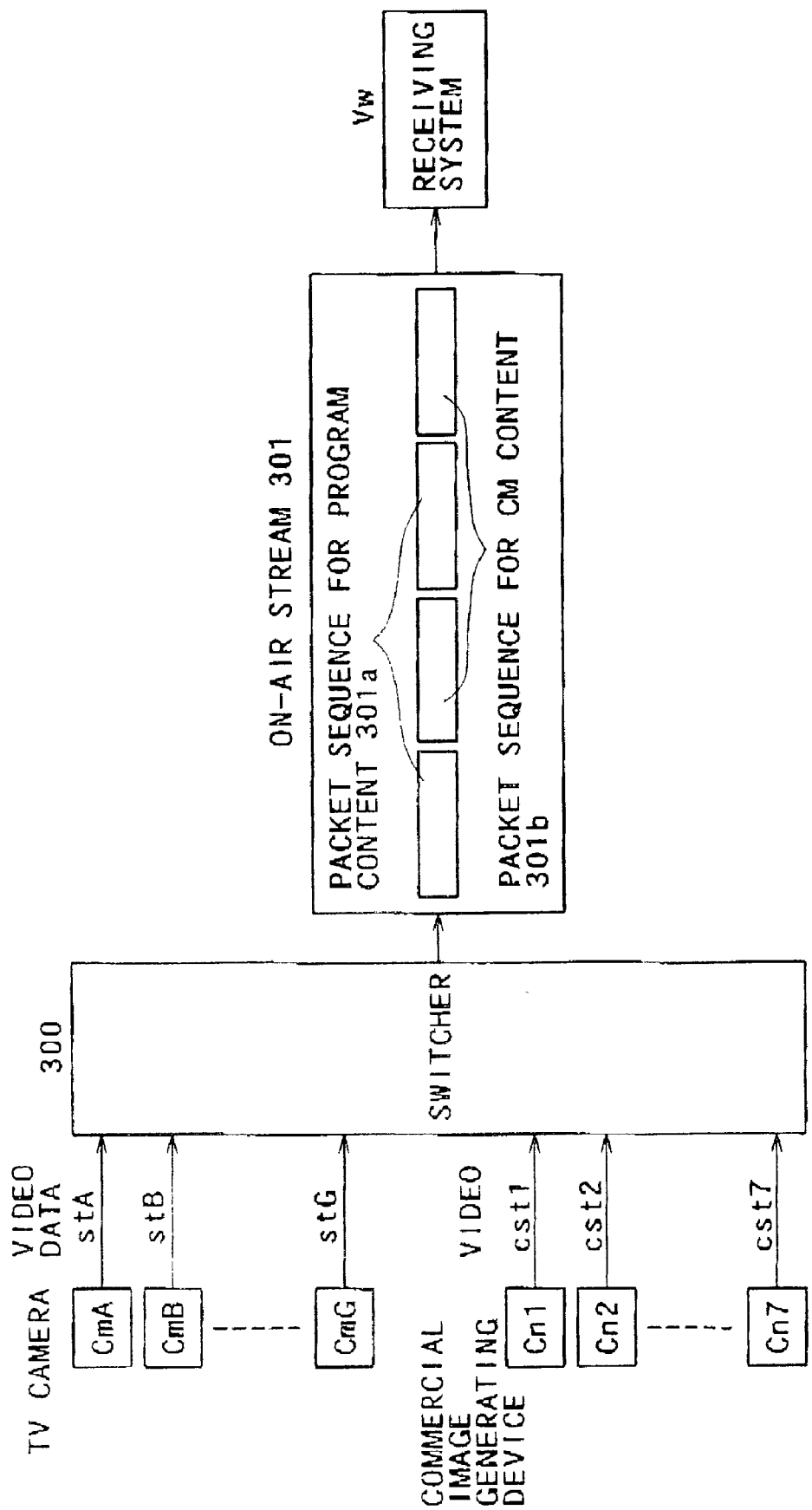
FIG. 39 illustrates a related-art commercial transmission method.

FIGS. 36 and 37 are flowcharts describing operations of the network delivery data receiving system shown in FIG. 35.

As with the above mentioned third embodiment, the fourth embodiment also supplies specification information to allow the viewer to select a desired content source and supplies correspondence information to allow the receiving system to extract corresponding program packets and restores program content data based on the extraction and in combination with the program content data, banner advertisement or commercial advertisement content data which are regarded to have high advertisement effects. In this case, it is preferable for the combination to be set for each individual viewer by considering his viewing trend by the transmission side and sent to the receiving side and for the setting to be easy and abundant in expandability and changeability. For example, it is preferable that the advertisement content data to be combined with program content the dynamically and easily changeable in accordance with situations during on-air time (for example, the weather) and situations of the viewer. To attain these objects, in the fourth embodiment, the receiving side information for each viewer is collected and analyzed by the transmitting side and, on the basis of the results of the analysis, (1) the advertisement content to be combined with each program content and (2) the method of displaying each content are set. Individual combination information with these settings are organized for each viewer and put on an on-air stream independently of the program packet sequences and advertisement packet sequences at a given time or predetermined time and this on-air stream is supplied to the receiving system. On the other hand, each receiving system selectively extracts the individual combination information addressing that receiving system and analyzes the extracted combination information to restore the program content and the advertisement content combined therewith.

The fourth embodiment of the network delivery data transmitting system shown in FIG. 29 is obtained by applying the fourth embodiment of the network delivery data transmitting method associated with the present invention, in which a transmitting system Svs4, which is a data transmission side, delivers broadcast programs to a receiving system Vw4 via an Internet organization INT.

The transmitting system Svs4 is a multi-content-type Internet broadcasting service provider site, which is realized by a computer system. This configuration is substantially the same as that of the above-mentioned third embodiment, so that the description of the constitution of the third embodiment will be used.

The transmitting system Svs4 selects content sources from externally attached and/or internal plural content sources to provide content sources Cm1 through CmN to be applied to a broadcast program concerned, organizes on-air content by capturing content data ct1 through ctN from these content sources, and sends the organized on-air content to the receiving system Vw4 via the Internet organization INT upon reception of a viewing request req4 from the receiving system Vw4, which is a Web client, via the Internet organization INT. The content sources Cm1 through CmN and the content data ct1 through ctN are substantially the same as those descried with the third embodiment, so that their descriptions will be omitted.

The transmitting system Svs4 comprises an input means Iptm4, a receiving-side information analysis means Anly, a correspondence information organizing means Crmp4, a specification information organizing means Spfm4, an individual combination information organizing means Cbnm4 for organizing the individual combination information dcb4 of the program content and advertisement content, a timekeeper Tmk4, an on-air stream organizing means Oacm4 which includes as one of its capabilities an individual combination information packet creating section Cbip4 for creating individual combination information dcb4 and the method of displaying program packet sequences and advertisement packet sequences for each viewer, a management means Mgm4, and a database server Db4.

The input means Iptm4 is constituted by a device through which the system administrator can input commands for example and its control program.

(1) The input means Iptm4 supplies commands and input values necessary for the organizing of specification information sgf4 and correspondence information Sgr4, specification of the on-air start/end time for each broadcast program and the handling of content data ct1 through ctN to the management means Mgm4 as management command inputs sgb41.

(2) The input means Iptm4 supplies a combination command input sgb42 to the individual combination information organizing means Cbnm4.

(3) The input means Iptm4 supplies correspondence command input sgb4 to the correspondence information organizing means Crmp4.

(4) The input means Iptm4 supplies specification command input sgb44 to the specification information organizing means Spfm4.

In addition to the commands for combining desired program content and advertisement content, the combination command input sgb42 includes a command for specifying the method of displaying (whether program content and advertisement content are displayed in a switched manner or both at once) the combined program content and advertisement content.

The correspondence information organizing means Crpm4 is provided as a program which is readable and executable by the CPU of this system, sets an identification number to each of the content sources to be used among the content sources Cm1 through CmN on the basis of the specification command input sgb43 to provide correspondence information sgr4, and organizes a correspondence information packet Pkr4 carrying correspondence information sgr4, recording and storing the packet into a site management file Fsmg4 of the database server Db4. This correspondence information packet Pkr4 is accessed by the on-air stream organizing means Oacm4.

The specification information organizing means Spfm4, provided as a program which is readable and executable by the CPU of this system, sets description data of content sources Cm1 through CmN to be used on the basis of the specification command input sgb44 to provide specification information sgf4 and organizes a specification information packet Pkf4 carrying the specification information sgf4 to be recorded and stored in the site management file Fsmg4 of the database server Db4 This specification information packet Pkf4 is accessed by the on-air stream organizing means Oacm4.

A receiving-side information analysis means Anly, provided as a program which is readable and executable by the CPU of this system, upon being triggered by the management means Mgm4, extracts individual information cke from the customer management file in a site management file Fsmg4 and analyzes the extracted information for each customer (each receiving system Vw4), outputting a trend trd to the individual combination information organizing means Cbnm4.

The individual combination information organizing means Cbnm4, provided as a program which is readable and executable by the CPU of the system, creates individual combination information dcb4 suitable for this customer for the receiving system Vw4 on the basis of the trend trd and combination command input sgb42 supplied from the receiving-side information analysis means Anly and records the created information to the customer management file in the site management file Fsmg4.

The individual combination information dcb4 includes the correspondence between program content data and advertisement content data (banner advertisement content data or commercial content data) combined therewith and the information associated with the method of displaying program content and advertisement content and is accessed by the individual combination information packet creating section Cbip4 of the on-air stream organizing means Oacm4.

The timekeeper Tmk4 is a software timer and provided as a program which is readable and executable by the CPU of this system and manages the broadcasting start/end time specified by the management means Mgm4 for on-air streams including an on-air stream oast4. When the broadcasting start or end time for an on-air stream concerned has been reached, the timekeeper Tmk4 supplies a timing signal strg41 to the on-air stream organizing means Oacm4 and the management means Mgm4.

In addition, the timekeeper Tmk4 receives display timing information including the switching between program content and advertisement content from the management means Mgm4 to supply a trigger signal stgr42 to the on-air stream organizing means Oacm4.

The database server Db4 is constituted by a magnetic disk recording device and/or optical disk recording device, stores a content data file Fct4 for storing at least any of the content data ct1 through ctN supplied from the content sorces Cm1 through CmN and a site management file Fsmg4 for recording and holding the management data associated with this Internet broadcasting service, and is accessed by the management means Mgm4 or the on-air stream organizing means Oacm4 for example for read/write operations. A customer management file is created in the site management file Fsmg4 for each receiving system.

As with the above-mentioned second embodiment, it is preferable to use a mass-storage, high-speed disk array system such as a RAID system for the database server Db4.

The on-air stream organizing means Oacm4 is one embodiment of a transmission data organizing means and provided as a program which is readable and executable by the CPJ of this system.

The on-air stream organizing means Oacm4 captures content data ct1 through ctN supplied from the content sources Cm1 through CmN to be used. As required, any of content data ct1 through ctN may be recorded and stored in the content file Fct4 of the database server Db4 as program content data and/or advertisement content data (banner advertisement content data or commercial content data). Therefore, the on-air stream organizing means Oacm4 can get necessary content data ct1 to ctN from among the content data to be supplied in real time from the content sources Cm1 through CmN or the content data recorded to the database server Db4 at the on-air time.

On the basis of the above-mentioned specification information sgf4 supplied from the specification information organizing means Spfm4, the on-air stream organizing means Oacm4 organizes the specification information packet Pkf4 for describing the content sources Cm1 to CmN to be used. Also, on the basis of the above-mentioned correspondence Information sgr4 supplied from the correspondence information organizing means Crmp4, the on-air stream organizing means Oacm4 organizes the correspondence information nacket Pkr4 which specifies the identification numbers of the content sources Cm1 to CmN to be used. In addition, the on-air stream organizing means Oacm4 divides each of captured program and advertisement content data ct1 to ctN or read from the content tile Fct4 of the database server Db4 into plural data fragments, adds a tag to each data fragment to provide program packets and CM packets, and forms program packet sequences and CM packet sequences composed of these plural packets. The configurations of the each program packet and CM packet thus formed are described below with reference to FIG. 22.

The individual combination information packet creating section Cbip4 of the on-air stream organizing means Oacm4 captures individual combination information dcb4 from the customer management file in the site management file Fsmg4 to create an individual combination information packet Pkcb4 for each customer (or each receiving system).

The following describes the individual combination information packet Pkcb4. The description of the parts of the individual combination information packet Pkcb4 which are similar to those previously described with reference to FIG. 22 will be skipped from the following description.

The individual combination information packet Pkcb4 to be created for each customer comprises the specification information of that customer and a table composed of the number of lines for the number of pieces of program content. This table is similar to that of the combination information packet Pkcb shown in FIG. 22.

Issuing the individual combination information packet Pkcb4 dedicated to each customer from time to time or at a given or predetermined time allows the setting of combinations of pieces of content for each customer on an as desired basis and the control of the displaying and erasing of display screen on an as desired basis.

Upon reception of a timing signal strg41 from the timekeeper Tmk4, the on-air stream organizing means Oacm4 organizes transmission data including the specification information packet Pkf4 and the correspondence information packet Pkr4 in addition to the plural program packet sequences composed of the above-mentioned plural program packet sequences and the plural CM packet sequences composed of the above-mentioned plural CM packet sequences and sends the resultant transmission data to the management means Mgm4.

In addition, upon reception of a trigger signal strg42, the on-air stream organizing means Oacm4 adds the individual combination information packet Pkcb4 to the above-mentioned transmission data and sends the resultant transmission data to the management means Mgm4.

The management means Mgm4 has a data line terminating device which is connected to the Internet organization INT for data exchange, provided as a computer program for controlling this device and others, manages and controls the entire operation of the Web site, organizes data carrying the screen and voice (GUI data) to be displayed and reproduced on the receiving system Vw4 and transmission information, and executes information exchange with the receiving system Vw4. In addition, the management means Mgm4 has a data encryption/decryption capabilities, not shown.

Upon reception of a viewing request req4 from the receiving system Vw4 via the Internet organization INT, the management means Mgm4, operating in accordance with a management command input sgb41 entered by the operator for example, newly creates a customer management file of the receiving system Vw4 on the site management file Fsmg4 or updates the existing customer management file, and then sends the Web page data dweb4 to the receiving system Vw4 via the Internet organization INT.

The Web page data dweb4 has questions for prompting the viewer to answer and the questions are composed of items to be referred to for the transmission of optimum advertisement. When the answers or the information occurring during the use of the browser of the receiving system is transmitted as individual information cke, the management means Mgm4 records the received individual information cke to the management file of that customer in the site management file Fsmg4, thereby triggering the receiving-side information analysis means Anly.

The exchange of the above-mentioned viewing request req4, Web page data dweb4, and individual information cke is performed in compliance with the RTSP standard associated with both-way communication.

In addition, the management means Mgm4 sends scheduled on-air start/end time information of each broadcast program and display (including switching) timing information for program content and advertisement content to the timekeeper Tmk4 as management information i4.

On the other hand, upon reception of a timing signal strg41 from the timekeeper Tmk4 at on-air start time, the management means Mgm4 organizes an on-air stream oast4 carrying the above-mentioned packet group (the plural program packet sequences, the plural CM packet sequences, the correspondence information packet, the specification information packet, and/or the individual combination information packet) on the basis of the transmission data supplied from the on-air stream organizing means Oacm4 and sends the organized on-air stream oast4 to the receiving system Vw4 via the Internet organization INT The transmission of this on-air stream oast4 is performed in compliance with RTP/RTCP associated with video and audio streaming.

Figure 30:
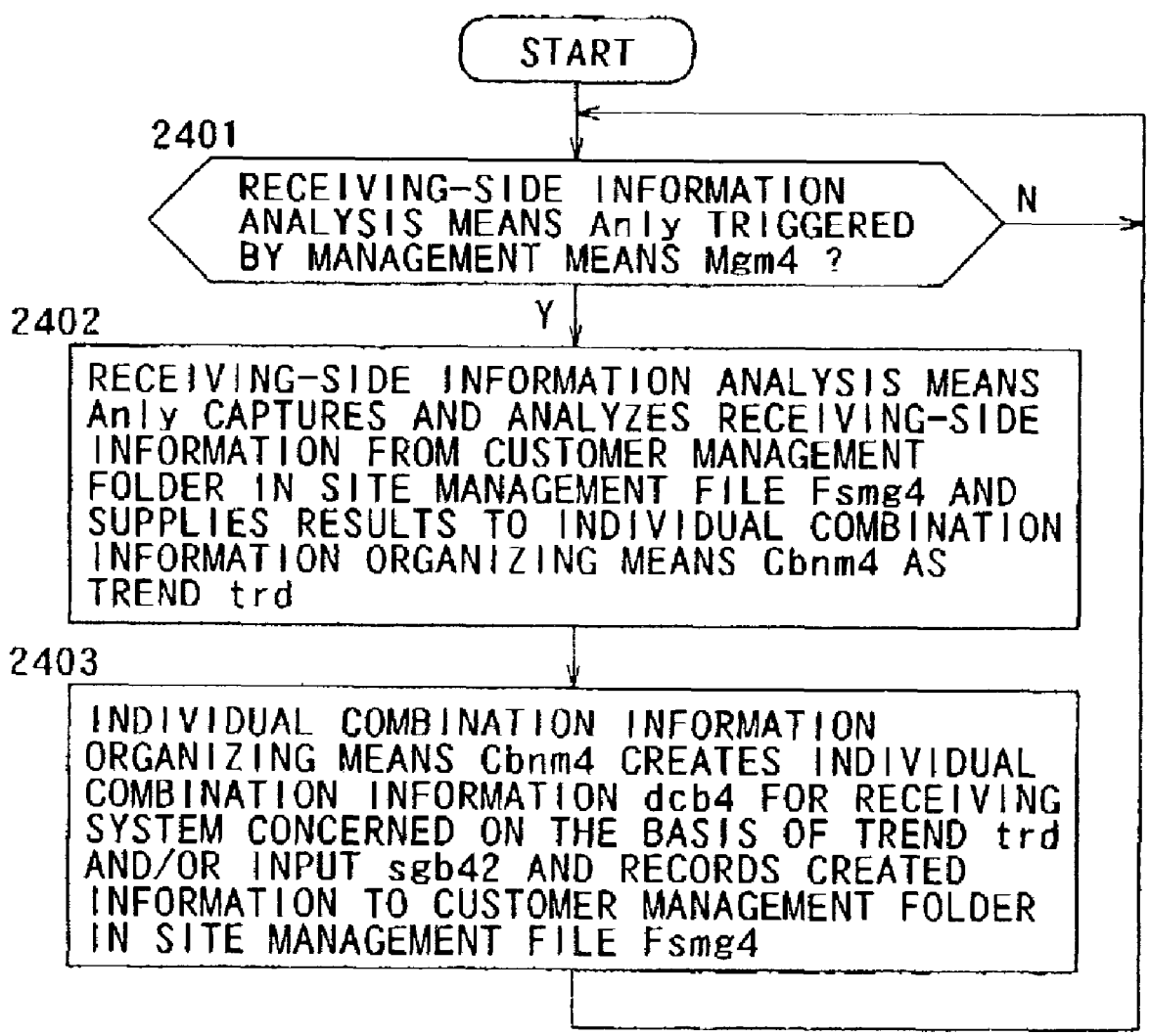
FIG. 30 is a flowchart describing operations of the network delivery data transmitting system shown in FIG. 29.
Figure 31:
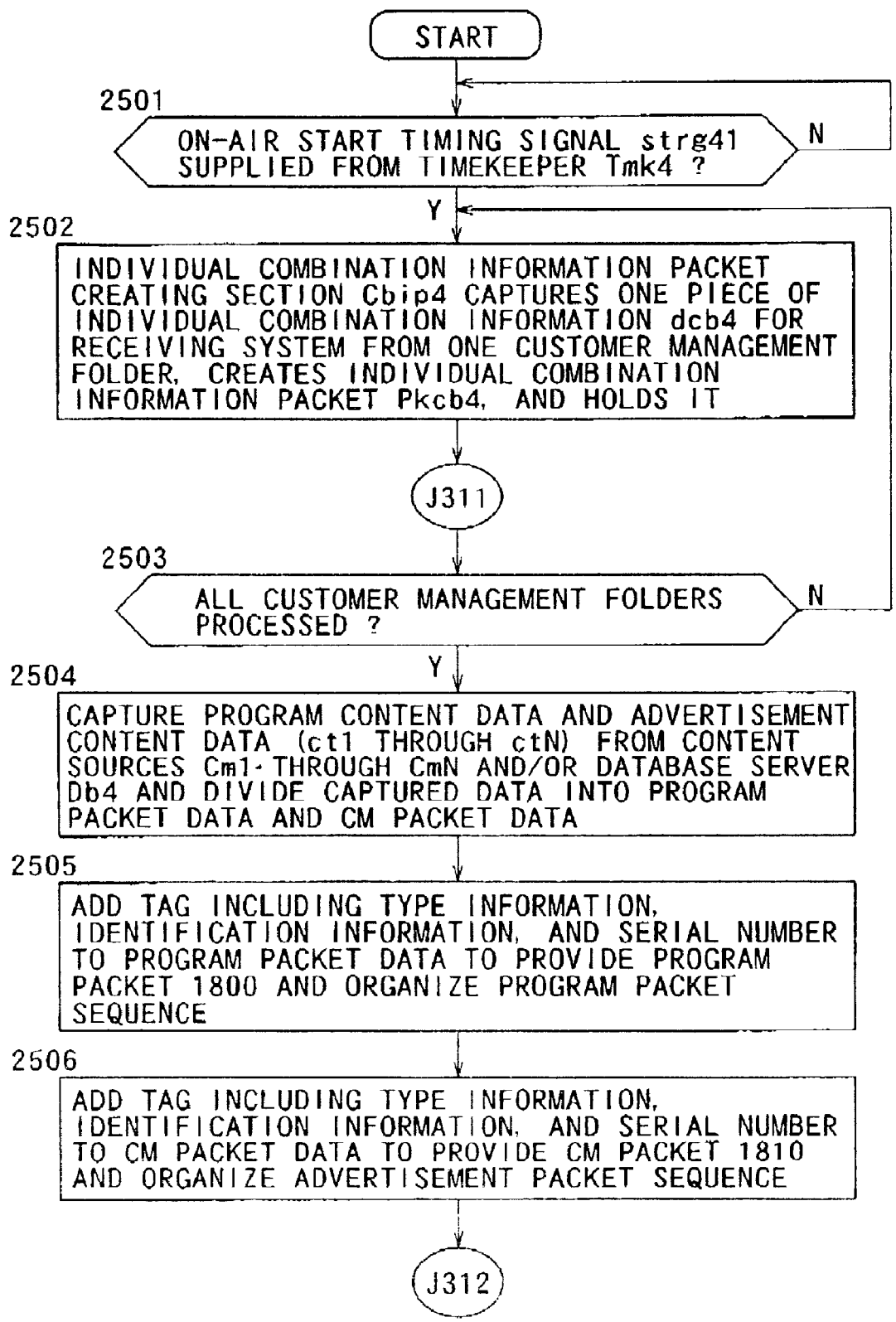
FIG. 31 is another flowchart describing operations of the network delivery data transmitting system shown in FIG. 29.
Figure 32:
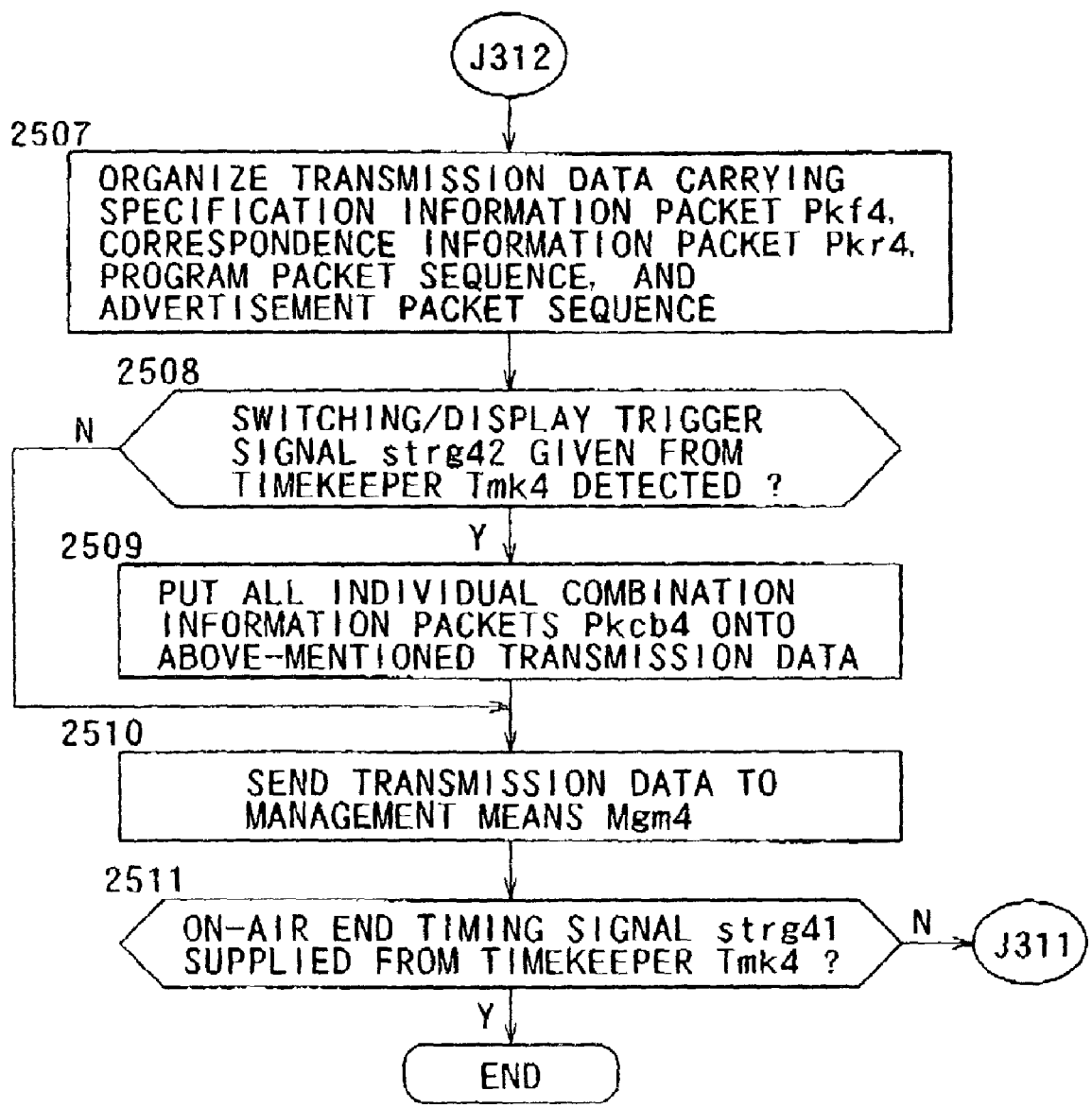
FIG. 32 is a flowchart continued from the flowchart shown in FIG. 31.
Figure 33:
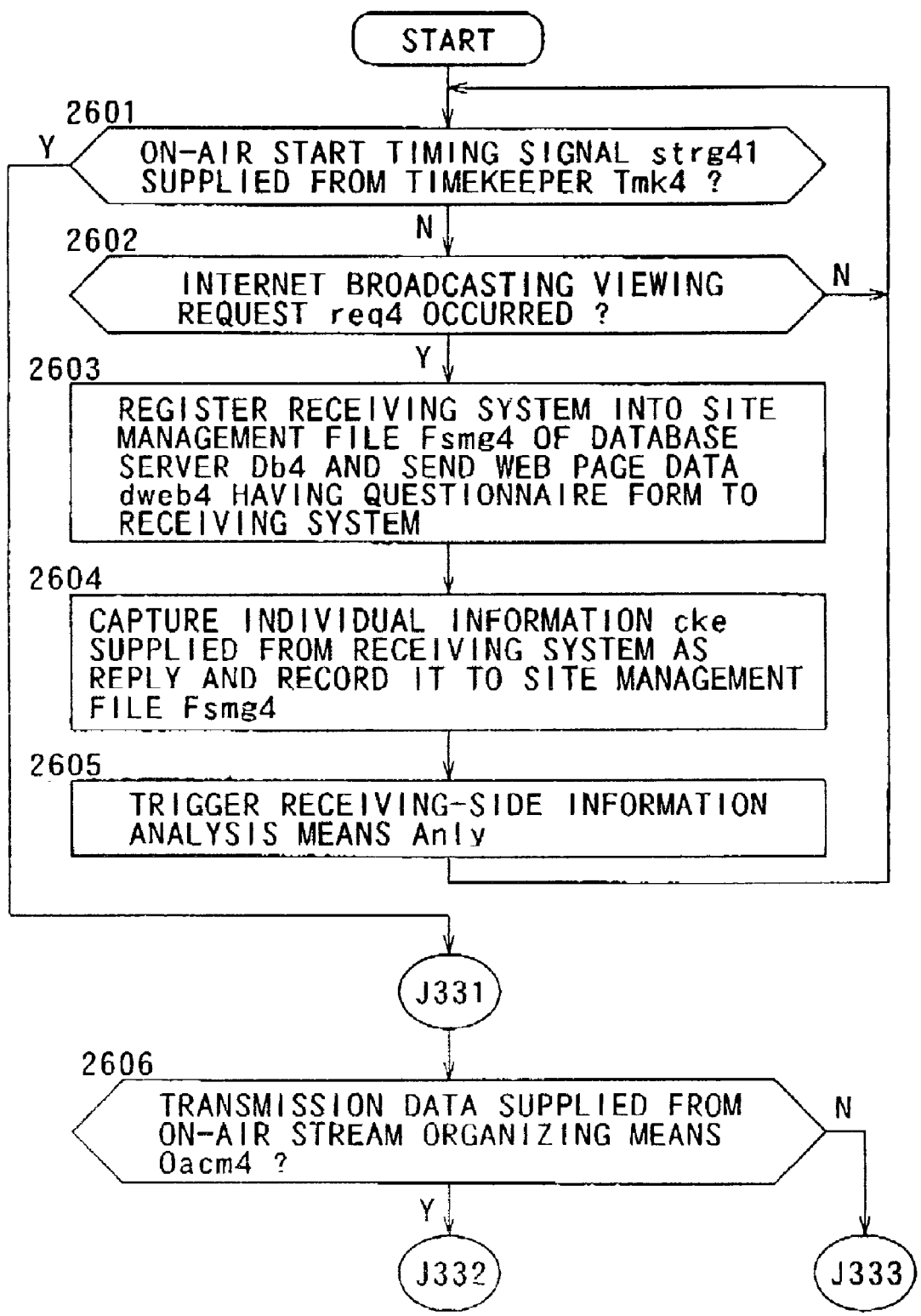
FIG. 33 is still another flowchart describing operations of The network delivery data transmitting system shown in FIG. 29.
Figure 34:
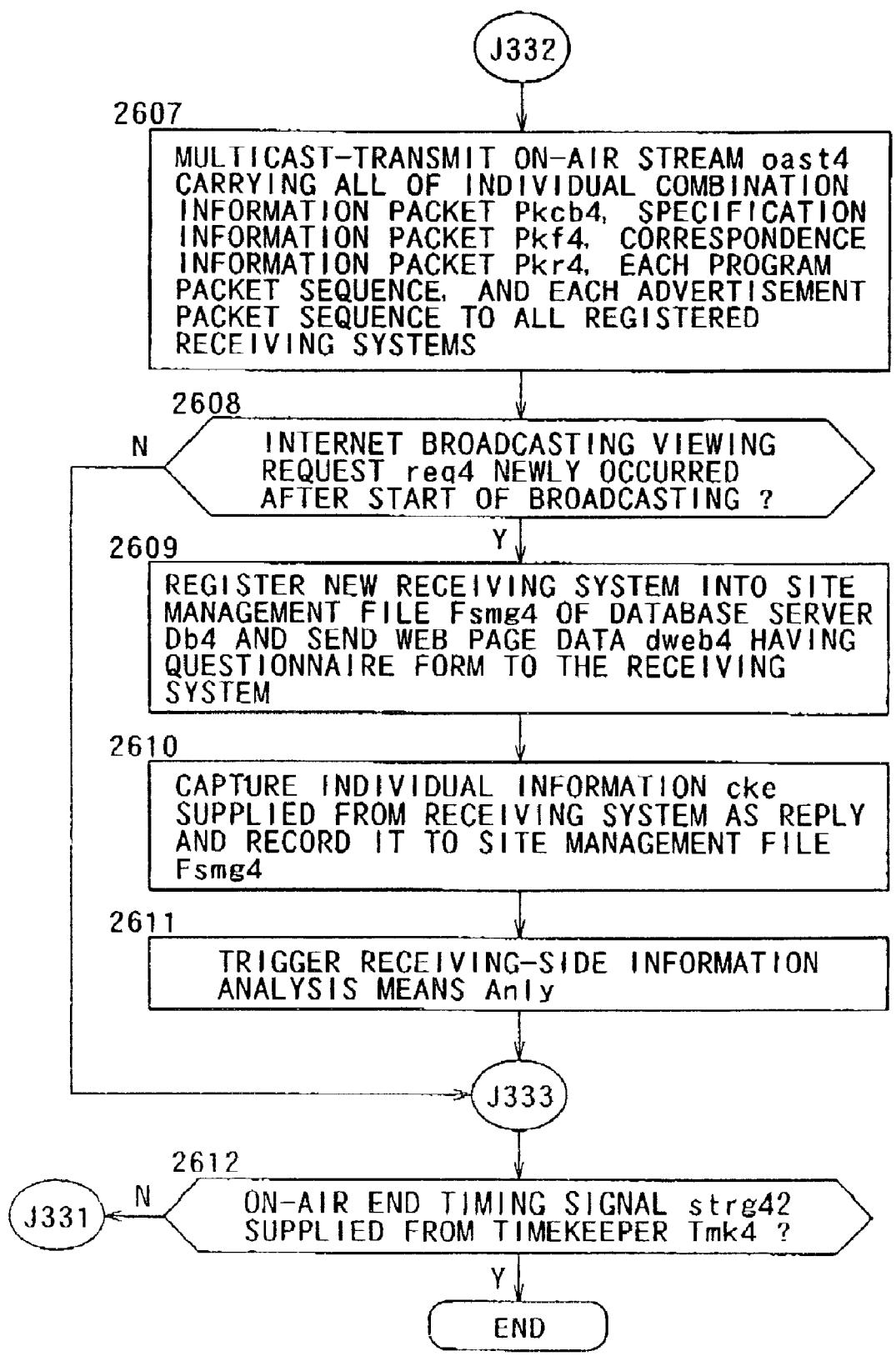
FIG. 34 is a flowchart continued from the flowchart shown in FIG. 33.

The following describes operations of the transmitting system Svs4. FIG. 30 is a flowchart describing the main operations associated mainly with the receiving-side information analysis means Anly and the individual combination information organizing means Cbnm4. FIGS. 31 and 32 are flowcharts describing main operations of the on-air stream organizing means Oacm4. FIGS. 33 and 34 are flowcharts describing main operations associated with the management means Mgm4. It should be noted that the description of the processing such as the organization and so on of the specification information sgf4 and specification information packet Pkf4 and the correspondence information sgr4 and correspondence information packet Pkr4 on the basis of the content source specification input to be performed by the specification information organizing means Spfm4 and the correspondence information organizing means Crpm4 is the same as that of the above-mentioned embodiments, so that the description will be skipped.

As shown in FIG. 30, in step 2401, the receiving-side information analysis means Anly waits for the triggering by the management means Mgm4 and, upon being triggered, captures the receiving-side information cke from the customer management file in the site management file Fsmg4 and analyzes it, thereby transmitting the analysis result to the individual combination information organizing means Cbnm4 as trend trd. In step 2403, the individual combination information organizing means Cbnm4 creates the individual combination information dcb4 for that customer (the receiving system) on the basis of the trend trd and/or input sgb42 and records this information to the customer management file in the site management file Fsmg4. Then, back in step 2401, the receiving-side information analysis means Anly waits for a next trigger. Consequently, each receiving-side information cke supplied from the receiving system Vw4 is captured and the individual combination information dcb4 for each receiving system Vw4 is created.

As shown in FIG. 31, the on-air stream organizing means Oacm4 executes a decision loop for determining whether the on-air start time has been reached (step 2501). This decision is made on the basis of the timing signal strg41 supplied from the timekeeper Tmk4 at the on-air start time of the on-air stream oast4 concerned. When the on-air start time has been reached, the procedure goes to step 2502, in which the individual combination information packet creating section Cbip4 captures the individual combination information dcb4 from the customer management file in the site management file Fsmg4, creates and holds the individual combination information packet Pkcb4 for this customer (or each receiving system), and executes this processing on all customer management files (step 2503). Consequently, the individual combination information packet Pkcb4 for each of all customers (or receiving systems) accepted and registered by the on-air start time is prepared.

Further, upon reception of the timing signal strg41, the on-air stream organizing means Oacm4 captures predetermined plural program content data and predetermined plural CM content data in step 2504. These content data are captured in real time from any of the content sources Cm1 through CmN and/or read from the content file Fct4 of the database server Db4. The captured content data are divided into program packet data 1802 (refer to FIG. 22, which holds the same with the following description) or advertisement packet data 1812.

In step 2505, the on-air stream organizing means Oacm4 attaches the tag 1801 to each program packet data 1802 to form program packets 1800 The formed program packets 1800 are arranged in time sequence to organize a program packet sequences. Thus, the program packet sequences are organized for the plural program content data applied to this broadcast program.

Likewise, in step 2506, the on-air stream organizing means Oacm4 attaches a tag 1811 to each CM packet data 1812 to form CM packets 1810. The formed CM packets 1810 are arranged in time sequence to form a CM packet sequence. Thus, the advertisement packet sequences are organized for all plural advertisement content data applied to this broadcast program.

Further, in step 2507, the on-air stream organizing means Oacm4 organizes the transmission data which carry the specification information packet Pkf4, the correspondence information packet Pkr4, the program packet sequences, and the advertisement packet sequences.

In step 2508, the on-air stream organizing means Oacm4 checks if a trigger signal strg42 associated with switching between program content and advertisement content or other display operations has been supplied from the timekeeper Tmk4. If the trigger signal is not found, the procedure goes to step 2510. On the other hand, it the trigger signal strg42 is found, the on-air stream organizing means Oacm4 adds the above-mentioned each individual combination information packet Pkcb4 to the above-mentioned transmission data in step 2509 and goes to step 2510 to send the organized transmission data to the management means Mgm4.

In step 2511, the on-air stream organizing means Oacm4 checks if a timing signal srgr41 indicative of on-air time end has been supplied from the timekeeper Tmk4. If this timing signal is not found, the on-air stream organizing means Oacm4 determines that on-air continues and the procedure returns to step 2503 to repeat the above-mentioned processing. If this timing signal is found, the processing comes to an end.

As shown in FIG. 33, the management means Mgm4 checks in step 2601 if a timing signal stgr41 indicative of on-air start time has been supplied from the timekeeper Tmk4. If this timing signal is not found, the management means Mgm4 determines that it is before the on air time and goes to step 2602, entering a loop for checking if are Internet broadcasting viewing request req4 from the receiving system Vw4 has newly occurred. If this request is found newly supplied, the management means Mgm4 accepts this request in step 2603 and creates a customer management file in the site management file Fsmg4, customer-registering it into the created file. If such a file already exists, its contents are updated.

Then, the management means Mgm4 sends Web page data dweb4 extracted from the site management file Fsmg4 to the registered receiving system Vw4, captures the individual information cke supplied from the receiving system Vw4 in response in step 2604, records the captured individual information cke to the customer management file of that customer in the site management file Fsmg4, and triggers the receiving-side information analysis means Anly in step 2605, returning to step 2601 to repeat the above-mentioned processing therefrom.

Thus, the management means Mgm4 continues the acceptance and registration of new customers, the transmission of operation-associated Web page data, and the capturing the individual information until the on-air start time comes.

On the other hand, when the on-air start time comes in step 2601, the management means Mgm4 goes to step 2606 to wait for the supply of the transmission data from the on-air stream organizing means Oacm4; if the transmission data have not been supplied, the management means Mgm4 goes to step 2611. When the transmission data have been supplied, the management means Mgm4 multicast-transmits, in step 2607, an on-air stream oast4 multiplexed with the plural program packet sequences 1800, the plural CM packet sequences 1810, the specification information packet Pkf4 the correspondence information packet Pkr4, and each individual combination information packet Pkcb4 to all registered receiving systems Vw4, thereby starting Internet broadcasting.

In step 2608, upon detection of a new viewing request req4 after starting of Internet broadcasting, the management means Mgm4 accepts this request in step 2609 and creates a customer management file in the site management file Fsmg4 to customer-register this request into this customer management file or, if this file already exits, updates its contents.

Next, the management means Mgm4 sends the Web page data dweb4 extracted from the site management file Psmg4 to the newly accepted receiving system Vw4. In step 2610, the management means Mgm4 captures the individual information eke supplied from the receiving system Vw4 in response, records the individual information cke to the customer management file of the customer concerned in the site management file Fsmg4, and then triggers the receiving-side information analysis means Anly in step 2611, going to step 2612.

In step 2612, the management means Mgm4 checks if the timing signal stgr41 indicative of on-air time end has come from the timekeeper Tmk4. If this timing signal is found not supplied, then the management means Mgm4 determines that the on-air time continues and returns to step 2606 to repeat the above-mentioned processing therefrom; if this timing signal is found supplied, the management means Mgm4 determines that the on-air time has ended, thereby ending the processing.

Thus, the transmitting system Svs4 is configured and operates.

The following describes the configuration of the receiving system Vw4 with reference to FIG. 35.

As with the above-described receiving system Vw3, the receiving system Vw4 is mainly realized as a household Internet service compatible apparatus. The receiving system Vw4 accesses Web sites operated by the transmitting system Svs4, an internet broadcasting service provider, via the Internet organization INT to receive a multicast-delivered on-air stream oast4. Therefore, the receiving system Vw4 has a processor (CPU), memory devices such as RAM and ROM, an input/output interface, and a bus, each not shown, which, however, are also the components of each general-purpose computer system; therefore these components will not be described for the brevity of description.

The receiving system Vw4 comprises an input means Ipvm4, a via-Web data exchange means Wdxm4 (hereafter referred to simply as a data exchange means Wdxm4), a receiving-side information gathering means Vigm, a home server Hsv4, a data adjusting means Darm4, a display data control means Ddcm4, a screen and voice output device Dpy, and a control means Contr4. The data adjusting means Darm4 has an individual combination information packet detecting section Icpd and an individual combination information processing section Icip as parts of its capabilities.

The Web data exchange means Wdxm4 is one embodiment of the data exchange means. The data adjusting means Darm4 and display data control means Ddcm4 are embodiments of the data processing means. The screen and voice output device Dpy is one embodiment of the output means.

The input means Ipvm4 is constituted by a user-operated device and software for performing an input operation; in computer systems the input means Ipvm4 is constituted for example by a mouse, a screen touchpad, and input processing software in general.

When the viewer logs in the Internet provider and accesses a Web site, the input means Ipvm4 supplies login command input to the Web data exchange means Wdxm4. Next, when the viewer performs form input to view the Internet broadcasting, the input means Ipvm4 issues a viewing request req4 to the Web data exchange means Wdxm4 When the viewer answers the questions on the site operation screen, the input means Ipvm4 supplies the answer input to the receiving-side information gathering means Vigm.

When the viewer specifies a desired content source from the site operation screen, the input means Ipvm4 supplies a content source selection signal isg1 to the data adjusting means Darm4. When a command indicative of the timing of displaying (including switching) a program and/or advertisement is entered by the viewer at a given or predetermined trigger time, the input means Ipvm4 supplies a trigger signal int1 associated with the display time of the program and/or advertisement to the data adjusting means Darm4. The trigger signal int1 is the same as described with the second embodiment.

The receiving-side information gathering means Vigm, provided as a program which is readable and executable by the CPU of this system, records the input values supplied from the input means Ipvm4 to the home server Hsv4 as receiving-side information. These input values include the values inputted by the viewer as the answers to the questions supplied from the site side and the content source select input. In addition, the receiving-side information gathering means Vigm may record various receiving system operational data supplied from the control means Contr4 to the home server Hsv4 as receiving-side information.

The receiving-side information gathering means Vigm sends at least one portion of the receiving-side information recorded to the home server Hsv4 as described above to the data exchange means Wdxm4.

The home server Hsv4 is constituted by a magnetic disk device for example and stores receiving-side information, program content data, advertisement content data and the like.

The data exchange means Wdxm4 has a data line terminating device connected to the Internet organization INT for data exchange and is provided as a computer program including the control thereof, performing data exchange with the Web site via the Internet provider. To be more specific, the Web data exchange means Wdxm4 issues a login-request to the Internet provider and a viewing request req4 for viewing Internet broadcasting to the site side to receive site operation screen data dweb4 and sends the individual information cke supplied from the receiving-side information gathering means Vigm to the site side, to which CGI (Common Gateway Interface) and ActiveX control technologies are applied.

Further, the data exchange means Wdxm4 receives an on-air stream oast4, which is a moving picture and audio stream. The received data are sent to the data adjusting means Darm4.

The data adjusting means Darm4, provided as a program which is readable and executable by the CPU of this system, has the individual combination information packet detecting section Icpd and the individual combination information processing section Icip as parts of its capabilities.

The data adjusting means Darm4 sends site operation screen data dweb4 supplied from the data exchange means Wdxm4 to the display data control means Ddcm4 and, at the same time, receives the correspondence information packet Pkr4, the specification information packet Pkf4, program packet sequences, and advertisement packet sequences from the data exchange means Wdxm4, and temporarily accepts the plural individual combination information packets Pkcb4 addressed to the receiving systems.

Next, the data adjusting means Darm4 extracts the specification information sgf4 from the specification information packet Pkf4 and Sends the extracted information to the display data control means Ddcm4. At the same time, the data adjusting means Darm4 extracts the correspondence information sgr4 from the correspondence information packet Pkr4 and temporarily stores the extracted information. On the other hand, the individual combination information packet detecting section Icpd detects the individual combination information packet Pkcb4 addressed to each receiving system from among the plural individual combination information packets to extract combination information dcb4 Therefore, this extracted combination information dcb4 is dedicated to the receiving system concerned.

Further, the data adjusting means Darm4 supplies the content source selection signal isg1 supplied from the input means Ipm4 to the display data control means Ddcm4, references the above-mentioned correspondence information sgr4 on the basis of the content source selection signal isg1, gets the identification information corresponding to the selected content source, checks the tag 1801 or 1811 attached to each packet, and, upon detecting that this packet is the program packet 1800 constituting the program packet sequences on the basis of the type information 1801a, matches this identification information 1801b with the above-obtained identification information to sequentially extract only the corresponding program packets 1800, sequentially sending the extracted packets to the display data control means Ddcm4 as the unaligned packers parp41 associated with the program.

On the other hand, the individual combination information processing section Tcip matches the above-obtained identification information with the above-mentioned individual combination information dcb4 to get the identification information (for example, the identification information 1811b(1) of advertisement content shown in FIG. 22) of the advertisement content combined with the above-mentioned program content (for example, the identification information 1801b(1) of program content shown in FIG. 22) and sequentially extracts the CM packets 1810 having this identification information 1811b(1). Then, the data adjusting means Darm4 sequentially sends these extracted CM packets to the display data control means Ddcm4 as the unaligned packets parp42 associated with the advertisement.

The transmission of the unaligned packets parp41 and parp42 to the display data control means Ddcm4 is controlled by the detection timing of the above-mentioned individual combination information packet Pkcb4 and the displaying of these packets is controlled on the basis of the display control information (for example, y(1) and z(1) shown in FIG. 22) carried on the individual combination information packet Pkcb4.

For example, on the basis of the above-mentioned control, the date adjusting means Darm4 sends both the unaligned packets parp41 and parp42 to the display data control means Ddcm4 or stops sending the unaligned packets parp41, sending only the unaligned packets parp42.

In the above-mentioned configuration, the display timing and the display method are controlled in accordance with the detection of the individual combination information packet Pkcb4 and the information carried thereon. Alternatively, the timing and display method of the display and/or erasure of program content and/or advertisement content may be controlled at given or predetermined trigger time to attain the same object as above. In the latter, the given or predetermined trigger time may be entered from the input means Ipvm4 into the data adjusting means Darm4 as a trigger signal int1 or another trigger signal not shown may be put on a on-air stream oast4 to be entered in the data adjusting means Darm4 via the data exchange means Wdxm4.

Alternatively still, the trigger signal int1 and another trigger signal not shown may be sent to the display data control means Ddcm4 to control the display of program content and/or advertisement content.

The display data control means Ddcm4, provided as a program which is readable and executable by the CPU of the system, performs data adjustment so that data are displayed in full screen on the screen and voice output device Dpy on the basis of the site operation screen data dweb4 supplied from the data adjusting means Darm4 and sends the adjusted data to the screen and voice output device Dpy. Likewise, on the basis of the specification information sgf4 and the content source selection signal isg1, the display data control means Ddcm4 performs data adjustment so that the data are displayed in an icon display area Dar23 on the site operation screen and supplies the adjusted data to the screen and voice output device Dpy.

Further, the display data control means Ddcm4 aligns the plural unaligned packets parp41 supplied from the data adjusting means Darm4 in accordance with their serial numbers (not shown but equivalent to the serial number 1801c shown in FIG. 22), removes the tags therefrom to restore the program content data ct41, performs data adjustment so that the restored program content data are displayed in a program area Dar21 on the screen of the screen and voice output device Dpy, and supplies the adjusted data to the screen and voice output device Dpy. Likewise, the display data control means Ddcm4 aligns the plural unaligned packets parp42 supplied from the data adjusting means Darm4 in accordance with their serial numbers (not shown but equivalent to the serial number 1811c shown in FIG. 22), removes the tags therefrom to restore the advertisement content data ct41, performs data adjustment so that the restored advertisement content data ct42 are displayed in a display area Dar22 on the screen of the screen and voice output device Dpy, and supplies the adjusted data to the screen and voice output device Dpy.

Thus, in accordance with the timing of receiving the unaligned packets parp41 and/or parp42, the display data control means Ddcm4 supplies the program content data ct41 and/or advertisement content data ct42 to the screen and voice output device Dpy.

Namely, when both the unaligned packets parp41 and parp42 are supplied, the display data control means Ddcm4 simultaneously supplies both the program content data ct41 and the advertisement content data ct42 to the screen and voice output device Dpy. At this moment, both the program content and the advertisement content are reproduced on the screen. This is especially suited when the advertisement content is banner advertisement.

When only the unaligned packets parp42 are supplied, only the advertisement content data ct42 are supplied to the screen and voice output device Dpy instead of the program content data ct41. In this case, the advertisement content is reproduced not in the advertisement area Dar22 but in the program area Dar21, This is the switching from program content to advertisement content, which is especially suited when the advertisement content is an above-mentioned commercial.

The screen and voice output device Dpy has a flat panel screen (a liquid crystal display, a plasma display, or an EL display for example) or a CRT monitor, displays site operation screen data dweb4 in full screen, specification information sgf4 and so on in the control area Dar23, program content data in the program area Dar21, and advertisement content in the advertisement area Dar22 in the screen.

The control means Contr4, provided as a program which is readable and executable by the CPU of the system, controls the operations of the entire receiving system Vw4.

The following describes operations of the receiving system Vw4 with reference to FIGS. 36 and 37. It is assumed that a log-in operation to the provider has been already been performed.

In step 2801, on the basis of a command from the input means Ipvm4, the data exchange means Wdxm4 sends an Internet broadcasting viewing request req4 to the Web site side. In step 2802, when the data exchange means Wdxm4 receives the Web page data dweb4 and sends it to the display data control means Ddcm4 via the data adjusting means Darm4, the display data control means Ddcm4 displays the Internet broadcasting operation screen on the screen and voice output device Dpy in full screen on the basis of the received Web page data dweb4. On this operational screen, the questions to the viewer are displayed.

When the viewer inputs the answers to the questions, the inputted answers are sent from the input means Ipvm4 to the receiving-side information gathering means Vigm. When the receiving-side information gathering means Vigm sends the individual information cke created on the basis of these answers and the receiving-side information recorded to the home server Hsv4 to the data exchange means Wdxm4, the data exchange means Wdxm4 sends the received individual information cke to the site side in step 2803.

Then, in step 2804, the data exchange means Wdxm4 downloads the on-air stream oast4 and sends it to the data adjusting means Darm4.

In step 2805, the data adjusting means Darm4 extracts specification information sgf4 from the specification information packet Pkf4 carried on the on-air stream oast4 and correspondence information sgr4 from the correspondence information packet Pkr4, and temporarily stores the extracted information. The individual combination information packet detecting section Icpd detects the individual combination information packet Pkcb4 addressed to the receiving system from the plural individual combination information packets to extract the combination information dcb4.

Next, upon transmission of the specification information sgf4 to the display data control means Ddcm4, the display data-control means Ddcm4 displays the specification information sgf4 in the control area Dar23 on the operational page.

In step 2805, when the data adjusting means Darm4 gets the identification information of the default program content by referencing the correspondence information sgr4 the data adjusting means Darm4 sequentially extracts the program packets 1800 having this identification information. Then, the individual combination information processing section Icip matches the above-obtained identification information with the above-mentioned individual combination information dcb4 to get the identification information of the advertisement content combined with the above-mentioned default program content, thereby sequentially extracting the CM packets 1810 having this identification information. The extracted program packets 1800 and CM packets 1810 are sequentially sent to the display data control means Ddcm4 as unaligned packets parp41 and parp42

The display data control means Ddcm4 restores the program content data ct1 from the unaligned packets parp41, restores the CM content data ct2 from the unaligned packets parp42, and displays the restored data in the program area Dar21 and the advertisement area Dar22 on the operation page respectively.

Thus, the control area Dar23 on the operational screen shows the information about the content sources in use by the broadcast program concerned, the program area Dar21 restores the video and audio of the default content source, and the advertisement area Dar22 restores the CM content combined with the program content, thereby starting the reception of Internet broadcasting.

Currently, the default content source are displayed and sounded in the program area Dar21 and the advertisement area Dar22. At this moment, in step 2806, the control means Contr4 checks if a command for stopping the reception has been issued by the viewer or a command for stopping the reception has been issued by a built-in timer for example (namely, if the on-air is ended). If the on-air end is detected, the procedure goes to step 2816. If the reception is continued, the procedure goes to step 2807, in which the control means Contr4 enters a loop for waiting for the viewer to click the icon of another content source among the icons for selection displayed in the control area Dar23. If the viewer clicks that icon, it is detected by the input means Ipvm4, which generates a content source selection signal isg1 to send it to the data-adjusting means Darm4.

In step 2808, the data adjusting means Darm4 sends the received content source selection signal isg1 to the display data control means Ddcm4, which displays this signal in the control area Dar23 consequently, the selection by the viewer is reflected on the screen so that the viewer can check it.

In step 2809, the data adjusting means Darm4 specifies the content source selected on the basis of the content source selection signal isg1 and, by referencing the correspondence information sgr4, gets the identification information of the content source. In step 2810, by checking the type information 1801a or 1811a of the supplied packet, the data adjusting means Darm4 selects the program packets 1800 and extracts therefrom only the program packet 1800 of which identification information 1801b matches the above-obtained identification information.

In step 2811, the individual combination information packet detecting section Icpd checks if the individual combination information packet Pkcb4 addressed to the receiving system concerned has been detected. If the matching individual combination information packet Pkcb4 is found not supplied, the procedure goes to step 2814. On the other hand, if the matching individual combination information packet Pkcb4 is found supplied, then the individual combination information processing section Icip gets the identification information of the combined CM packets by referencing the individual combination information dcb4 in step 2812.

In step 2813, upon selection of the CM packets 1810 by checking the type information 1811a of the received packets, the data adjusting means Darm4 extracts only the CM packets 1810 of which identification information 1811b indicated by this tag 111 matches the above-obtained identification information. In step 2814, the data adjusting means Darm4 sends the extracted program packets 1800 and/or extracted CM packets 1810 to the display data control means Ddcm4 as unaligned packets parp41 and/or unaligned packets parp42 on the basis of the display control information indicated by the combination information dcb4.

In step 2815, the display data control means Ddcm4 aligns the unaligned packets parp41 in accordance with their serial numbers (equivalent to 1801c shown in FIG. 22, the same holding true with what follows), removes their tags, and aligns the program packet data (equivalent to 1802) to restore the program content data ct41, and/or aligns the unaligned packets parp42 in accordance with their serial numbers (equivalent to 1811c), removes their tags, and aligns the CM packet data (equivalent to 1812) to restore the advertisement content data ct42, thereby displaying the restored content data in the program area Dar21 and/or the advertisement area Dar22 on the operation screen. Thus, upon clicking the icon by the viewer, the current displaying and sounding of program content are automatically switched to the displaying and sounding of the desired program content. And, at the same time, the display of advertisement is also automatically switched to the display of the advertisement content combined with the desired program content.

Then, back in step 2805, the current display is continued. If a command for stopping the reception is found supplied in step 2806, the processing goes to step 2816, in which the control means Contr4 records the log of selecting operations done in the above-mentioned processing to the home server Hsv4 as the data auxiliary to the receiving-side information, upon which the processing comes to an end. It should be noted that the processing in each of the above-mentioned steps is performed under the control of the control means Contr4.

Thus, the receiving system Vw4 is configured and operates.

According to the above-mentioned embodiment, the transmitting side of the Internet broadcasting puts plural reproducible program packet sequences on a single on-air stream and sends it to the viewing side (or the receiving side) and, at the same time, the transmitting side sends specification information and correspondence information to the receiving side, so that the transmitting side can send plural freely selectable program packet sequences at a time to the receiving side and, at the same time, send the information for the selection to the receiving side. On the other hand, the receiving side can get the plural program packet sequences by receiving only one on-air stream and, by use of the obtained "information for selection", easily select any desired program packet sequences to restore desired content. Even during on-air time, the selection may be changed as desired, switching to the display of content to be restored.

Further, the transmitting side gathers the individual information of each receiving system, analyzes the gathered individual information to obtain a trend, combines advertisement content suitable for each receiving system for each program content, individually organizes the combination-associated information for each receiving system, puts these plural advertisement packet sequences and the individual combination information for each receiving system onto one on-air stream, and delivers it to the receiving side via the Internet, so that, upon selecting certain program content and restoring it on the receiving side, the advertisement content combined with the selected program content may be restored at the same time in a combination suitable for each receiving system. This allows the provider side to realize high advertisement effects while each viewer can view only the advertisement of interest.

In addition, because the transmitting side can easily set and update the individual combinations as required by creating and updating them, the transmitting side can easily prepare and send the information about the combinations of advertisement optimum for each program content for each receiving system and, because the transmitting side can dynamically change the advertisement content data to be combined in accordance with the on-air situation (for example, the weather) and the situation of the receiving system concerned, thereby realizing conspicuous advertisement effects which are abundant in expandability and changeability. Further the receiving side can attain enhanced convenience.

Still further, because a single on-air stream can carry plural pieces of advertisement content, the number of advertisement quotas increases for more advertisers (or sponsors), thereby increasing the chances for each advertiser to buy advertisements. This means the possible increase in advertisement revenues on the transmitting side, or the provider side of the Internet broadcasting services.

As described, the present invention provides the following advantages.

(1) Within one on-air stream simultaneously carrying independent pieces of video content taken at different camera angles and positions, different advertisements (banner advertisement and/or commercial) may be broadcast at different camera angles and positions. Consequently, more advertisement quotas can be prepared than the related-art technologies, thereby providing chances for more sponsors to participate in advertisement and, at the same time, increasing advertisement revenues.

(2) If there are specific consumer trends in which viewers favors video images taken at particular camera angles and positions, the advertisements of particular fields and products may be related to these trends, thereby providing market segmentations to obtain higher advertisement effects than before.

(3) Not only the scenes taken by imaging apparatuses but also the images configuring the on-air content, for example the image created by CG (Computer Graphics) technologies may provide as independent program content and the viewing side can select desired camera angles for desired images, thereby providing Internet broadcasting in wider range and variety.

(4) Live coverage may be achieved by plural, low-cost fixed imaging cameras, thereby realizing low-cost Internet broadcasting.

(5) Use of the recording means (namely, the home server) in the receiving system allows the viewer to record and reproduce desired scenes with ease.

(6) Use of the recording means and processing means in the receiving system allows the viewer to select reproduction speeds as desired.

As described, the present invention is intended to realize "switchable multi-content broadcasting based on network data delivery" in which the network delivery data transmitting side delivers an on-air stream carrying plural different pieces of content in a multiplexed manner for example over a network and the viewer, the receiving side of network delivery, selects plural pieces of content or switches between them in the received on-air stream by operating icons on the display screen of the receiving system to view desired content.

Therefore, for example, if plural pieces of video content taken by plural fixed cameras having different camera angles and positions, which are content sources, are delivered over a network, the network delivery data transmitting side transmits an on-air stream simultaneously carrying these plural pieces of content over a network and the viewer, the receiving side of network delivery, switches between the received pieces of video content by operating icons on the screen of the receiving system to display the video images of desired camera angles and the advertisement screens are displayed in relation with the screens of different camera angles. It will be apparent that the present invention is also applicable to other configurations.

For example, a configuration is practicable in which the transmitting system of Internet broadcasting switches between video streams (with or without audio) taken by plural fixed cameras in accordance with camera angle commands uploaded from the receiving systems, the viewing side of Internet broadcasting, and separately delivers only the requested video streams to the corresponding receiving systems of the viewing side over the Internet. This configuration provides a both-way communication capability in which, when the viewing side of Internet broadcasting specifies desired camera angles by operating icons on the screen of the receiving system, the browser program of the receiving system uploads the specification to the transmitting side, thereby allowing the broadcasting via a standard band Internet organization, making this broadcasting especially suitable for use with a VOD (Video On Demand) organization. The present invention is fully applicable to this configuration and therefore this configuration can achieve the all of the above-mentioned objects of the present invention.

While the preferred embodiments of the present invention have been described using specific terms, such description is for illustrative purposes only, and it is to be understood that chances and variations may be made without departing from the spirit or scope of the appended claims

What is claimed is:

1. A network delivery data transmitting method, wherein a data transmitting system forms content data generated by a plurality of content sources including at least one of imaging apparatuses and image generating apparatuses into a plurality of packet sequences composed of a plurality of packets and transmits an on-air stream carrying at least said plurality of packet sequences to a receiving system via a network, comprising the steps of:

attaching, by said transmitting system, at least identification information for identifying said plurality of packet sequences and serial numbers thereof to said plurality of packets forming said plurality of packet sequences formed by said applied plurality of content sources and putting on said on-air stream at least
(1) specification information for describing said applied plurality of content sources,
(2) correspondence information indicative of correspondence between said applied plurality of content sources and said identification information, and
(3) said plurality of packet sequences composed of said plurality of packets to which said identification information and said serial numbers are attached; and
transmitting said resultant on-air stream to said receiving system via said network.

2. A network delivery data transmitting method, wherein a data transmitting system forms content data generated by a plurality of content sources including at least one of imaging apparatuses and image generating apparatuses into a plurality of packet sequences composed of a plurality of packets and transmits an on-air stream carrying at least said plurality of packet sequences to a receiving system via a network,
said plurality of packet sequences including at least one program packet sequence and at least one advertisement packet sequence,
said method comprising the steps of:
attaching by said transmitting system, to each of said plurality of packets forming said plurality of packet sequencing based on said plurality of applied content sources, at least
(1) type information indicative of whether each of said plurality of packet sequences is said program packet sequence or said advertisement packet sequence,
(2) identification information for identifying said plurality of packet sequences, and
(3) a serial number of each of said plurality of packets; and
attaching to any of said plurality of packets,
(4) combination information for specifying a combination of said plurality of program packet sequences and said plurality of advertisement packet sequences;
attaching to said on-air stream
(1) specification information for describing said applied plurality of content sources;
(2) correspondence information indicative of correspondence between said applied plurality of content sources and said identification information; and
(3) said plurality of packet sequences composed of said plurality of packets to which said identification information and said serial numbers are attached; and
transmitting said resultant on-air stream to said receiving system via said network.

3. A network delivery data transmitting method, wherein a data transmitting system forms content data generated by a plurality of content sources including at least one of imaging apparatuses and image generating apparatuses into a plurality of packet sequences composed of a plurality of packets and transmits an on-air stream carrying at least said plurality of packet sequences to a receiving system via a network,
said plurality of packet sequences including at least one program packet sequence and at least one advertisement packet sequence,
said method comprising the steps of:
attaching, by said transmitting system, to each of said plurality of packets forming said plurality of packet sequences based on said plurality of applied content sources, at least
(1) type information indicative of whether each of said plurality of packet sequences is said program packet sequence or said advertisement packet sequence,
(2) identification information for identifying said plurality of packet sequences, and
(3) a serial number of each of said plurality of packets; and
attaching to said on-air stream
(1) specification information for describing said applied plurality of content sources,
(2) correspondence information indicative of correspondence between said applied plurality of content sources and said identification information,
(3) combination information for specifying a combination of said plurality of program packet sequences and said plurality of advertisement packet sequences, and
(4) said plurality of packet sequences composed of said plurality of packets to which said identification information and said serial numbers are attached; and
transmitting said resultant on-air stream to said receiving system via said network.

4. The network delivery data transmitting method according to claim 3, wherein said transmitting system receives individual information from said receiving system via said network, creates said combination information on the basis of said individual information for each receiving system, and puts said created combination information onto said on-air stream.

5. A network delivery data transmitting system comprising:
transmission data organizing means for forming a plurality of packet sequences composed of a plurality of packets on the basis of a plurality of content data supplied from a plurality of external or internal content sources including at least one of an imaging apparatus and an image generating apparatus and attaching identification information for identifying each of said plurality of packet sequences and a serial number to each of said plurality of packets to organize transmission data;
specification data organizing means for organizing specification information for describing said plurality of content sources;
correspondence information organizing means for organizing correspondence information for describing correspondence between said plurality of content sources and said identification information, and
management means for transmitting said transmission data to a receiving system via a network;
wherein said transmission data organizing means puts said specification information and said correspondence information onto said transmitting data.

6. A network delivery data transmitting system comprising:
transmission data organizing means for forming content data generated by a plurality of packet sequences of program packet sequences or advertisement packet sequences each composed of a plurality of packets on the basis of a plurality of content data supplied from a plurality of content sources including at least one of imaging apparatuses and image generating apparatuses,
attaching to each of said plurality of packets
(1) type information indicative of whether each of said plurality of packet sequences is said program packet sequence or said advertisement packet sequence;
(2) identification information for identifying said plurality of packet sequences; and
(3) a serial number of each of said plurality of packets, and attaching to any of said plurality of packets, (4) combination information for specifying a combination of said plurality of program packet sequences and said plurality of advertisement packet sequences;

specification information organizing means for organizing specification information for describing said plurality of content sources;

correspondence information organizing means for organizing correspondence information for describing correspondence between said plurality of content sources and said identification information;

combination information organizing means for organizing said combination information; and management means for transmitting said transmission data to a receiving system via a network;

wherein said transmission data organizing means puts said specification information and said correspondence information onto said transmitting data.

7. A network delivery data transmitting system comprising:

transmission data organizing means for forming content data generated by a plurality of packet sequences of program packet sequences or advertisement packet sequences each composed of a plurality of packets on the basis of a plurality of content data supplied from a plurality of content sources including at least one of imaging apparatuses and image generating apparatuses and attaching to each of said plurality of packets (1) type information indicative of whether each of said plurality of packet sequences is said program packet sequence or said advertisement packet sequence;

(2) identification information for identifying said plurality of packet sequences; and (3) a serial number of each of said plurality of packets;

specification information organizing means for organizing specification information for describing said plurality of content sources;

correspondence information organizing means for organizing correspondence information for describing correspondence between said plurality of content sources and said identification information;

combination information organizing means for organizing said combination information; and management means for transmitting said transmission data to a receiving system via a network;

wherein said transmission data organizing means puts said specification information, said correspondence information, and said combination information onto said transmission data.

8. The network delivery data transmission system according to claim 7, further comprising:

receiving-side information analyzing means for gathering individual information supplied from said receiving system via said network;

wherein said combination information organizing means creates said combination information for each receiving system on the basis of said individual information.

9. A network delivery data receiving method for receiving, when each of a plurality of content data generated by a plurality of content sources is organized into a plurality of packet sequences composed of a plurality of packets and said plurality of packet sequences are transmitted from a transmitting side of network delivery, said plurality of packet sequences via a network, said method comprising the steps of:

receiving via said network at least (1) said plurality of packet sequences, each of said plurality of packets being attached with identification information for identifying said plurality of packet sequences and a serial number, (2) correspondence information indicative of correspondence between said plurality of content sources and said identification information, and (3) specification information for describing said plurality of content sources;

displaying a selection screen for said plurality of content sources on the basis of said specification information;

acquiring identification information corresponding to said specified content source indicated by said correspondence information upon reception of an externally given command for selecting any one of said plurality of content sources;

extracting a plurality of corresponding packets by matching said acquired identification information with said attached identification information; and restoring said content data by aligning said plurality of extracted packets by their serial numbers.

10. A network delivery data receiving method for receiving, when each of a plurality of content data generated by a plurality of content sources is organized into program packet sequences or advertisement packet sequences composed of a plurality of packets and said plurality of packet sequences are transmitted from a transmitting side of network delivery, said program packet sequences and advertisement packet sequences via a network, said method comprising the steps of:

receiving via a network (1) a plurality of packet sequences, each packet being attached with (a) type information indicative of whether each of said plurality of packet sequences is said program packet sequence or said advertisement packet sequence, (b) identification information for identifying said plurality of packet sequences, and (c) a serial number of each of said plurality of packets, and at least a part of said plurality of packets being attached with (d) combination information specifying a combination of said plurality of program packet sequences and said plurality of advertisement packet sequences, (2) correspondence information indicative of correspondence between said plurality of content sources and said identification information, and (3) specification information for describing said plurality of content sources;

displaying a selection screen for said plurality of content sources on the basis of said identification information;

acquiring identification information corresponding to said specified content source indicated by said correspondence information upon reception of an externally given command for selecting any one of said plurality of content sources;

determining the type of said plurality of packet sequences by said type information;

extracting a plurality of corresponding packets by matching said acquired identification information with said attached identification information;

restoring said content data by aligning said plurality of extracted packets by their serial numbers; and restoring, at a given or predetermined trigger time or upon confirmation of said plurality of packets attached with said combination information, both of said plurality of program packet sequences and said plurality of advertisement packet sequences of which combination is specified by said combination information at the same time or only one of them at one time in a switched manner.

11. A network delivery data receiving method for receiving, when each of a plurality of content data generated by a plurality of content sources is organized into a plurality of program packet sequences and a plurality of advertisement packet sequences composed of a plurality of packets and said plurality of packet sequences are transmitted from a transmitting side of network delivery, said plurality of program packet sequences and said plurality of advertisement packet sequences via a network, said method comprising the steps of:

receiving via a network
(1) a plurality of packet sequences, each packet being attached with
   (a) type information indicative of whether each of said plurality of packet sequences is said program packet sequence or said advertisement packet sequence;
   (b) identification information for identifying said plurality of packet sequences; and
   (c) a serial number of each of said plurality of packets,
(2) correspondence information indicative of correspondence between said plurality of content sources and said identification information, and
(3) specification information for describing said plurality of content sources;
(4) combination information for specifying a combination of said plurality of program packet sequences and said plurality of advertisement packet sequences;

displaying a selection screen for said plurality of content sources on the basis of said identification information;

acquiring identification information corresponding to said specified content source indicated by said correspondence information upon reception of an externally given command for selecting any one of said plurality of content sources;

determining the type of said plurality of packet sequences by said type information;

extracting a plurality of corresponding packets by matching said acquired identification information with said attached identification information;

restoring said content data by aligning said plurality of extracted packets by their serial numbers; and restoring, at reception of said combination information or a given or predetermined trigger time, both of said plurality of program packet sequences and said plurality of advertisement packet sequences of which combination is specified by said combination information at the same time or only one of them at one time in a switched manner.

12. The network delivery data receiving method according to claim 11, wherein individual information is transmitted from the receiving side of network delivery to the transmitting side and said combination information set on the basis of said individual information is received from said transmitting side via said network.

13. A network delivery data receiving system for receiving, when each of plurality of content data generated by a plurality of content sources are organized into a plurality of packet sequences composed of a plurality of packets and said plurality of packet sequences are transmitted from a transmitting side of network delivery, said plurality of packet sequences via a network, comprising:

input means through which a user performs an input operation;

data exchange means for receiving via said network at least
(1) said plurality of packet sequences with each of said plurality of packets attached with identification information for identifying said plurality of packet sequences and a serial number,
(2) correspondence information indicative of correspondence between said plurality of content sources and said identification information, and
(3) specification information for describing said plurality of content sources;

data processing means for at least
(1) receiving a command for selecting any one of said plurality of content sources from said input means to acquire identification information corresponding to said specified content source by referencing said correspondence information,
(2) extracting a plurality of corresponding packets by matching said acquired identification information with said identification information attached to said plurality of packet sequences, and
(3) aligning said plurality of extracted packets by their serial numbers to restore said content data; and output means for displaying a selection screen for said plurality of content sources based on said specification information and a screen for said content data reproduced from said plurality of packet sequences.

14. A network delivery data receiving system for receiving, when each of a plurality of content data generated by a plurality of content sources is organized into a plurality of program packet sequences or a plurality of advertisement packet sequences each composed of a plurality of packets and said plurality of packet sequences are transmitted from a transmitting side of network delivery, at least said plurality of program packet sequences and said plurality of advertisement packet sequences via a network, comprising:

input means through which a user performs an input operation;

data exchange means for receiving via said network said plurality of packet sequences in which at least
(1) each of said plurality of packets is attached with
   (a) type information indicative of whether each of said plurality of packet sequences is said program packet sequence or said advertisement packet sequence;
   (b) identification information for identifying said plurality of packet sequences; and
   (c) a serial number of each of said plurality of packets,
and at least a part of said plurality of packets is attached with
   (d) combination information specifying a combination of said plurality of program packet sequences and said plurality of advertisement packet sequences,
(2) correspondence information indicative of correspondence between said plurality of content sources and said identification information, and
(3) specification information for describing said plurality of content sources;

data processing means for at least
(1) receiving a command for selecting any one of said plurality of content sources from said input means to acquire identification information corresponding to said specified content source by referencing said correspondence information,
(2) extracting said plurality of corresponding packets by matching said acquired identification information with said identification information attached to said plurality of packet sequences upon determination of the type of said plurality of packet sequences by said type information, (3) reproducing said content data by aligning said plurality of extracted packets by their serial numbers, and (4) restoring, at a given or predetermined trigger time or upon confirmation of said plurality of packets attached with said combination information, the content data of both of said plurality of program packet sequences and said plurality of advertisement packet sequences of which combination is specified by said combination information at the same time or only one of them at one time in a switched manner; and output means for displaying a selection screen for said plurality of content sources based on said specification information and a screen for said content data reproduced from said plurality of packet sequences.

15. A network delivery data receiving system for receiving, when each of a plurality of content data generated by a plurality of content sources is organized into a plurality of program packet sequences or a plurality of advertisement packet sequences each composed of a plurality of packets and said plurality of packet sequences are transmitted from a transmitting side of network delivery, at least said plurality of program packet sequences and said plurality of advertisement packet sequences via a network, comprising:

input means through which a user performs an input operation;

data exchange means for receiving via said network said plurality of packet sequences in which at least (1) each of said plurality of packets is attached with
 (a) type information indicative of whether each of said plurality of packet sequences is said program packet sequence or said advertisement packet sequence;
 (b) identification information for identifying said plurality of packet sequences; and
 (c) a serial number of each of said plurality of packets, (2) correspondence information indicative of correspondence between said plurality of content sources and said identification information, and (3) specification information for describing said plurality of content sources;

(4) combination information for specifying a combination between said plurality of program packet sequences and said plurality of advertisement packet sequences;

data processing means for at least (1) receiving a command for selecting any one of said plurality of content sources from said input means to acquire identification information corresponding to said specified content source by referencing said correspondence information, (2) extracting said plurality of corresponding packets by matching said acquired identification information with said identification information attached to said plurality of packet sequences upon determination of the type of said plurality of packet sequences by said type information, (3) reproducing said content data by aligning said plurality of extracted packets by their serial numbers, and (4) restoring, at reception of said combination information or a given or predetermined trigger time, the content data of both of said plurality of program packet sequences and said plurality of advertisement packet sequences of which combination is specified by said combination information at the same time or only one of them at one time in a switched manner; and output means for displaying a selection screen for said plurality of content sources based on said specification information and a screen for said content data reproduced from said plurality of packet sequences.

16. The network delivery data receiving system according to claim 15, further comprising:

usage-side information gather means for supplying via said network individual information which occurs in said network delivery data receiving system during the use thereof at least to the transmitting side of network delivery, wherein said data exchange means receives at least individual combination information prepared for said network delivery data receiving system to be supplied from the transmitting side of network delivery via said network and said date processing means selects said plurality of advertisement packet sequences combined with said plurality of program packet sequences in accordance with said command and said individual combination information.

* * * * *